United States Patent
Chaar

(10) Patent No.: US 12,512,094 B2
(45) Date of Patent: Dec. 30, 2025

(54) SYSTEM AND METHOD FOR CONSENT DETECTION AND VALIDATION

(71) Applicant: Wassim Samir Chaar, Coppell, TX (US)

(72) Inventor: Wassim Samir Chaar, Coppell, TX (US)

(73) Assignee: Wassim Samir Chaar, Coppell, TX (US)

( * ) Notice: Subject to any disclaimer, the term of this patent is extended or adjusted under 35 U.S.C. 154(b) by 557 days.

(21) Appl. No.: 17/873,803

(22) Filed: Jul. 26, 2022

(65) Prior Publication Data

US 2024/0038222 A1 Feb. 1, 2024

(51) Int. Cl.
*G10L 15/16* (2006.01)
*G06Q 10/1093* (2023.01)
*G10L 25/51* (2013.01)

(52) U.S. Cl.
CPC .......... *G10L 15/16* (2013.01); *G06Q 10/1093* (2013.01); *G10L 25/51* (2013.01)

(58) Field of Classification Search
CPC ......... G10L 15/00; G10L 15/16; G10L 15/22; G10L 2015/223; G10L 2015/225; G10L 25/48; G10L 25/51; G06F 40/20; G06F 40/30

See application file for complete search history.

(56) References Cited

U.S. PATENT DOCUMENTS

2012/0296832 A1 * 11/2012 Beringer ................ G06Q 10/10
705/80
2019/0189117 A1 * 6/2019 Kumar ................ G06F 16/3329

* cited by examiner

*Primary Examiner* — Athar N Pasha
(74) *Attorney, Agent, or Firm* — CHIP LAW GROUP

(57) ABSTRACT

A system is provided for consent detection and validation. Uttered speech signals and sensor data of at least one user is received from a first electronic device during a personal interaction, scheduled based on a consent response corresponding to an acceptance of a consent request, between two users. A confidence score is determined based on intent of the two users, current sensor data and a new set of user characteristics for the two users during the personal interaction. An immediate consent or dissent of one of the two users is detected at defined timestamp during the personal interaction based on comparison of the confidence score with threshold value, explicit or implied keywords from uttered speech signals, and extent of deviated values of sensor data. Based on a plurality of criteria, immediate consent or dissent of one of the two users is validated and second set of tasks is performed.

30 Claims, 12 Drawing Sheets

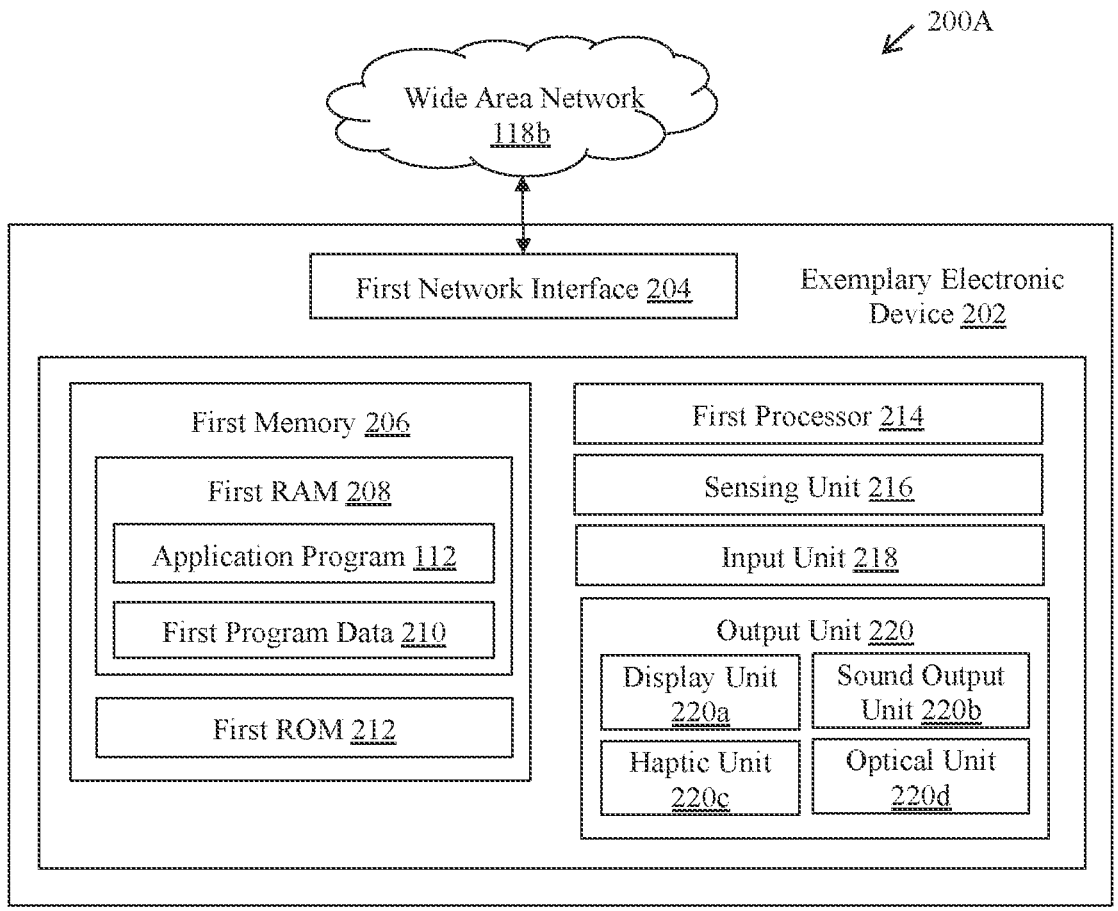
FIG. 2A
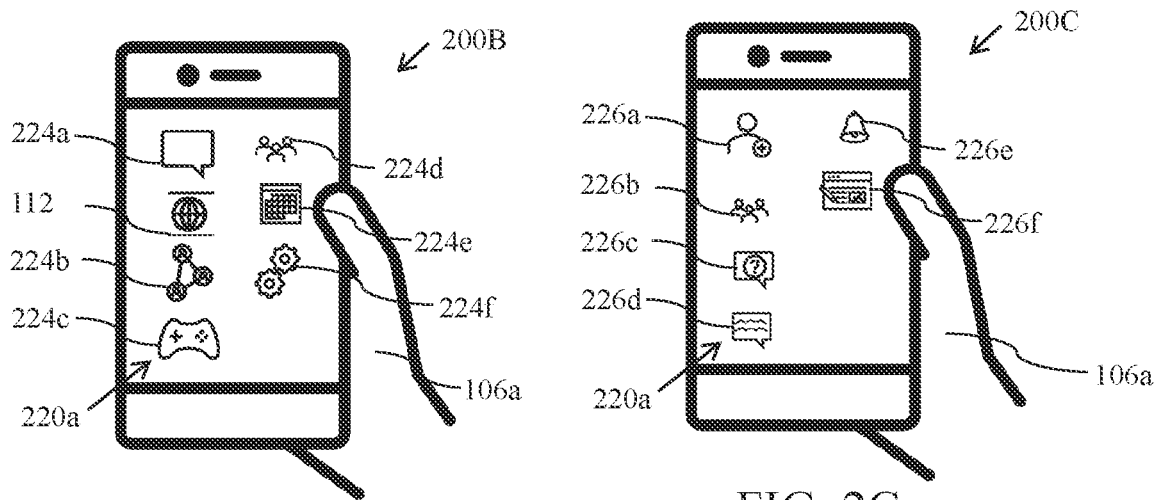
FIG. 2B
FIG. 2C

SYSTEM AND METHOD FOR CONSENT DETECTION AND VALIDATION

CROSS-REFERENCE TO RELATED APPLICATIONS/INCORPORATION BY REFERENCE

None.

FIELD OF TECHNOLOGY

Certain embodiments of the disclosure relate to data processing systems. More specifically, certain embodiments of the disclosure relate to a system and method for consent detection and validation.

BACKGROUND

With the widespread expansion of the Internet and mobile infrastructure, in collaboration with the breakthrough technologies, such as data sciences, general communication networks today are being redefined as hyperconnected networks. An exemplary hyperconnected network essentially includes IoT-connected endpoints, cloud computing, 5G and advanced connectivity, mesh networking, edge computing, and artificial intelligence (AI). Backed by high-speed and low-latency communication protocols and programmable infrastructure, such hyperconnected networks may be realized by smart electronic devices to facilitate diverse services. Non-limiting examples of such services may include exchanging messages (for example, via e-mails, texts, video chats, voice chats, and instant messaging), watching videos, controlling various devices remotely in real time through application programs, on-the-move shopping, and easily accessing desired information from anywhere and anytime. Such hyper-connected networks may facilitate various networking platforms (such as, social networking sites, dating websites, and various application programs) that provide the users with an on-line meeting and socializing place with other users for the purpose of forming business and personal relationships.

In certain scenarios, one party, such as a user who initiates the communication, decides whether to advance the relationship with the other party and meet in-person or otherwise communicate outside of such platforms (for example, via personal email, phone calls, text messages, and other electronic communication not routed through or otherwise involving the social network or dating system). Once the relationship progresses beyond such in-person meetings and other interactions, the networking platforms typically have little or no control over the interactions and do not record or track information about such interactions to draw a line from acceptable behavior all the way to a criminal behavior. Further, such network platforms may not be able to record or facilitate any permission or a mutual agreement, also referred to as consent, in case the in-person meetings progress to physical relations or intimate interactions. In certain scenarios, such physical relations or intimate interactions may result in sexual abuse, sexual harassment, sexual misconduct, or other violations of consent. In such scenarios, the victim may not come forward against the perpetrator and may be easily threatened into silence due to lack of any legally sound evidence. In other scenarios, an individual, who may be a malicious trickster, vindictive, a fame-seeker, a mentally unstable patient, and/or an easily influenced or delusional person, may level false accusations or allegations resulting in mental agony and an immediate social downfall of an accused. In such scenarios, the accused, despite of being an innocent person, may not be able to defend himself/herself due to lack of any legally sound evidence again.

Thus, security systems, such as audio or audio-visual recorders, may be used to record the consent of both the parties, before or during such in-person meetings, about the permissible extent or set boundaries of physical interactions. Such an arrangement may safeguard both the parties from any possible false allegations in future regarding the consensual nature of the interactions. However, one or both the parties may not agree to the usage of such security systems due to privacy issues as such security systems may be easily tempered with catering to the intent, need or convenience of one of the parties.

There also exists a provision of duly signing a written agreement or a consent form (with a witness present) that relays in clear terms the intent of two consenting parties to participate in physical interactions together. The agreement or form allows the two parties to enter the date and time the activity is to occur and list the exact permissions made by the consenting party. The agreement or form further includes that in case things go beyond what was originally consented, the two parties will have to mark that it will be ruled an accident without any repercussions or that the accident will be determined as assault. However, the written agreement or consent form, standing alone, are not perfect instruments. A signed consent form does not necessarily provide insight into comprehension, state of mind, or capacity of the other party. For example, there may be no indication of trickery, disagreement, debility, attention lapses, coercion or other such aspects which may have prevented the other party from fully understanding the nature of the information conveyed, arguably rendering any such written agreement or consent form ineffective. If the consent is ineffective, the other party may suffer legal, physical, pecuniary, or other setback which was not necessarily contemplated by the other party. The other party may attempt to hold the initiating party liable on various grounds, for example failure to effectively communicate the information. Therefore, despite the existence of a duly signed written agreement or consent form, uncertainty over whether the information was effectively communicated to and understood by the other party may expose the initiating party to liability. Thus, any of the existing systems do not provide a smart, secure, robust, legitimate, and user-friendly tool for consent detection and validation.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

Systems and/or methods are provided for consent detection and validation, substantially as shown in and/or described in connection with at least one of the figures, as set forth more completely in the claims.

These and other advantages, aspects, and novel features of the present disclosure, as well as details of an illustrated embodiment thereof, will be more fully understood from the following description and drawings.

BRIEF DESCRIPTION OF SEVERAL VIEWS OF THE DRAWINGS

FIG. 2A is a block diagram that illustrates an exemplary electronic device, in accordance with an exemplary embodiment of the present disclosure.

FIGS. 2B and 2C depict two views of a display unit of the exemplary electronic device, in accordance with an exemplary embodiment of the present disclosure.

DETAILED DESCRIPTION OF THE DISCLOSURE

Certain embodiments of the disclosure may be found in a system and a method for consent detection and validation. Consent is a term of common speech, with a specific definition as used in a variety of fields, such as the law, medicine, research, and sexual relationships. Consent may be defined as an agreement according to which an individual voluntarily and willfully agrees to undertake an action that another individual suggests. Recently, following numerous reports of high-profile untoward incidents and the development of various social movements, there is required an efficient, legit, and reliable solution that can function as an effective deterrent for growing issues of improper behavior between two parties during a personal interaction. For example, the proposed solution may provide a legally sound evidence that may be used by a complainant to file charges of consent violation against an accused. On the other hand, the solution may provide a legally sound evidence that may be used by a defendant to assert the truth of the matter in case false charges are filed by an alleged complainant.

In accordance with various embodiments of the disclosure, a system is provided for consent detection and validation. The system includes a memory for storing instructions and a processor for executing the instructions to perform operations. The processor may be configured to receive, during a personal interaction between a first user and a second user, uttered speech signals and sensor data of at least the first user from at least the first electronic device, via a secure communication channel. The personal interaction may be scheduled based on a consent response, received from the second electronic device, corresponding to an acceptance of a consent request received from the first electronic device. The processor may be further configured to determine a confidence score based on an intent of both of the first user and the second user, current sensor data and a new set of user characteristics predicted for the first user and the second user during the personal interaction. The processor may be further configured to detect an immediate consent or an immediate dissent of one of the first user or the second user at a defined timestamp during the personal interaction based on at least one of a comparison of the confidence score with a threshold value, one or more explicit or implied keywords from the uttered speech signals, and an extent of deviated values of the sensor data. The processor may be further configured to validate the immediate consent or the immediate dissent of one of the first user or the second user based on a plurality of criteria. The processor may be further configured to perform a second set of tasks based on the validation of the immediate dissent of one of the first user or the second user.

Figure 1:
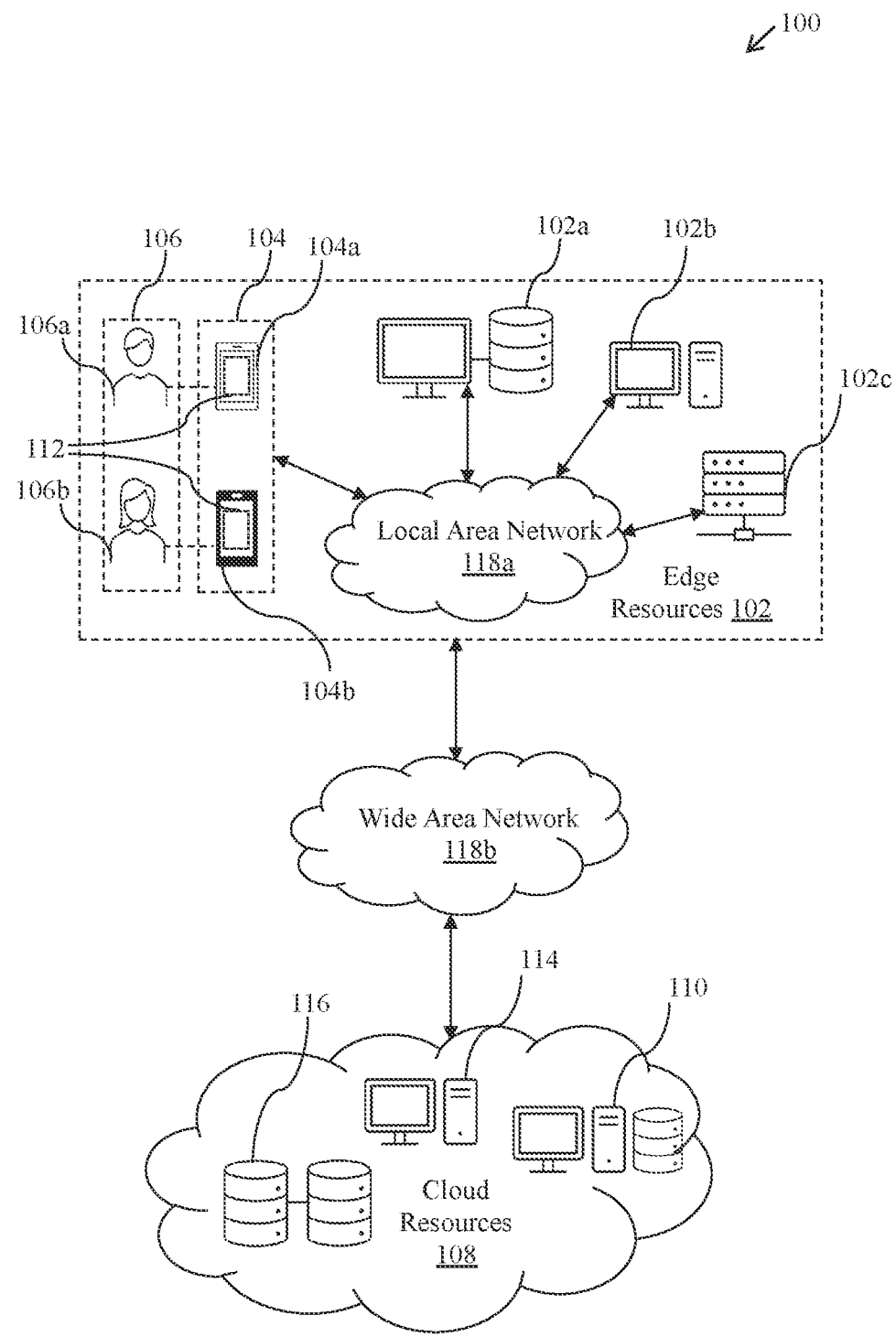
FIG. 1 is a block diagram that illustrates a network environment for consent detection and validation, in accordance with an exemplary embodiment of the disclosure.

FIG. 1 is a block diagram that illustrates a network environment 100 for consent detection and validation, in accordance with an exemplary embodiment of the disclosure. The network environment 100 is shown to include edge resources 102, a plurality of electronic devices 104, cloud resources 108, a consent management system (CMS) 110, and different communication networks, such as a local area network 118*a* and a wide area network 118*b*, as further discussed below.

The edge resources 102 may comprise suitable logic, circuitry, and interfaces that may be configured to collect and process data for the CMS 110 and/or communicate with one another via the CMS 110. The edge resources 102 may be considered part of the Internet-of-Things (IoT) having enough storage and computing capacity to make low latency decisions and to process the sensor data in milliseconds. The edge resources 102 may be interchangeably used with IoT devices that are located, deployed, and/or connected near a network edge that may correspond to a physical point at which the local area network 118*a*, such as an enterprise-owned network, connects to the wide area network 118*b*, such as a third-party network. Non limiting examples of the edge resources 102 may include personal electronic devices (such as the plurality of electronic devices 104), local servers (such as a database server 102*a* and an application server 102*b*), and communication devices (such as edge gateways or routers 102*c*). It should be noted that the above instances of the edge resources 102 are merely for exemplary purposes. Other examples of the edge resources 102, such as routing switches, integrated access devices (IADs), multiplexers, a variety of metropolitan area network (MAN) and wide area network (WAN) access devices, and various assets, such as people, buildings, manufacturing facilities, retail facilities, network, or communication infrastructure, and any associated IoT devices, though not shown in FIG. 1 for brevity, may be possible without any deviation from the scope of the disclosure.

In accordance with various embodiments, the edge resources 102 may communicate with each other and/or with other remote networks and resources (for example, the cloud resources 108) through one or more of the communication networks, such as the local area network 118a and/or the wide area network 118b. In accordance with an embodiment, the functionality of the CMS 110 may be partially or fully implemented by various devices from the edge resources 102.

The plurality of electronic devices 104 may be configured to communicatively couple and interact with one another, other devices from the edge resources 102 and the cloud resources 108, via the communication networks, such as the local area network 118a and the wide area network 118b. Numerous examples of the plurality of electronic devices 104 may include, but are not limited to, a smartphone, a tablet personal computer (PC), a slate PC, a personal digital assistant (PDA), an Ultrabook, a wearable electronic device (such as smart clothing, head-mounted display (HMD), or smart glasses), a smart television, a desktop computer, a laptop computer, and other such electronic devices and Internet Protocol (IP) appliances.

In accordance with an embodiment, the plurality of electronic devices 104 may be configured as thin or ultra-thin clients enabling remote desktop applications. In such embodiments, application software may be allowed to run on a centrally-hosted virtual computing system, such as the CMS 110. Such thin or ultra-thin clients may rely on access to the CMS 110 each time input data needs to be processed or validated. The plurality of electronic devices 104 may provide an infrastructure to enable the downloading of various application programs, such as an application program 112, and may facilitate browsing of various online platforms, such as social networking sites and dating websites.

In accordance with an embodiment, each of the plurality of electronic devices 104, such as a first electronic device 104a and a second electronic device 104b, may be configured to download the application program 112, referred to as an "app", that facilitates a variety of functionalities for the associated users. Examples of such functionalities may include, but are not limited to, enabling a first user 106a (associated with the first electronic device 104a) to search the user profile of a second user 106b (associated with the second electronic device 104b), recommending the user profile of the second user 106b to the first user 106a, various modes of electronic communication between the first user 106a and the second user 106b (such as managing consent forms, exchanging text messages, facilitating personal email, phone calls, video calls, and the like), facilitating various tasks (such as recording, processing, analyzing, and publishing the speech signals uttered by the first user 106a and the second user 106b during a personal interaction), and rendering alerts in response to detection of an unwarranted situation, such as an immediate dissent of the first user 106a or the second user 106b during the personal interaction, and the like.

For certain devices, such as desktop and laptop computers, the application program 112 may correspond to desktop apps. For other devices, such as smartphones, the application program 112 may correspond to mobile apps. The mobile apps may be of three basic types, i.e., native apps, web apps, and hybrid apps. The native apps may be stand-alone apps that are downloaded and installed at the plurality of electronic devices 104. The native apps are built just for one specific platform or operating system, such as Android® and iOS®. The web apps may be accessed via a web browser and are responsive versions of websites. The web apps may have limited functionalities due to an extensive dependence on the web browser used by the plurality of electronic devices 104. The hybrid apps are a combination of native and web apps, i.e., web apps with a native app shell. The hybrid apps may have a home screen app icon, some responsive design and may even work offline.

The plurality of users 106 may correspond to the personnel who operate the plurality of electronic devices 104 for interacting and communicating with each other, via social networking platforms and other application programs, such as the application program 112. Each of the plurality of users 106 may create a user profile on such social networking platforms and other application programs, such as the application program 112, and search for the user profiles of the other users to interact with them. Each of the plurality of users 106 may be associated with a corresponding electronic device from the plurality of electronic devices 104. For example, the first user 106a from the plurality of users 106 may be associated with the first electronic device 104a from the plurality of electronic devices 104. Similarly, the second user 106b from the plurality of users 106 may be associated with the second electronic device 104b from the plurality of electronic devices 104.

In accordance with an embodiment, the first user 106a at the first electronic device 104a may search for the user profile of the second user 106b based on one or more search parameters, such as name, location, name of the workplace, name of the educational institution (such as name of school, college, or university), and the like. Alternatively, the user profile of the second user 106b may be automatically recommended to the first user 106a by the CMS 110 using one or more methods. Accordingly, the first user 106a at the first electronic device 104a may select the user profile of the second user 106b for initiating a conversation via the application program 112. Once the conversation between the first user 106a and the second user 106b is initiated, the relationship between the first user 106a and the second user 106b evolves and proceeds to the next level, and the first user 106a and the second user 106b may decide to perform one or more activities, for example sexual activities, during a personal interaction. In such case, the first user 106a may want to execute a consent request so that the first user 106a is safeguarded from any false allegation by the second user 106b in future. Thus, using the application program 112, the first user 106a may generate a consent request at the first electronic device 104a for transmission to the second user 106b, via the communication networks (such as a local area network 118a and a wide area network 118b). Thus, the first user 106a may be hereinafter referred to an 'initiator'. In response, the second user 106b at the second electronic device 104b may accept, reject, or negotiate the consent request using the application program 112. Thus, the second user 106b at the second electronic device 104b may be hereinafter referred to a 'recipient'.

The cloud resources 108 may comprise various resources and/or services that may be hosted remotely over a network, which may otherwise be referred to as in the "cloud." In accordance with an embodiment, the cloud resources 108 may be remotely hosted on servers in a datacenter (for example, remote application servers, such as a digital distribution platform 114 and remote database servers comprising an installation file repository 116). The resources, services, and/or functionalities of the cloud resources 108 may be utilized by or for the edge resources 102, via a combination of the local area network 118a and the wide area network 118b. Non limiting examples of the cloud resources 108 may include outsourced storage, processing power, databases, networking, analytics, artificial intelligence engines, navigation services, geolocation services, network or infrastructure management, payment processing, audio and video streaming, messaging, social networking, news, and software applications.

In accordance with an embodiment, the cloud resources 108 may deliver cloud computing for the CMS 110 over the wide area network 118b. Thus, the cloud resources 108 may provide the CMS 110 with flexible resources, faster innovation, and economies of scale so that the consent detection and consent validation are performed by the CMS 110 in the fastest and most optimal and robust manner. In accordance with different embodiments, different components of the CMS 110 performing corresponding functionalities may be partially or fully implemented by various cloud resources 108 as an integrated or a distributed platform.

In accordance with an embodiment, various cloud-computing providers may offer different services according to different models, such as Infrastructure as a Service (IaaS), Platform as a Service (PaaS), and Software as a Service (SaaS). The IaaS form of cloud computing service may offer computational, storage and networking resources on-demand, usually on a pay-as-you-go basis. Examples of the IaaS may include, but are not limited to, Amazon Web Services (AWS) Elastic Compute Cloud (EC2)® and Microsoft Azure®. The PaaS form of cloud computing service may provide a framework for application creation and deployment. For example, the technical stack, such as, AWS Beanstalk® and Google App Engine®, required for application development may be available on the cloud in the PaaS form, which requires no download or local installation. The SaaS form of cloud computing service may correspond to a web-based software deployment model that makes the software accessible from any device through a web browser, irrespective of where the software is hosted, which operating system it uses, or which language it is written in. Non-limiting examples of the SaaS may include, Microsoft Office 365®, ZoomInfo®, Dropbox®, and the like.

The CMS 110 may comprise suitable logic, circuitry, and interfaces that may be configured to perform consent detection and validation, in accordance with an exemplary embodiment of the disclosure. The CMS 110 may be powered by various innovative technologies to, for example, extract value out of the troves of data they collect, deliver insights, simulate human intelligence, generate intelligent recommendations, automate tasks, and provide advanced system capabilities. The CMS 110 may include various components and data processing engines communicatively connected with each other, via the local area network 118a and/or the wide area network 118b. In accordance with different embodiments, various functionalities of the CMS 110 may be partially or fully implemented by the various edge resources 102 and cloud resources 108. The CMS 110 may be implemented, based on a number of hardware and processor technologies, as further described in detail in FIGS. 3A and 3B.

The application program 112 may comprise suitable logic and interfaces that may correspond to an application software (or an app) dedicated for performing various functionalities by providing a user interface that is presented on the display screens of the plurality of electronic devices 104. An installation link for the application program 112 may be provided to the plurality of electronic devices 104 by one or more content providers over the local area network 118a and/or the wide area network 118b. In accordance with an embodiment, the installation link may be part of an advertisement, or an ad campaign provided to the content providers by an Ad server. The advertisement may be displayed on a web page or an app running on the plurality of electronic devices 104. When the installation link for application program 112 is selected, the plurality of electronic devices 104 may be redirected to the digital distribution platform 114, for example, GOOGLE PLAY™, APPLE™ App Store, and others. The plurality of electronic devices 104 may retrieve or download the installation file of the application program 112 from the installation file repository 116, via the digital distribution platform 114. Once downloaded, the application program 112 may be installed and executed on each of the plurality of electronic devices 104.

In accordance with an embodiment, the application program 112 may facilitate a variety of functionalities for the associated plurality of users 106. Examples of such functionalities may include, but are not limited to, enabling the first user 106a to search the user profile of the second user 106b, recommending the user profile of the second user 106b to the first user 106a, various modes of electronic communication between the first user 106a and the second user 106b (such as managing consent requests, exchanging text messages, facilitating personal email, phone calls, video calls, and the like), various tasks (such as recording, processing, analyzing, and publishing the speech signals uttered by the first user 106a and the second user 106b during a personal interaction), rendering alerts in response to detection of an immediate dissent of the first user 106a or the second user 106b, and the like.

The communication networks, such as the local area network 118a and the wide area network 118b, may comprise suitable logic, circuitry, and interfaces that may be configured to facilitate communication between different components, systems and/or sub-systems of the network environment 100. In accordance with an embodiment, the edge resources 102 may be connected to the local area network 118a to facilitate communication with each other and/or other remote networks or resources, such as the cloud resources 108, via the wide area network 118b. In various embodiments, the network environment 100 may be implemented using any number or type of communication networks.

The local area network 118a and the wide area network 118b may be configured to provide a plurality of network ports and a plurality of communication channels for transmission and reception of communication data. The communication data may correspond to data received and/or exchanged, via the local area network 118a and the wide area network 118b, among the edge resources 102 and the cloud resources 108. Each network port may correspond to a virtual address (or a physical machine address) for transmission and reception of the communication data. For example, the virtual address may be an Internet Protocol version 4 (IPV4) or an Internet Protocol version 6 (IPV6) address, and the physical address may be a media access control (MAC) address. The communication data may be transmitted or received via a communication protocol, the examples of which may include, but are not limited to, a short-range communication protocol, a Hypertext Transfer Protocol (HTTP), a File Transfer Protocol (FTP), a Simple Mail Transfer Protocol (SMTP), a Domain Name Server (DNS) protocol, and a Common Management Information Protocol (CMIP) Over Transmission Control Protocol/Internet Protocol TCP/IP (CMOT).

The communication data may be transmitted or received via at least one communication channel of a plurality of communication channels. The communication channels may include, but are not limited to, a wireless channel, a wired channel, or a combination of wireless and wired channel thereof. The wireless or wired channel may be associated with a data standard which may be defined by one of a Local Area Network (LAN), a Personal Area Network (PAN), a wireless personal LAN (WPLAN), a Wireless Local Area Network (WLAN), a Wireless Sensor Network (WSN), a WAN, and a Wireless Wide Area Network (WWAN), the Internet, cellular networks, Wireless Fidelity (Wi-Fi) networks, short-range networks (for example, Bluetooth® or ZigBee®), and/or any other wired or wireless communication networks or mediums. In accordance with an embodiment, the wired channel may be selected based on the bandwidth criteria. For example, an optical fiber channel may be used for a high bandwidth communication, and a coaxial cable (or Ethernet-based communication channel) may be used for moderate bandwidth communication. In accordance with various embodiments, any, some, combination, or all of the systems, engines, and/or sub-systems of the network environment 100 may be adapted to execute any operating system, such as Linux-based operating systems, UNIX-based operating systems, Microsoft Windows, Windows Server, MacOS, Apple iOS, Google Android, or other customized and/or proprietary operating system. The systems, engines, and/or sub-systems of the network environment 100 may be adapted to execute such operating systems along with virtual machines adapted to virtualize execution of a particular operating system.

It should be noted that the communication between the various devices, systems and/or sub-systems, i.e., the CMS 110, the edge resources 102, and the cloud resources 108, of the network environment 100 may be dynamically established based on auto-selection of the most optimal network from various available communication networks provided by the local area network 118a and/or the wide area network 118b. The most optimal network may be automatically selected from the various available communication networks based on a plurality of network parameters. Non limiting examples of the plurality of network parameters may include link/signal quality, bandwidth, power, cost, throughput, security level, interference level, received signal strength, Quality of Service (QoS), network loads, distance, network connection time, network selection policy, and the like. In case of any adverse or untoward event, such as network failure or degraded network performance, the next optimal network may be dynamically selected in a seamless manner such that the established communication is not interrupted.

It should be noted that FIG. 1 is described herein as containing or being associated with a plurality of devices, systems and/or sub-systems. Nevertheless, not all the devices, systems and/or sub-systems illustrated within the network environment 100 of FIG. 1 may be utilized in each alternative implementation of the present disclosure. Additionally, one or more of the devices, systems and/or sub-systems described in connection with the examples of FIG. 1 may be located external to network environment 100. Further, certain systems and/or sub-systems illustrated in FIG. 1 may be combined with other components, as well as used for alternative or additional purposes in addition to those purposes described herein. Furthermore, certain devices and/or components illustrated in FIG. 1 may operate as standalone devices or may be integrated with, embedded within, or attached to other components. Accordingly, it should be noted that the network environment 100 of FIG. 1 may be implemented with any aspect of the various embodiments described throughout this disclosure.

In operation, a secure communication channel may be established as the application program 112 is downloaded and installed at the plurality of electronic devices 104. The CMS 110 may receive detailed information, pertaining to the plurality of users 106, from the plurality of electronic devices 104, via the secure communication channel. The detailed information may be captured at the plurality of electronic devices 104 through a user interface of the application program 112 presented at each of the plurality of electronic devices 104 during registration. The CMS 110 may generate a plurality of user profiles based on the detailed information, pertaining to the plurality of users 106, received from the plurality of electronic devices 104. Each of the plurality of user profiles includes a name, an age, a location, a family size, an income, a work indicator, a preference of living environment, a browsing history, one or more deep learning factors derived from pictures or visual descriptions, or any combination thereof. The CMS 110 may store the plurality of user profiles in a user profile database and one of the plurality of users 106, such as the first user 106a, may be enabled to select a user profile of another user, such as a second user profile of the second user 106b, for initiating a personal or professional relationship.

In accordance with an embodiment, the CMS 110 may be configured to enable the exchange of the plurality of messages between the first electronic device 104a and the second electronic device 104b prior to the personal interaction between the first user 106a and the second user 106b. In accordance with an embodiment, for the selection of the second user profile of the second user 106b by the first user 106a, the CMS 110 may recommend the second user profile of the second user 106b to the first user 106a via the user interface of the application program 112 presented at the first electronic device 104a. The second user profile of the second user 106b may be recommended based on a plurality of options presented by the application program 112 at the user interface and selected by the first user 106a based on user preferences of the first user 106a. In accordance with another embodiment, the CMS 110 may search the second user profile of the second user 106b from the plurality of user profiles based on one or more search terms provided by the first user 106a at the user interface of the application program 112 presented at the first electronic device 104a. In accordance with another embodiment, the CMS 110 may generate rating factors for other users from the plurality of users 106 based on one or more machine learning models. The rating factor may comprise a probability of a user interaction of the first user 106a with another user (i.e., the second user 106b) from the plurality of users 106. The CMS 110 may recommend the second user profile of the second user 106b based on ranking of the rating factors for the other users from the plurality of users 106.

In accordance with an embodiment, the CMS 110 may receive, via the secure communication channel, a consent request from the first electronic device 104a associated with the first user 106a based on a selection of the second user profile of the second user 106b by the first user 106a. The consent request may correspond to a mutual agreement to perform one or more activities during the personal interaction between the first user 106a and the second user 106b. The CMS 110 may transmit, via the secure communication channel, the consent request to the second electronic device 104b. The CMS 110 may receive, via the secure communication channel, the consent response from the second electronic device 104b based on options selected or data provided by the second user 106b on the consent request generated by the first user 106a.

Once the consent request is accepted, a plurality of messages may be exchanged between the first electronic device 104a and the second electronic device 104b, via the secured communication channel, prior to the personal interaction between the first user 106a and the second user 106b. Each of the plurality of messages may comprise identification information associated with the first user 106a and the second user 106b, and a payload comprising a plurality of text-based messages, voice-based messages, and video messages.

In accordance with an embodiment, the CMS 110 may determine an event based on analysis of the plurality of messages using natural language processing techniques. Corresponding to the event, a first set of tasks may be generated for the personal interaction between the first user 106a and the second user 106b. The first set of tasks generated corresponding to the event may comprise at least generating a calendar entry for both of the first user 106a and the second user 106b for scheduling the personal interaction and booking a meeting venue for the personal interaction.

In accordance with an embodiment, the CMS 110 may enable the first user 106a and the second user 106b for a direct exchange of one or more identity confirmation messages presented on corresponding user interfaces of an application program presented at the first electronic device 104a and the second electronic device 104b respectively, during or prior to the personal interaction between the first user 106a and the second user 106b.

The CMS 110 may receive, during a personal interaction between the first user 106a and the second user 106b, uttered speech signals and sensor data of at least the first user 106a from at least the first electronic device 104a, via the secure communication channel. The personal interaction may be scheduled based on the consent response, received from the second electronic device 104b, corresponding to the acceptance of the consent request received from the first electronic device 104a. In accordance with an embodiment, the uttered speech signals may be extracted from a conversation between the first user 106a and the second user 106b during the personal interaction.

The CMS 110 may identify a current set of user characteristics based on time sequence-based user interactions and the uttered speech signals of each user during the personal interaction. The current set of user characteristics may be utilized as a training data set for the prediction of the new set of user characteristics. The CMS 110 may predict a new set of user characteristics for the first user 106a and the second user 106b during the personal interaction based on time sequence-based personal interaction, the training data set, and an artificial neural network model. In accordance with an embodiment, the prediction of the new set of user characteristics may be further based on social media data of the first user 106a and the second user 106b collected from one or more public information databases. The social media data may include a plurality of media shared, content posts, social media contacts having a predefined social media distance between user accounts and information relating to the social media contacts.

The CMS 110 may determine a confidence score based on an intent of both of the first user 106a and the second user 106b, current sensor data and a new set of user characteristics predicted for the first user 106a and the second user 106b during the personal interaction. The CMS 110 may further detect an immediate consent or an immediate dissent of one of the first user 106a or the second user 106b at a defined timestamp during the personal interaction based on at least one of a comparison of the confidence score with a threshold value, one or more explicit or implied keywords from the uttered speech signals, and an extent of deviated values of the sensor data. The CMS 110 may further validate the immediate consent or the immediate dissent of one of the first user 106a or the second user 106b based on a plurality of criteria. In accordance with an embodiment, the plurality of criteria for the validation of the immediate consent or dissent of the first user 106a or the second user 106b may comprise at least informed, freely given, reversible, enthusiastic, and specific agreement between the first user 106a and the second user 106b to perform one or more activities during the personal interaction.

In accordance with an embodiment, the CMS 110 may override the acceptance on the consent request by the immediate dissent one of the first user 106a or the second user 106b for performing an activity during the personal interaction. The CMS 110 may perform a second set of tasks based on the validation of the immediate dissent of one of the first user 106a or the second user 106b. In accordance with an embodiment, the CMS 110 may publish, based on a user request, a time sequence-based recording of conversation incurred during the personal interaction. The published time sequence-based recording of the conversation incurred during the personal interaction may correspond to one of the second set of tasks. Further, other tasks from the second set of tasks performed based on the validation of the immediate dissent of one of the first user 106a or the second user 106b may comprise dialing an emergency number of current location, dialing a number of an emergency contact person, or activating an emergency alarm sound.

In accordance with an embodiment, it may be required that both of the electronic devices of the two users engaged in the personal interaction are equipped with the application program 112. In such embodiment, the proposed solution for consent detection and validation may be implemented in the best possible manner providing equal operational facilities and complete functionalities to both the users. However, in accordance with another embodiment, even if one of the two electronic devices of the two users engaged in the personal interaction is equipped with the application program 112, the proposed solution for consent detection and validation may still be provided but with limited operational facilities and functionalities available to only one of the two users. For example, only one user having the electronic device equipped with the application program 112 can avail the functionalities of the first and the second set of tasks, as described herein, though the task of time sequence-based conversation report published by the CMS 110 may be available to both the users.

It should be noted that in certain instances, one or more of the devices, components, data processing engines, systems and/or sub-systems may be implemented as the combination of edge resources 102 and the cloud resources 108 connected to each other via the combination of the local area network 118a and the wide area network 118b. However, in other instances, certain devices, systems and/or sub-systems may be included within or as a portion of one or more of the other described systems, as well as other systems, though not described in the illustrated implementation, yet not deviating from the scope of the disclosure.

FIG. 2A is a block diagram 200A that illustrates an exemplary electronic device 202, in accordance with an exemplary embodiment of the present disclosure. FIG. 2A is described in conjunction with FIGS. 2B and 2C that depict two views of a display unit of the exemplary electronic device 202, in accordance with an exemplary embodiment of the present disclosure.

With reference to FIG. 2A, the structure and functionality of the exemplary electronic device 202 may correspond to the one of each of the plurality of electronic devices 104. The exemplary electronic device 202 may include various components, such as a first network interface 204, a first processor 214, a first memory 206, a sensing unit 216, input unit 218, and an output unit 220. The first memory 206 may include a first random-access memory (RAM) 208, a first read only memory (ROM) 212, a first program data 210, and the application program 112. In accordance with various embodiments disclosed herein, the first electronic device 104a and the second electronic device 104b may correspond to the exemplary electronic device 202.

The first network interface 204 may comprise suitable logic, circuitry, and interfaces that may be configured to facilitate a communication with different external devices, such as the CMS 110, a remote server, or another electronic device, connected to the exemplary electronic device 202. The first network interface 204 may include, for example, a wired/wireless headset port, an external-charger port, a wired/wireless data port, a memory card port, an audio input/output (I/O) port, a video I/O port, and an earphone port. In response to a connection between an external device and the first network interface 204, appropriate launches or corresponding drivers related to the connected external device may be performed.

The first network interface 204 may include a communication interface that may be configured to communicate wireless signals and wireless data received from the external electronic devices, such as the CMS 110, a remote server, or another electronic device, to the first processor 214. In accordance with various embodiments, the communication interface may include, for example a mobile communication module, a broadcast reception module, a wireless Internet module, a short-range communication module, and a location information module.

The mobile communication module may transmit and receive wireless signals to perform data communication with a base station, an external terminal, and/or a server over a mobile communication network. The mobile communication network may be established according to various communication methods, for example, the Global System for Mobile communication (GSM), code-division multiple access (CDMA), code-division multiple access 2000 (CDMA2000), Enhanced Voice-Data Optimized or Enhanced Voice-Data Only (EV-DO), WCDMA, High Speed Downlink Packet Access (HSDPA), High Speed Uplink Packet Access (HSUPA), Long Term Evolution (LTE), Long Term Evolution-Advanced (LTE-A), the fifth-generation (5G) technology standard (and all the successor technology standards, such as 6G, 7G, and beyond) for broadband cellular networks, and the like. The broadcast reception module may receive a broadcast signal and/or broadcast-related information from an external broadcast management server through a broadcast channel.

The wireless Internet module may transmit and receive wireless signals for data communication over a network according to wireless Internet technologies, for example, WLAN, Wi-Fi, Wi-Fi Direct, Digital Living Network Alliance (DLNA), wireless broadband (WiBro), World Interoperability for Microwave Access (WiMAX), HSDPA, HSUPA, LTE, LTE-A, 5G technology standard for broadband cellular networks, and the like. The short-range communication module may transmit and receive wireless signals for data communication over a limited range using various short-range communication technologies, for example, Bluetooth©, radio-frequency identification (RFID), Infrared Data Association (IrDA), ultra-wideband (UWB), ZigBee®, near-field communication (NFC), Wi-Fi, Wi-Fi Direct, Wireless Universal Serial Bus (Wireless USB) technologies, and the like. The location information module may determine the current location of the exemplary electronic device 202 using various modules, such as a Global Positioning System (GPS) module or a Wi-Fi module.

The first memory 206 may comprise suitable logic, circuitry, and interfaces that may be configured to store data supporting various functions of the exemplary electronic device 202. The first memory 206 may store a number of application programs or applications (for example the application program 112) running on the exemplary electronic device 202, data for operation of the exemplary electronic device 202, and commands. The first memory 206 may store information and/or instructions for use in combination with the first processor 214. The first memory 206 may include volatile and non-volatile memory, such as the first RAM 208 and the first ROM 212. A number of program modules may be stored on the hard disk, external disk, the first ROM 212 or the first RAM 208, including an operating system (not shown), one or more application programs, such as the application program 112, other program modules (not shown), and the first program data 210. The application program 112 may include at least a part of the functionality as described above. The first RAM 208 may be of any type, such as Static RAM (SRAM), Dynamic RAM (DRAM), or Synchronous Dynamic RAM (SDRAM). A basic input/output system (BIOS) containing the basic routines that helps to transfer information between elements within the exemplary electronic device 202, such as during start-up, may be stored in the first ROM 212.

The first processor 214 may comprise suitable logic, circuitry, and interfaces that may be configured to determine an executable operation of the exemplary electronic device 202 based on executable instructions stored in the first memory 206 or commands provided by the user. The first processor 214 may be configured to sense, extract, and detect, collect data and/or receive speech signals for a data analysis and machine learning operation, through the sensing unit 216 and the input unit 218 in the exemplary electronic device 202. Accordingly, the first processor 214 may collect information for processing, storing in the first memory 206 or transmitting to the external devices, such as the CMS 110, a remote server, or another electronic device, connected to the exemplary electronic device 202, via the local area network 118a and/or the wide area network 118b.

In accordance with an embodiment, the computing functionalities of the first processor 214 in the exemplary electronic device 202 disclosed herein may be implemented in one or more silicon cores in a reduced instruction set computing (RISC) processor, an ASIC processor, a complex instruction set computing (CISC) processor, FPGAs, and other semiconductor chips, processors, or control circuits.

It should be noted that the terms "processor" or "microprocessor" referred in FIG. 2A include not only a traditional microprocessor (such as Intel's® industry-leading x86 and x64 architectures), but also graphics processors, matrix processors, and any ASIC, FPGA, microcontroller, digital signal processor (DSP), programmable logic device, programmable logic array (PLA), microcode, instruction set, emulated or virtual machine processor, or any similar device, combination of devices, or logic elements (hardware or software) that permit the execution of instructions.

The sensing unit 216 may comprise suitable logic, circuitry, and interfaces that may be configured to detect (or sense) information about a user (associated with the exemplary electronic device 202) and the surrounding environment around the exemplary electronic device 202. For example, the sensing unit 216 may include a proximity sensor, a touch sensor, an illuminance sensor, an acceleration sensor, a magnetic sensor, a gravity sensor, a gyroscope sensor, a motion sensor, an RGB sensor, an infrared sensor, an ultrasonic sensor, and a battery gauge. The sensing unit 216 may further include biometric sensors, such as retina scanner, fingerprint and thumbprint scan sensor, optical scanner, the microphone, to detect biometric data of the user.

The biometric data may include morphological biometric data corresponding to user identification metrics and measurement of physical traits and body structure of the associated user. Non-limiting examples of the morphological biometric data may include, voice identification, iris identification, retinal identification, facial identification, fingerprint identification, finger geometry recognition, vein recognition, hand geometry, ear recognition, odor recognition, or electroencephalogram-based identification, and/or the like.

The biometric data may further include bio-signals corresponding to measurement of psychophysical characteristics or parameters and movement-related metrics of the user. Non-limiting examples of the psychophysical characteristics or parameters may include blood pressure, heart rate, pulse rate, body temperature, oxygen level, perspiration, electro dermal activity, brain waves, and/or the like. Non-limiting examples of the movement-related metrics may include distance moved, speed of movement, time spent, and/or the like.

The biometric data may include behavioral biometric data corresponding to measurement of behavioral identifiers unique to a user. Non-limiting examples may include signatures, gait biometrics, keystroke recognition, hand expressions, facial expressions, vocal expressions, body gestures, eye tracking, and/or the like.

The biometric data may further include biological biometric data corresponding to biological measurements of the user at the genetic or molecular level. Biological biometric data may require sampling of DNA from blood, nails, hair, buccal swabs, or bodily fluids for DNA matching, diagnosing genetic diseases, and microbiological studies, the detailed records of which may be stored in the first memory 206 of the exemplary electronic device 202. In accordance with an embodiment, the biological biometric data may be received from DNA biosensors and gene chips that may provide sequence-specific information in a quicker, easier and economical manner compared to the traditional hybridization methods. In accordance with another embodiment, the biological biometric data may be received from microchips implanted in the body of a user of the exemplary electronic device 202.

In accordance with an embodiment, such biological biometric data may be compared with reference biological biometric data stored locally within the first memory 206 of the exemplary electronic device 202. In accordance with another embodiment, the reference biological biometric data may be fetched from another application program, such as a health monitoring app, installed in the first memory 206 of the exemplary electronic device 202. In accordance with another embodiment, the reference biological biometric data may be fetched from a remote medical repository communicatively coupled with the exemplary electronic device 202, via the local area network 118a and/or the wide area network 118b.

The input unit 218 may comprise suitable logic, circuitry, and interfaces that may be configured to receive an input associated with the user which may be further analyzed to be processed based on control command provided by the user. For example, a camera may be embedded within the exemplary electronic device 202 for capturing an image signal when triggered by the user. The camera may further process image frames, such as still images, video, or the like, acquired by an image sensor in a video call mode or a shooting mode. The processed image frame may be displayed on a display unit of the output unit 220 or stored in the first memory 206. In another example, a microphone may be used for receiving speech signals uttered by one or more users and implementing noise-removal algorithms to further refine the uttered speech signal by removing background noise. The microphone may process the uttered speech signals into electrical speech data. The processed speech signals or raw speech signals may be stored in the first memory 206 or may be transmitted to external electronic devices, such as the CMS 110, the remote server, or another electronic device. Other examples may include, but are not limited to, a touch input unit and a mechanical input unit (or a mechanical key, for example, a button, a dome switch, a jog wheel, a jog switch, and the like located at the exemplary electronic device 202). The touch input unit may include a virtual key, a soft key, or a visual key displayed on a touch screen through software processing or may include a touch key placed on a portion other than the touch screen.

The output unit 220 may comprise suitable logic, circuitry, and interfaces that may be configured to render an output related to various senses, such as visual, auditory, tactile, and the like. Numerous examples of the output unit 220 may include a display unit 220a, a sound output unit 220b, a haptic unit 220c, an optical unit 220d, and the like. The display unit may be configured to display information processed by the exemplary electronic device 202. For example, the display unit may present screen information of the application program 112 being executed on the exemplary electronic device 202, or User Interface and Graphic User Interface information according to the execution-screen information. In accordance with an embodiment, the display unit 220a and a touch sensor may have an interlayered structure or may be integrated, thereby implementing a touch screen. The touch screen may serve as the user input/output unit that provides an input interface between the exemplary electronic device 202 and the user and provides an output interface between the exemplary electronic device 202 and the user.

As depicted in a first view 200B in FIG. 2B, an exemplary first user interface is displayed on the display unit 220a that includes a plurality of icons, for example, messages icon 224a, a social networking site icon 224b, games icon 224c, contact list icon 224d, calendar icon 224e, settings icon 224f, and an icon for the application program 112. As the first user 106a selects the application program 112, an exemplary second user interface is displayed on the display unit 220a, as depicted in a second view 200C in FIG. 2C. The exemplary second user interface is displayed on the display unit 220a that includes another plurality of icons, for example, user profile icon 226a, recommended profiles icon 226b, consent request profile icon 226c, consent response profile icon 226d, task notifications icon 226e, report generation icon 226f, and the like. The user profile icon 226a presents a user interface to create a first user profile of the first user 106*a* or edit the existing first user profile of the first user 106*a*. The recommended profiles icon 226*b* presents a user interface to. The consent request profile icon 226*c* presents a user interface to view the open consent requests, i.e., the ones that have been generated and the one that is being generated. The consent response profile icon 226*d* presents a user interface to view the consent responses received from one or more users or the ones that are under negotiation. The task notifications icon 226*e* presents a user interface to view the first and the second set of tasks generated by the CMS 110. The report generation icon 226*f* presents a user interface to view and generate, based on a user request, a time sequence-based recording of conversation incurred during the personal interaction that are published by the CMS 110.

The sound output unit 220*b* may output audio data received from the first network interface 204 or stored in the first memory 206, in a call signal reception mode, a call mode, a recording mode, a speech recognition mode, broadcast reception mode, or the like. The sound output unit 220*b* may include at least one among a receiver, a speaker, and a buzzer. The haptic unit 220*c* may generate various tactile effects, for example a vibration, that the user can feel. The optical unit 220*d* may output a signal for notifying the occurrence of an event, by using light of a light source of the exemplary electronic device 202. Examples of the event generated in the exemplary electronic device 202 may include receiving a message, receiving a call signal, a missed call, an alarm, schedule notification, receiving an email, receiving information through an application, and the like.

It should be noted that all or parts of hardware components of the exemplary electronic device 202 disclosed herein may readily be provided in a system-on-a-chip (SoC), including a central processing unit (CPU) package. In accordance with an embodiment, the SoC may correspond to an integrated circuit (IC) that integrates components of a computer or other electronic system into a single chip. The SoC may contain digital, analog, mixed-signal, and radio frequency functions, all of which may be provided on a single chip substrate. Other embodiments may include a multi-chip-module (MCM), with multiple chips located within a single electronic package and configured to interact closely with each other through the electronic package.

Figure 3A:
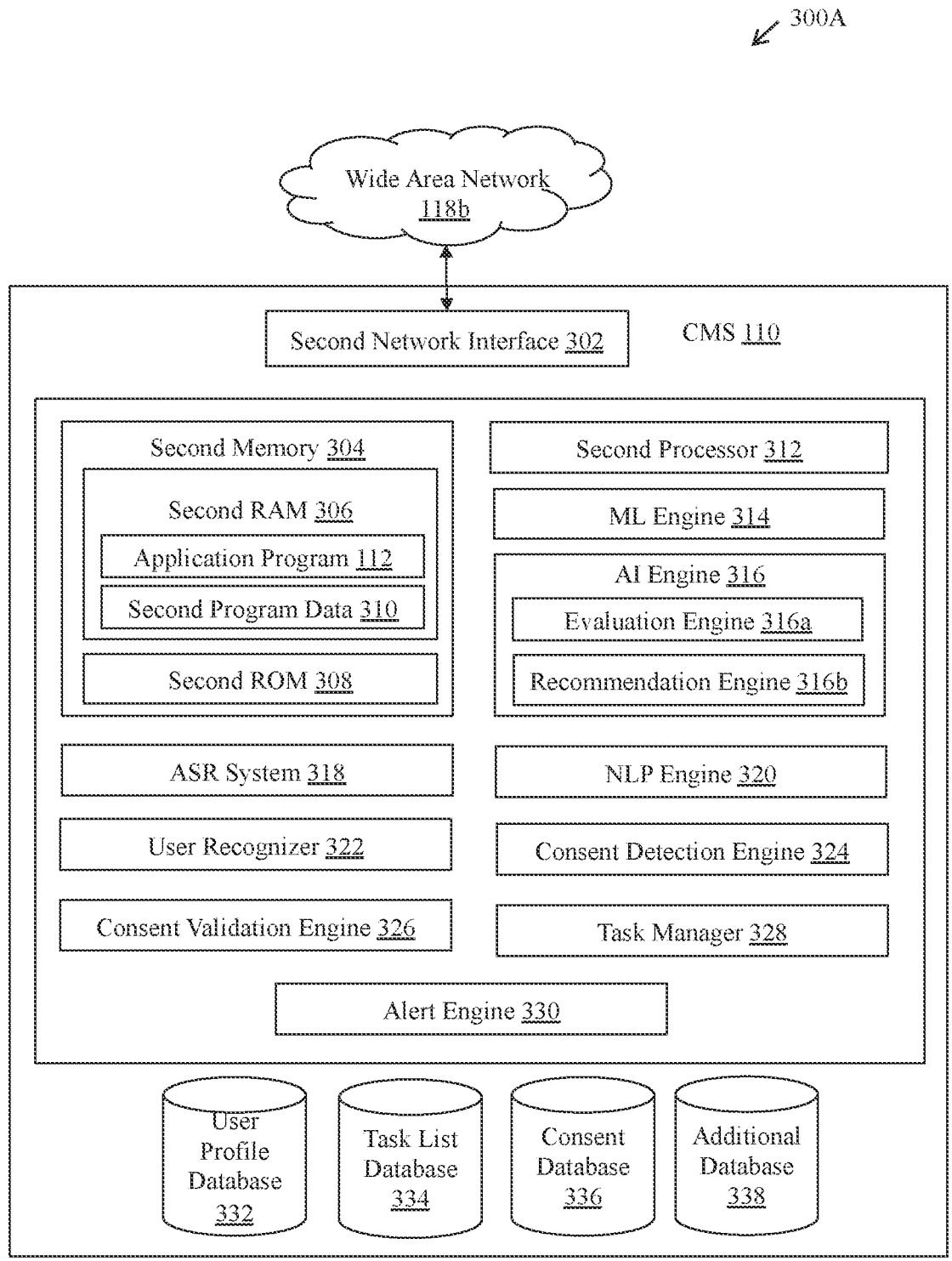
FIGS. 3A and 3B depict block diagrams that collectively illustrate the various components and data processing engines of a consent management system for consent detection and validation, in accordance with an exemplary embodiment of the present disclosure.
Figure 3B:
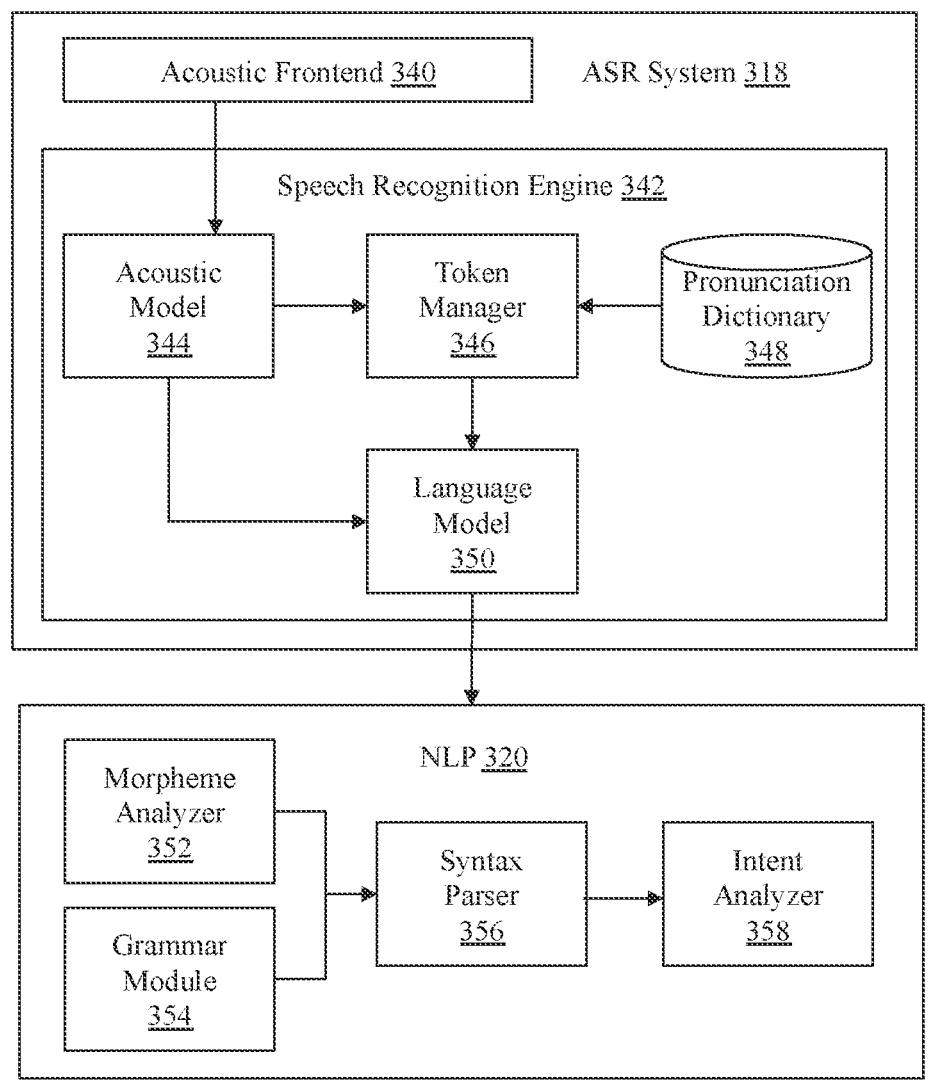

FIGS. 3A and 3B depict block diagrams 300A and 300B, respectively, that collectively illustrate the various components and data processing engines of the CMS 110 for consent detection and validation, in accordance with an exemplary embodiment of the present disclosure. With reference to the block diagram 300A, there is shown the CMS 110 comprising a second network interface 302 and a second memory 304 that includes a second RAM 306, a second ROM 308, a second program data 310, and the application program 112. The CMS 110 may further comprise a second processor 312, a machine learning (ML) engine 314, an artificial intelligence (AI) engine 316 (further comprising an evaluation engine 316*a* and a recommendation engine 316*b*), an automatic speech recognition (ASR) system 318, a natural language processing (NLP) engine 320, a user recognizer 322, a consent detection engine 324, a consent validation engine 326, a task manager 328, an alert engine 330, a user profile database 332, a task list database 334, a consent database 336, and an additional database 338. With reference to the block diagram 300B in FIG. 3B, there are shown an acoustic frontend 340, a speech recognition engine 342, an acoustic model 344, a token manager 346, a pronunciation dictionary 348, and a language model 350 in the ASR system 318 of the CMS 110. There are further shown a morpheme analyzer 352, a grammar module 354, a syntax parser 356, and an intent analyzer 358 in the NLP engine 320 of the CMS 110.

The second network interface 302 may be configured to transmit/receive the information over the network, such as the local area network 118*a* and/or the wide area network 118*b*, to/from other network interfaces of other devices. The second network interface 302 may include wired communication interfaces, wireless communication interfaces, cellular communication interfaces, and other communication interfaces to provide communication via other modalities. When used in a LAN networking environment, the CMS 110 may be connected to LAN through a network interface or adapter in the second network interface 302. When used in a WAN networking environment, the CMS 110 may include a modem in the second network interface 302 or other means for establishing communications over WAN, such as Internet or other type of computer network. Various well-known protocols, such as, transmission control protocol/Internet protocol (TCP/IP), Ethernet, FTP, HTTP, and the like may be used. Accordingly, the CMS 110 may be operated in a client-server configuration to permit the plurality of electronic devices 104 to retrieve web pages from a web-based server or the application program 112. The communication technology used by the second network interface 302 may include GSM, CDMA, LTE, 5G, WLAN, Wi-Fi, Bluetooth® RFID, IrDA, ZigBee®, NFC, and the like.

In accordance with an embodiment, the second network interface 302 may be configured to optionally obtain context information associated with the speech signals from the plurality of electronic devices 104 with or immediately after the speech signals are received. The context information may include user specific data, vocabulary, and/or preferences related to receipt of the speech signals. In accordance with an embodiment, the context information may include information about the software and hardware state of the plurality of electronic devices 104 at the time the user request is received, and/or the ambient environment around the plurality of electronic devices 104 at the time the speech signals are received.

The second memory 304 may comprise suitable logic, circuitry, and interfaces that may be configured to store data supporting various functionalities of the CMS 110. The second memory 304 may store a number of application programs or applications (for example the application program 112) hosted by the CMS 110, and data and commands for various operations of the CMS 110. The second memory 304 may store information and/or instructions that may be executed by the second processor 312. The second memory 304 may include volatile and non-volatile memory, such as the second RAM 306 and the second ROM 308. A number of program modules may be stored on the hard disk, external disk, the second RAM 306 or the second ROM 308, including an operating system (not shown), one or more application programs, such as the application program 112, other program modules (not shown), and a second program data 310. The second RAM 306 may be of any type, such as SRAM, DRAM, or SDRAM. A BIOS containing the basic routines that helps to transfer information between elements within the CMS 110, such as during start-up, may be stored in the second ROM 308.

The second processor 312 may comprise suitable logic, circuitry, and interfaces that may be configured to determine an executable operation of the CMS 110 based on executable instructions stored in the second memory 304 or commands provided by the user. The second processor 312 may be configured to sense, extract, and detect, collect data and/or receive speech signals from the exemplary electronic device 202 for a data analysis and machine learning operation. Accordingly, the second processor 312 may collect information for processing, storing in the second memory 304 or transmitting to the external devices, such as the plurality of electronic devices 104, a remote server, or another computing device, connected to the CMS 110, via the local area network 118a and/or the wide area network 118b.

In accordance with an embodiment, the second processor 312 may perform various functions for implementing intelligent emulation (specifically, a knowledge-based system, an inference system, and a knowledge acquisition system) for the CMS 110. This may be applied to several types of systems (for example, a fuzzy logic system) including an adaptive system, a machine learning system, an artificial neural network, and the like. In accordance with an embodiment, the second processor 312 may control the overall operation of the exemplary CMS 110, in addition to the operations related to the application program 112. The second processor 312 may process speech signals, data and/or information, or may execute the application program 112 stored in the second memory 304 through the above-described elements, thereby providing or processing information or a function or performing a task appropriate for each of the plurality of users 106. To this end, the second processor 312 may request, receive, and/or use data of the ML engine 314, and may control the CMS 110 so that a predicted operation or an operation determined to be preferable, of an executable operation is performed. In accordance with an embodiment, the computing functionalities of the second processor 312 in the CMS 110 disclosed herein may be implemented in one or more silicon cores in a RISC processor, an ASIC processor, a CISC processor, FPGAs, and other semiconductor chips, processors, or control circuits.

The ML engine 314 may comprise suitable logic, circuitry, and interfaces that may be configured to provide CMS 110 an ability to automatically learn and improve from experience without being explicitly programmed. The ML engine 314 may implement one or more machine learning algorithms that may be configured to make inferences and determinations about the current workflow scenario in view of feedback received about the current workflow scenario and information provided by one or more information sources and/or the historical data referenced from the databases. In accordance with an embodiment, the ML engine 314 may facilitate the implementation of the AI engine 316 to automatically make determinations and inferences in each workflow and optimize the performance of the CMS 110 in real-time.

The ML engine 314 may be configured to receive, classify, store, and output information to be used for data mining, a data analysis, intelligent decision making, and machine learning algorithm and technology. In accordance with an embodiment, the ML engine 314 may be implemented by using the databases maintained at the CMS 110 communicating with the exemplary electronic device 202. In accordance with another embodiment, the ML engine 314 may be implemented by using a memory maintained as one of the cloud resources 108 in a cloud computing environment, or other remote memory location that is accessible by the CMS 110 through a communication network, such as the local area network 118a and/or the wide area network 118b. Generally, the ML engine 314 may be configured to store data in one or more databases to identify, index, categorize, manipulate, store, find, and output for use in supervised learning, unsupervised learning, reinforcement learning, data mining, a predictive analysis, and/or the like. The information stored by the ML engine 314 may be used by the second processor 312 or one or more controllers of the CMS 110, using any of several types of data analysis algorithms and machine learning algorithms. Examples of such algorithms may include, but are not limited to, a k-nearest neighbor system, fuzzy logic (for example, possibility theory), a classifier tree (for example, a perceptron tree, a support vector tree, a Bayesian network, a Petri net (for example, a finite state machine, a mealy machine, and a Moore finite state machine), a random forest, a Markov tree, a decision tree forest, a neural network, a Boltzmann machine, vector quantization, a pulsed neural network, a support vector machine, a maximum margin classifier, hill climbing, an inductive logic system, pandemonium model and system, artificial fusion, sensor fusion, image fusion, reinforcement learning, augmented reality, pattern recognition, automated planning, and the like.

In accordance with an embodiment, the ML engine 314 may invoke one or more machine learning models to be applied to learning over time behaviors or biometric data of the plurality of users 106 communicatively coupled with the CMS 110 through the plurality of electronic devices 104. In one aspect, the plurality of electronic devices 104 comprising various sensors, such as microphone, voice capturing endpoint, retina scanner, heart monitor, video camera, and the like, may be used to capture speech, emotional data, biometric data, and/or psychophysical characteristics or parameters (for example, electro dermal activity, heart rate, blood pressure, and the like data.

The AI engine 316 may comprise suitable logic, circuitry, and interfaces that may be configured to learn from experience, adjust to new inputs and perform human-like intelligent tasks using output of the ML engine 314, thereby reducing or mitigating adverse outcomes of the CMS 110. In this regard, using one or more types of machine learning algorithms and the databases, the AI engine 316 may learn all aspects of how the workflow should be organized to achieve optimal operational and financial outcomes. The AI engine 316 may apply intelligent reasoning based on the speech signals and sensor data and generate educated decisions based on such reasoning.

The AI engine 316 may include an evaluation engine 316a configured to evaluate the activities performed during a personal interaction between the first user 106a and the second user 106b. For example, the evaluation engine 316a may evaluate the personal interaction to identify events and generate observations about the personal interaction to facilitate making more intelligent and informed decisions. In accordance with an embodiment, the evaluation engine 316a may perform various functionalities, such as event identification and risk assessment.

The event identification may include an event reflected in the personal interaction correlated with the sensor data, which warrants immediate attention and/or a rapid response. In general, the event may correspond to change in state, condition, or status of the behaviour and/or user characteristics of the first user 106a and/or the second user 106b determined from the corresponding uttered speech signals and sensor data, which warrants attention and/or a response.

The event may be defined as an occurrence of an incident during the personal interaction between the first user 106a and the second user 106b that is desired or undesired. For example, a desired event may be fixing date/time/venue for the personal interaction. An undesired event may be inability to perform an activity during the personal interaction. In accordance with an embodiment, from one perspective, an occurrence of an improper or an undesired performance of an activity contradictory to the consent request, a failure to perform an aspect of the activity, or demonstration of a level of fatigue or attentiveness may also be considered as the event.

It should be noted that the events described above are merely exemplary and many additional types of events associated with a specific application area may be considered that warrants immediate attention. Further, it should be noted that the events may involve a combination of different parameters associated with the users, the sensor data, the activities permissible and non-permissible in accordance with the consent request and/or the data corresponding to the surrounding environment around the first electronic device 104a and the second electronic device 104b.

The evaluation engine 316a may perform risk assessment to determine whether the event should be considered significant or not. In accordance with an embodiment, the evaluation engine 316a may be configured to determine a risk score for the identified event. Accordingly, the event may be classified as significant if corresponding risk score exceeds a defined threshold value. In accordance with another embodiment, the event may be classified as a low-risk if corresponding risk score is between a first set of defined threshold values, a medium-risk if corresponding risk score is between a second set of defined threshold values, or a high-risk event if corresponding risk score is between a third set of defined threshold values. In accordance with yet another embodiment, the events may be classified as warranting attention or acknowledgment verses events warranting an immediate response based on the magnitude of the risk score, such as low-risk score and high-risk score, respectively. It should be noted that other classification schemes including additional categories of risk can be realized, without deviation from the scope of the disclosure.

The AI engine 316 may further include a recommendation engine 316b configured to recommend an action to be taken corresponding to the identified event. The recommendation engine 316b may be configured to determine or infer and provide one or more responses as the recommendation to the identified events. In accordance with an embodiment, based on the recommendation, a first set of tasks may be generated. Examples of the first set of tasks may include, but are not limited to, dialing an emergency number of current location, generating a calendar entry, booking a venue, and the like. In accordance with another embodiment, based on the recommendation, a second set of tasks may be generated. Examples of the second set of tasks may include, but are not limited to, publishing a time sequence-based conversation report, dialing an emergency number of current location, dialing a number of an emergency contact person, activating an emergency alarm sound, and the like.

The ASR system 318 may comprise suitable logic, circuitry, and interfaces that may be configured to receive natural language speech corresponding to the uttered speech signals through the second network interface 302, process the speech signals, and generate a recognition result which is a machine-readable version of the speech signals. For comprehending the natural language or human speech, Natural Language Processing (NLP)-Based ASR system is widely used. An example of the machine-readable version of the speech signals may be text, which may include words, word strings, phrases, sentences, or other forms of verbal expression. In accordance with different embodiments, the ASR system 318 may reside entirely or in part in one of the cloud resources 108 in cloud-based environment and/or the CMS 110.

The acoustic frontend 340 may be configured to receive the speech signals (uttered by the first user 106a and the second user 106b communicating with each other) from the exemplary electronic device 202, via the available communication networks provided by the local area network 118a and/or the wide area network 118b. The acoustic frontend 340 may be further configured to transform the received speech signals into data that may be processed by the speech recognition engine 342.

In accordance with an embodiment, the acoustic frontend 340 may be further configured to process or pre-process the received speech signals for noise cancellation, normalization, and the like, and divide the digitized speech signals into frames representing time intervals. For such frames, the acoustic frontend 340 may determine a number of values (referred to as features that represent the qualities of the speech signals) and a set of values (referred to as a feature vector that represents the features/qualities of the speech signals within the frame).

Each feature may include, among others, a deletion, an amendment, an addition, or a combination thereof to one of metadata or data of the speech signals. For example, brackets in the metadata or the transcription data of the speech signals may be deleted. The feature can also include relationships between words, sentiment(s) (for example, anger, happiness, sadness, boredom, love, excitement, and the like), recognize speech, accent, topics (for example, sports, documentary, romance, sci-fi, politics, legal, and the like), noise profile(s), volume profile(s), and audio analysis variables.

In accordance with an exemplary embodiment, the acoustic frontend 340 may perform a Fourier transform on the uttered speech signals to extract spectral features that characterize the uttered speech signals as a series of representative multidimensional vectors. Such features or components may be associated with a process of information compression and dimension reduction which is required for speech recognition from the uttered speech signals. Various examples of such features or components may be a differential cepstrum, a Linear Predictive Coding (LPC) cepstrum, a Perceptual Linear Prediction (PLP) cepstrum, a Mel-frequency cepstral coefficients (MFCC), neural network feature vector techniques, linear discriminant analysis, semi-tied covariance matrices and the like.

The speech recognition engine 342 may comprise suitable logic, circuitry, and interfaces that may be configured to process, based on a plurality of models, the pre-processed speech signals from the acoustic frontend 340. The speech recognition engine 342 may be configured to map the received feature vectors from the acoustic frontend 340 to language phonemes and words from the stored acoustic model 344 and language model 350.

The speech recognition engine 342 may compute recognition scores for the feature vectors based on the acoustic information and language information. The acoustic information may be used to calculate an acoustic score representing a likelihood that the intended sound represented by a group of feature vectors matches a language phoneme. The language information may be used to adjust the acoustic score by considering what sounds and/or words are used in context with each other. Accordingly, the likelihood of grammatically correct speech results is improved in the automatic speech recognition process. Various techniques to map the feature vectors to the phonemes by the acoustic model 344 may correspond to Hidden Markov models (HMMs) on the spectral data or neural network (NN). In simpler words, the acoustic model 344 predicts which sound, or phoneme, from the phone set is being spoken in each frame of audio and further predicts the probability of each phenome being spoken in a short frame of audio. The acoustic model 344 generates candidate phoneme sequences and corresponding acoustic scores. In accordance with an exemplary embodiment, deep neural networks trained on thousands of hours of transcribed audio data may be used for the acoustic model 344. Various factors, such as accent, gender, age, microphone, variation in enunciation, and background noise may be modeled by the acoustic model 344.

The token manager 346 may be configured to check the candidate phoneme sequences against a pronunciation dictionary 348 that includes multiple pronunciations for each word. Accordingly, the token manager 346 may generate candidate token sequences made up of sequences of words that comprise the candidate sequence of phonemes in order.

The language model 350 may use the candidate token sequences and the acoustic scores and computes a probability score for each candidate token sequence. Stated differently, the language model 350 learns which sequences of words are most likely to be spoken and predicts which words will follow on from the current words and with what probability. The probability score may be based on the frequency with which the token sequences are likely to appear in the language, weighted by the probability of the token sequence according to the acoustic score. The language model 350 may be trained on corpora of examples of language usage. In accordance with an embodiment, the language model 350 may output a transcription, i.e., the resultant text, with the single highest language model score. In accordance with an embodiment, the language model 350 may output multiple candidate transcriptions, i.e., multiple instances of the resultant text, and corresponding transcription scores, each of which may be processed to determine the most probable intent. The language model 350 may be based on n-gram models (which computes probabilities of sequences of N number of tokens), or NN models with long-term recurrence. Thus, the output of the language model 350 may be a single textual representation of the speech, an N-best list including multiple hypotheses and respective scores, lattice, and the like.

Thus, the speech recognition engine 342 may be configured to convert the received speech signals to corresponding resultant text for further analysis by the NLP engine 320. In other words, the speech recognition engine 342 may enable real-time transcription of audio streams corresponding to the uttered speech signals into the corresponding resultant text, such as sequence of characters (for example, words and strings) or tokens. Thus, the speech recognition engine 342 may be configured to output recognition candidates using a defined speech model and searching for recognizable words based on the extracted features or components. In an exemplary embodiment, the speech model may be information on a character, a unit of phoneme and a feature of each phoneme. Other units of the defined speech model for speech recognition may be a phoneme, a diphone, a triphone, a quinphone, a syllable, and a word. Various non-limiting examples, on which the speech model may be based, may include hidden Markov model (HMM), Dynamic Time Warping (DTW), Artificial Neural Networks (ANN), and the like.

In accordance with an embodiment, the speech recognition engine 342 may be realized as a trained speech recognition engine 342 based on AI engine 316 and the ML engine 314 for accurately processing utterance patterns and text conversion. In accordance with an embodiment, the speech recognition engine 342 may use modules of NLP engine 320, coupled with the acoustic model 344, the language model 350, and the pronunciation dictionary 348 for providing optimized resultant text.

The NLP engine 320 may comprise suitable logic, circuitry, and interfaces that may be configured to process the transcriptions, i.e., the resultant text, from the ASR system 318 and determine the user intent. The user intent may be determined based on collaborative operations performed by various components, such as a morpheme analyzer 352, a grammar module 354, a syntax parser 356, and an intent analyzer 358 on the resultant text.

The morpheme analyzer 352 may classify the resultant text corresponding to the uttered speech signals into a morpheme unit, which is the smallest comprehendible speech unit. Based on the result of the morpheme analyzer 352 and language grammar from the grammar module 354, the syntax parser 356 may segregate the resultant text into a plurality of phrases, such as noun phrases, adjective phrases, verb phrases, the subjects, objects, modifiers, and the like, and may determine the relationship between the each of the plurality of phrases with other phrases from the plurality of phrases. The intent analyzer 358, based on the speech signals, may be configured to derive an intent of the user based on one of a plurality of intent analysis techniques. Non-limiting examples of such intent analysis techniques may include, Named Entity Recognition that is based on grammar rules and supervisor codes, Sentiment analysis that is based on positive, negative or neutral aspects of data, Summarization of Text that is based on graph-based centrality scoring of sentences, Aspect Mining that is based on marking up a word in a corpus as corresponding to a particular part of speech based on its definition and context, Topic Modelling that is based in identification of common words across the topics, and the like.

In accordance with an embodiment, the NLP engine 320 may derive the intent of the user based on a domain, one or more tasks, and one or more parameters required to accomplish the one or more tasks. Examples of the domain (i.e., the field of thought, dialogue, interaction, action, topic of conversation, and the like) may include weather, sports, travel, food, restaurants, hotels, meeting, and the like. Examples of the one or more tasks may include weather update, booking tickets for a sports event, booking a flight, reserving a table or a room, generating a calendar entry, and the like. Examples of the one or more parameters required to accomplish the one or more tasks my include (city name, date, time) for the weather update, (date, time, number of persons) for booking tickets for the sports event, (departure date and time, number of persons, return flight, booking class) for booking a flight, (date, time, number of persons) for reserving a table or a room, (date, time, topic) for generating a calendar entry.

The NLP engine 320 may be further configured to determine an event based on analysis of the plurality of messages using natural language processing techniques. In accordance with an embodiment, the event may correspond to a meeting schedule. In accordance with other embodiments, the event may correspond to a planning a long drive, air travel, dining in a restaurant, staying in a hotel, and the like. The event may be determined based on the words, voice fingerprints, acoustic characteristics, or other parameters determined by the ASR system 318 and keywords extracted from the resultant text.

The user recognizer 322 may be configured to recognize voice and/or acoustic fingerprints in the speech signals uttered by a user. The voice fingerprint may correspond to a set of unique characteristics of a sound (or a voice), such as, variance in frequencies, tempo, average zero crossing rate, average flatness, frequency spectrum, prominent tones, frequency spikes, and the like. The voice fingerprint may be used to distinguish the voice of one user from another user. The user recognizer 322 may analyze one or more voices in the speech signals for various characteristics and generate a fingerprint for corresponding voice of each user. The speech signals that include the one or more voices may be transformed into a spectrogram, which may be analyzed for the unique characteristics of the one or more voices.

The user recognizer 322 may determine the number of voice fingerprints in the speech signals and may also determine which voice fingerprint is speaking a specific word or sentence within the speech signals. Further, the voice fingerprint may be used to identify an identity of the user uttering at least a part of the speech signals. Thus, the voice fingerprint may also be used to authenticate the user.

In accordance with an embodiment, the voice fingerprint template may be formed based on previously gathered audio data associated with the voice of the user and may include characteristics of the voice and stored in the user profile database 332. The voice fingerprint template may be updated or adjusted based on additional audio data associated with that user's voice as the audio data is being captured. The user recognizer 322 may compare the voice fingerprint found in the speech signals with the voice fingerprints template stored in the user profile database 332 and may determine whether the voice of the user uttering the speech signal is the speaker of voice fingerprint template.

The consent detection engine 324 may comprise suitable logic, circuitry, and interfaces that may be configured to detect an immediate consent or dissent of the first user 106*a* or the second user 106*b* at a defined timestamp during the personal interaction. The immediate consent or dissent of the first user 106*a* or the second user 106*b* may be based on at least one of the comparison of the confidence score of the speech recognition and the intent of the first user 106*a* and the second user 106*b* with a threshold value, one or more explicit or implied keywords from the uttered speech signals, and an extent of deviated values of the biometric data.

In accordance with an embodiment, the confidence score may be determined based on an intent of both of the first user 106*a* and the second user 106*b*, current sensor data, and a new set of user characteristics predicted for the first user 106*a* and the second user 106*b* during the personal interaction. The confidence score may indicate a level of confidence that the detected immediate consent response from the first user 106*a* or the second user 106*b* is affirmative or negative. In case the confidence score exceeds the threshold value, it is implied that the first user 106*a* or the second user 106*b* is consenting for one or more activities performed during the personal interaction. On the contrary, if the confidence score does not exceed the threshold value, it is implied that the first user 106*a* or the second user 106*b* is not consenting for one or more activities performed during the personal interaction. Accordingly, the consent detection engine 324 may detect the immediate consent or dissent of the first user 106*a* or the second user 106*b* at a defined timestamp during the personal interaction.

In accordance with an embodiment, the consent detection engine 324, in conjunction with the ML engine 314, may determine the confidence score based on a statistical classification technique. Examples of the statistical classification technique may include, but are not limited to, a maximum-entropy classifier, a logistic regression classifier, a Naive Bayes classifier, and a support vector machine.

The consent validation engine 326 may comprise suitable logic, circuitry, and interfaces that may be configured to validate the detected immediate consent or dissent of the first user 106*a* or second user 106*b* based on a plurality of criteria. The plurality of criteria for the validation of the detected immediate consent or dissent of the first user 106*a* or the second user 106*b* may comprise at least an informed, freely given, reversible, enthusiastic, and specific agreement between the first user 106*a* and the second user 106*b* to perform one or more activities during the personal interaction. The In accordance with an embodiment, the validation of the immediate consent or dissent may be evaluated based on a weighted scoring method. The method may include computing a plurality of weights using training data and machine learning techniques by the ML engine 314. The plurality of criteria may be weighted, where the weight signifies the absolute/relative significance of the criterion. In accordance with an embodiment, the weights may be adjusted automatically, using known methods of supervised training. Accordingly, a weighted combination (for example a weighted average) may be computed that may indicate a validation score.

The task manager 328 may be configured to generate one or more tasks and execute various application programs and services based on the determined event. The event may be determined based on the words, voice fingerprints, acoustic properties, negation keywords, or other parameters determined by ASR system 318 and the NLP engine 320. For example, the NLP engine 320 may determine that the users intend to catch up and dine together based on the voice fingerprints, such as "Cool, then we should meet tomorrow for dinner and chat more." Accordingly, the task manager 328 may generate a first set of tasks, for example, fixing a meeting schedule in the electronic calendars associated with each of the participating users, book a nearby restaurant for dinner the next day, and generate reminders for both the users one hour prior to the scheduled time.

In accordance with an embodiment, the determined event may correspond to a dissent of the first user 106*a* or the second user 106*b*. In such case, the task manager 328 may be configured to perform a one or more tasks from the second set of tasks based on the validation of the detected dissent of the first user 106*a* or the second user 106*b* for performing an activity during the personal interaction in the real time. Non-limiting examples of such tasks from the second set of tasks may include, dialing an emergency number of current location, dialing a number of an emergency contact person, or activating an emergency alarm sound.

In accordance with an embodiment, upon a user request of the first user 106*a* or the second user 106*b*, the task manager 328 may be configured to publish a detailed report of the plurality of messages exchanged by the two users and time sequence-based recording of conversation incurred during the personal interaction. The detailed report may be generated based on the output of the CMS 110, such as validation of a detected dissent of the first user 106*a* or the second user 106*b*. The task manager 328 may be configured to determine additional information associated with the published report. Examples of the additional information determined may include, but are not limited to, number of interacting users, the identities the interacting users, type of the interaction (i.e., whether the interaction is a seminar, lecture, business discussion, interview, or a personal interaction), the mood of the users during the interaction (i.e., monotonous, exciting, angry, seductive, highly stimulating, sad, or coercive), the duration of the interaction, the date and time of the interaction, and the like. The additional information may be determined based on the plurality of messages, uttered speech signals, words, voice fingerprints, acoustic properties, or other parameters.

The detailed report may include keywords, key sentences, paraphrased sentences of main pointers, bullet-point phrases, and the like, pertaining to the personal interaction of the first user 106a or the second user 106b. One portion, i.e., the summary portion, of the detailed report may provide a brief account of the personal interaction, which may enable a reader to understand the context, main pointers, and/or significant events during the personal interaction of the first user 106a or the second user 106b. In some scenarios, sentences from the personal interaction may be double quoted and then paraphrased, or new sentences may be generated, to include or provide context to keywords. The keywords may be identified based on whether it is spoken by a key user or based on acoustic properties or other parameters associated with the speech session.

The alert engine 330 may comprise suitable logic, circuitry, and interfaces that may be configured to generate an alert related to various senses, such as visual, auditory, tactile senses, and the like, for the exemplary electronic device 202. The generated alerts may be transmitted by the second network interface 302 to the first network interface 204 of the exemplary electronic device 202. Various examples of the alert may include a display alert, a sound alert, a haptic alert, an optical alert, and the like.

In accordance with an embodiment, the alert engine 330 may render such alerts, for example, display alert, a sound alert, a haptic alert, an optical alert, and the like, at various units of the exemplary electronic device 202. For example, the display alert, in form of alert messages, may be displayed at the user interface of the application program 112 presented on the display unit 220a of the exemplary electronic device 202. The sound alert, in form of buzzers or beeps, may be reproduced by the sound output unit 220b of the exemplary electronic device 202. The haptic alert, in form of various tactile effects, for example a vibration, may be reproduced by the haptic unit 220c. The optical alert, in form of flashlight, may be reproduced by the optical unit 220d of the exemplary electronic device 202. Such alerts may be reproduced at the exemplary electronic device 202 while, for example, receiving a message, receiving a call signal, a missed call, an alarm, a schedule notification, receiving an email, receiving information through the application program 112, receiving a consent response, execution of the first and the second set of tasks, and the like.

The user profile database 332 may store multiple user profiles for the plurality of users 106 registered with the CMS 110. The user profile may store information about each user from the plurality of users 106, for example, a name, an age, a location, a family size, an income, a work indicator, a preference of living environment, a browsing history, biometric data, social media data (i.e., a plurality of media shared, liked or tagged, content posts, tweets, and information relating to the social media contacts), one or more deep learning factors derived from pictures or visual descriptions, or any combination thereof. The user profile database 332 may further store current set of user characteristics identified based on time sequence-based user interactions and the uttered speech signals of each user during the personal interaction. Examples of such current user characteristics may include current state of, for example, geographical origin, behaviour, state of mind, mental health, physical health, level of intoxication, moods and emotions, sleepiness and fatigue, personality traits (for example, sociability, activity, aggression-hostility, impulsive sensation seeking, and neuroticism-anxiety), and the like. The user profile database 332 may further store a new set of user characteristics predicted for the users during corresponding personal interactions. The new set of user characteristics may be predicted based on time sequence-based personal interaction data, training data set, and artificial neural network. Examples of the new set of user characteristics may include predicted state of, for example, behaviour, state of mind, mental health, physical health, level of intoxication, moods and emotions, sleepiness and fatigue, personality traits (for example, sociability, activity, aggression-hostility, impulsive sensation seeking, and neuroticism-anxiety), and the like.

The task list database 334 may store data about a list of actionable items, operations or functions that may be performed by the CMS 110 in response to the validation of consent or dissent of a user during the physical interaction based on the uttered speech signals. The task list database 334 may sore all the possible first and the second set of tasks. For example, an actionable item, operation, or function may correspond to creating an event or appointment on electronic calendars of both the first user 106a and the second user 106b when the both the first user 106a and the second user 106b agree for a physical interaction. In other examples, the actionable item, operation, or function may correspond to one of dialing an emergency number of current location, dialing a number of an emergency contact person, or activating an emergency alarm sound, upon the validation of dissent detected about the second user 106b. In yet another example, an actionable item, operation, or function may correspond to publishing, based on a user request by the first user or the second user, a time sequence-based recording of conversation incurred during the personal interaction. In accordance with an embodiment, the data corresponding to the first and the second set of tasks may include various metadata, such as date, timelines, a submission method, topic, subject, notes, personnel responsible, and the like.

The consent database 336 may store a plurality of records pertaining to an indicia of a plurality of consent requests, consent responses, and a chain of consent negotiations and associated metadata. Each record from the plurality of records may provide an indication of a plurality of aspects, for example, the user who requested consent, a user who responded to the request, a sequence of consent requests and responses that occur during consent negotiation between two users, type of response (for example, acceptance or rejection to the consent request), the date/time of the consent request and the consent response generated, and any task that was executed based on an immediate consent or dissent of a user. Each record may be securely stored in the consent database 336 based on one or more encryption techniques, for example, Transparent/External database encryption, Column-level encryption, Field-level encryption, Filesystem-level encryption, Full disk encryption, Symmetric and asymmetric database encryption, and Application-level encryption.

The additional database 338 may store training data sets (from existing files) that are used by one or more training modules in the ML engine 314 to train various models, such as the acoustic model 344, the language model 350, or other such transcription models. The training modules may include machine learning algorithms, such as, but not limited to, deep learning neural networks, artificial neural networks, various statistical classifiers, gradient boosting, random forests, support vector machine learning, decision trees, variational auto-encoders (VAE), and generative adversarial networks.

The additional database 338 may be periodically updated with data from recently run models via an accumulator (not shown). In accordance with an embodiment, the training data set may not have a corresponding transcript. In such case, a human transcription may be obtained to serve as the ground truth that may refer to the accuracy of the classification of the training data set. In accordance with an embodiment, the training module may train a transcription model using previously generated training data sets. In accordance with an embodiment, the training module may train a transcription model using both existing historical training data and the most recent transcribed data.

It may be noted that the user profile database 332, the task list database 334, the consent database 336, and the additional database 338 may be implemented using various types of data storage technologies and standards, for example, ROM, RAM, DRAM, SRAM, SDRAM, magnetic random-access memory (MRAM), solid state, two and three-dimensional memories, Flash®, and other such memory devices.

It should be noted that all or parts of hardware components of the various sub-systems of the CMS 110 disclosed herein may readily be provided in a system-on-a-chip (SoC), including a central processing unit (CPU) package. In accordance with an embodiment, the SoC may correspond to an integrated circuit (IC) that integrates components of a computer or other electronic system into a single chip. The SoC may contain digital, analog, mixed-signal, and radio frequency functions, all of which may be provided on a single chip substrate. Other embodiments may include a multi-chip-module (MCM), with multiple chips located within a single electronic package and configured to interact closely with each other through the electronic package. In accordance with another embodiment, the computing functionalities of the CMS 110 disclosed herein may be implemented in one or more silicon cores in a RISC processor, an ASIC processor, a CISC processor, FPGAs, and other semiconductor chips, processors, or control circuits.

It should be noted that the terms "processor" or "microprocessor" include not only a traditional microprocessor (such as Intel's® industry-leading x86 and x64 architectures), but also graphics processors, matrix processors, and any ASIC, FPGA, microcontroller, DSP, programmable logic device, PLA, microcode, instruction set, emulated or virtual machine processor, or any similar device, combination of devices, or logic elements (hardware or software) that permit the execution of instructions.

In operation, a secure communication channel may be established as the application program 112 is downloaded and installed at the plurality of electronic devices 104. The secure communication channel may be established between each instance of the first network interface 204 of the exemplary electronic device 202, such as the first electronic device 104a and the second electronic device 104b, and the second network interface 302 of the CMS 110. The secure communication channel may be realized within the wide area network 118b using a plurality of secure communications protocols. Examples of the secure communications protocols may include, but are not limited to, Secure Socket Layer (SSL), Transport Layer Security (TLS), Swipe IP Security Protocol (SWIPE), Secure Remote Procedure Call (S-RPC), Challenge Handshake Authentication Protocol (CHAP), Extensible Authentication Protocol (EAP), and the like.

Once the secure communication channel is established, the second processor 312 in conjunction with the second network interface 302 of the CMS 110 may receive detailed information, pertaining to the plurality of users 106, from the plurality of electronic devices 104, via the secure communication channel. The detailed information may be captured at the plurality of electronic devices 104 through the user interface of the application program 112 presented at each of the plurality of electronic devices 104 during registration.

Based on the detailed information, pertaining to the plurality of users 106, received from the plurality of electronic devices 104, the second processor 312 in conjunction with the ML engine 314, and the AI engine 316 of the CMS 110, may generate a plurality of user profiles. Each of the plurality of user profiles includes a name, an age, a location, a family size, an income, a work indicator, a preference of living environment, a browsing history, one or more deep learning factors derived from pictures or visual descriptions, or any combination thereof. The second processor 312 of the CMS 110 may store the plurality of user profiles in the user profile database 332.

In accordance with an embodiment, the first user 106a may select a second user profile of the second user 106b, via the user interface of the application program 112 presented at the first electronic device 104a. For the selection of the second user profile of the second user 106b by the first user 106a, the second processor 312 in conjunction with the ML engine 314 and the AI engine 316 of the CMS 110, may recommend the second user profile of the second user 106b to the first user 106a via the user interface of the application program 112 presented at the first electronic device 104a. The second user profile of the second user 106b may be recommended based on a plurality of options presented by the user interface of the application program 112. Accordingly, the second profile of the second user 106b may be selected by the first user 106a based on user preferences of the first user 106a. In accordance with another embodiment, the second processor 312 of the CMS 110, may search the second user profile of the second user 106b from the plurality of user profiles based on one or more search terms provided by the first user 106a at the user interface of the application program 112 presented at the first electronic device 104a. In accordance with another embodiment, the second processor 312 in conjunction with the ML engine 314 and the AI engine 316 of the CMS 110, may generate rating factors for other users from the plurality of users 106 based on one or more machine learning models. The rating factor may comprise a probability of a user interaction of the first user 106a with another user from the plurality of users 106. The second processor 312 in conjunction with the ML engine 314 and the AI engine 316 of the CMS 110, may recommend the second user profile of the second user 106b based on ranking of the rating factors for the other users from the plurality of users 106.

In accordance with an embodiment, the second processor 312 of the CMS 110 may enable the first electronic device 104a and the second electronic device 104b to exchange a plurality of messages prior to the personal interaction between the first user 106a and the second user 106b. Each of the plurality of messages may comprise identification information associated with the first user 106a and the second user 106b, and a payload comprising a plurality of text-based messages, voice-based messages, and video messages.

In accordance with an embodiment, the second processor 312 of the CMS 110 may receive, via the secure communication channel, a consent request from the first electronic device 104a associated with the first user 106a based on a selection of the second user profile of the second user 106b by the first user 106a. The consent request may correspond to a mutual agreement to perform one or more activities during the personal interaction between the first user 106a and the second user 106b. The second processor 312 of the CMS 110 may transmit, via the secure communication channel, the consent request to the second electronic device 104b. The second processor 312 of the CMS 110 may receive, via the secure communication channel, the consent response from the second electronic device 104b based on options selected or data provided by the second user 106b on the consent request generated by the first user 106a. In accordance with an embodiment, the second processor 312 of the CMS 110 may facilitate multiple rounds of consent request and responses, referred to as a consent negotiation, between the first user 106a and the second user 106b until accepted by both of the first user 106a and the second user 106b on a set of terms, conditions, and clauses acceptable to both.

In accordance with an embodiment, the CMS 110 may determine an event based on analysis of the plurality of messages using natural language processing techniques. Corresponding to the event, a first set of tasks may be generated for the personal interaction between the first user 106a and the second user 106b. The first set of tasks generated corresponding to the event may comprise at least generating a calendar entry for both of the first user 106a and the second user 106b for scheduling the personal interaction and booking a meeting venue for the personal interaction.

In accordance with an embodiment, the CMS 110 may enable the first user 106a and the second user 106b for a direct exchange of one or more identity confirmation messages via corresponding user interfaces of an application program presented at the first electronic device 104a and the second electronic device 104b respectively, during or prior to the personal interaction between the first user 106a and the second user 106b.

The CMS 110 may receive, during a personal interaction between the first user 106a and the second user 106b, uttered speech signals and sensor data of at least the first user 106a from at least the first electronic device 104a, via the secure communication channel. The personal interaction may be scheduled based on the acceptance of the consent request by the first electronic device 104a or the second electronic device 104b. In accordance with an embodiment, the uttered speech signals may be extracted from a conversation between the first user 106a and the second user 106b during the personal interaction.

The CMS 110 may identify a current set of user characteristics based on time sequence-based user interactions and the uttered speech signals of each user during the personal interaction. The current set of user characteristics may be utilized as a training data set for the prediction of the new set of user characteristics. The CMS 110 may predict a new set of user characteristics for the first user 106a and the second user 106b during the personal interaction based on time sequence-based personal interaction, the training data set, and an artificial neural network model. In accordance with an embodiment, the prediction of the new set of user characteristics may be further based on social media data of the first user 106a and the second user 106b collected from one or more public information databases. The social media data may include a plurality of media shared, content posts, social media contacts having a predefined social media distance between user accounts and information relating to the social media contacts.

The CMS 110 may determine a confidence score based on an intent of both of the first user 106a and the second user 106b, current sensor data and the new set of user characteristics predicted for the first user 106a and the second user 106b during the personal interaction. The CMS 110 may further detect an immediate consent or an immediate dissent of one of the first user 106a or the second user 106b at a defined timestamp during the personal interaction based on at least one of a comparison of the confidence score with a threshold value, one or more explicit or implied keywords from the uttered speech signals, and an extent of deviated values of the sensor data. The CMS 110 may further validate the immediate consent or the immediate dissent of one of the first user 106a or the second user 106b based on a plurality of criteria. In accordance with an embodiment, the plurality of criteria for the validation of the immediate consent or dissent of the first user 106a or the second user 106b may comprise at least informed, freely given, reversible, enthusiastic, and specific agreement between the first user 106a and the second user 106b to perform one or more activities during the personal interaction.

In accordance with an embodiment, the CMS 110 may override the acceptance on the consent request by the immediate dissent one of the first user 106a or the second user 106b for performing an activity during the personal interaction. The CMS 110 may perform a second set of tasks based on the validation of the immediate dissent of one of the first user 106a or the second user 106b. In accordance with an embodiment, the CMS 110 may publish, based on a user request, a time sequence-based recording of conversation incurred during the personal interaction. The published time sequence-based recording of the conversation incurred during the personal interaction may correspond to one of the second set of tasks. Further, other tasks from the second set of tasks performed based on the validation of the immediate dissent of one of the first user 106a or the second user 106b may comprise dialing an emergency number of current location, dialing a number of an emergency contact person, or activating an emergency alarm sound.

Figure 4A:
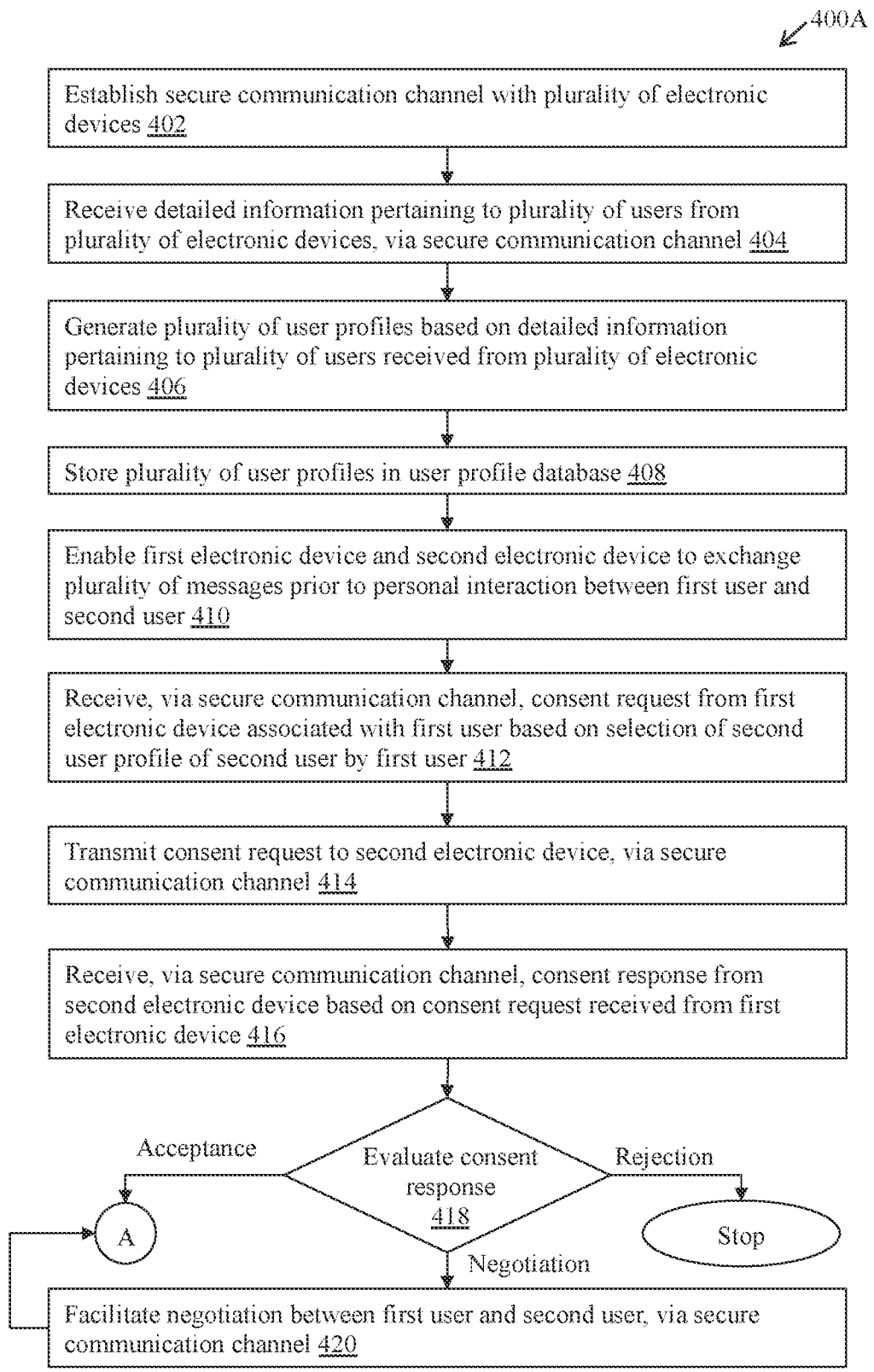
FIGS. 4A, 4B, and 4C depict flowcharts that collectively illustrate exemplary operations for consent detection and validation, in accordance with various embodiments of the disclosure.
Figure 4B:
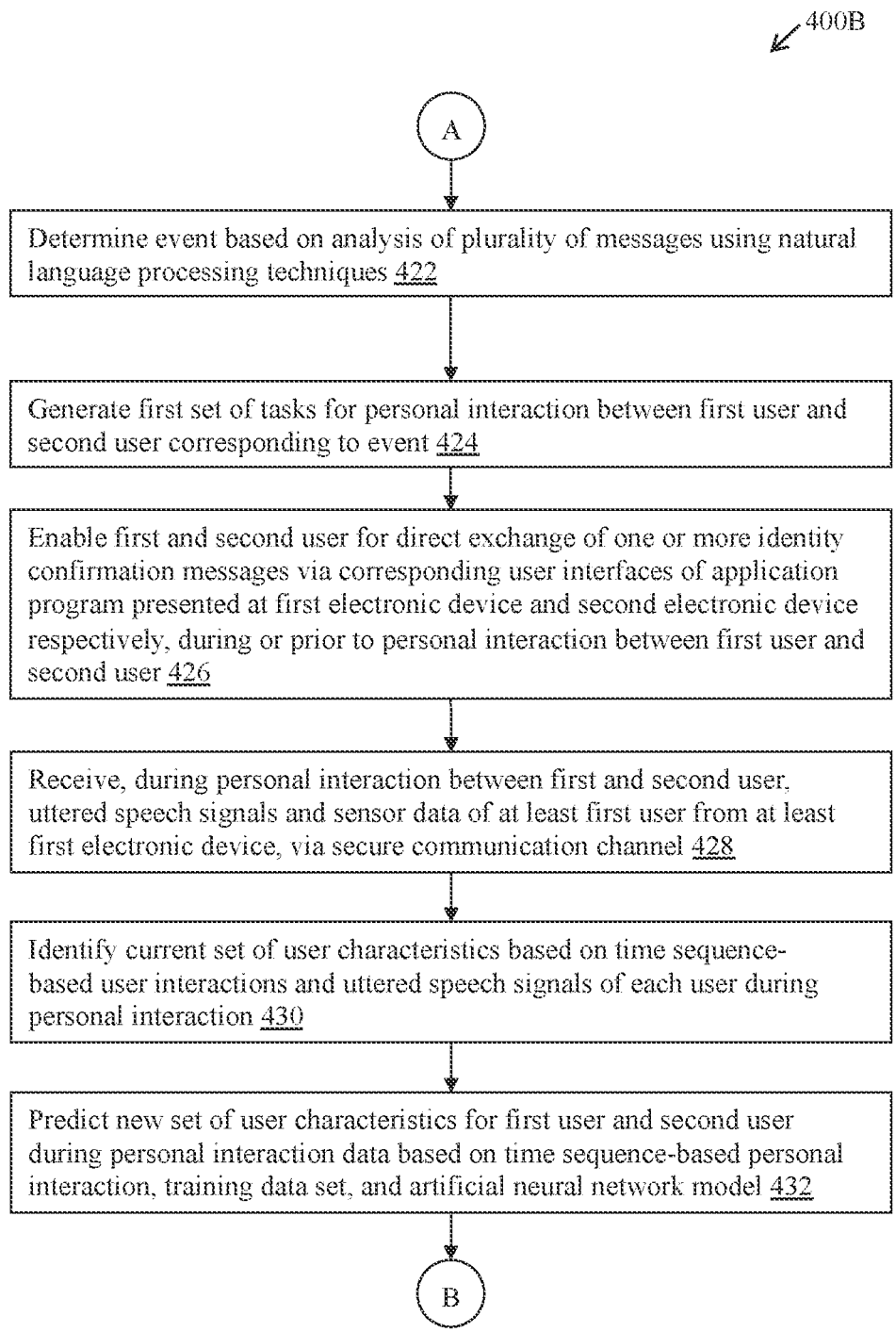
Figure 4C:
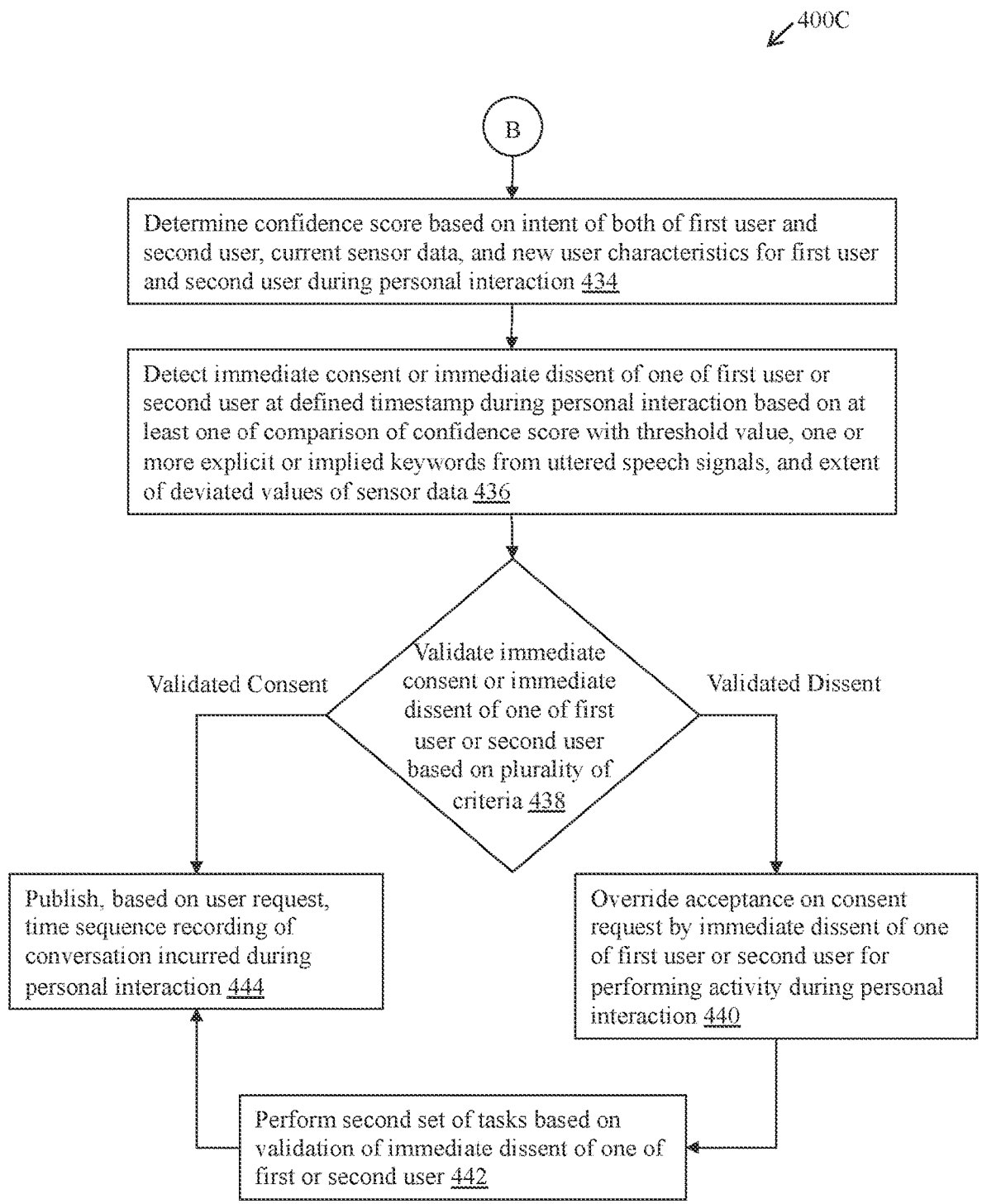

FIGS. 4A, 4B, and 4C depict flowcharts 400A, 400B, and 400C respectively, that collectively illustrate exemplary operations for consent detection and validation, in accordance with various embodiments of the disclosure. FIGS. 4A, 4B, and 4C are described in conjunction with FIGS. 1, 2A to 2C, 3A, 3B, and 5A to 5D.

At 402, a secure communication channel with the first electronic device 104a and the second electronic device 104b may be established. In accordance with an embodiment, the second processor 312 in the CMS 110 may be configured to establish the secure communication channel between the second network interface 302 of the CMS 110 and the first network interface 204 of both of the first electronic device 104a and the second electronic device 104b based on one or more secure communications protocols, for example, SSL, TLS, SWIPE, Secure S-RPC, CHAP, EAP, and the like.

In accordance with an embodiment, the second processor 312 in the CMS 110 may be configured to establish the secure communication channel with the first electronic device 104a and the second electronic device 104b based on, for example, a web-server operating Hyper Text Transfer Protocol Secure (HTTPS) protocol or a virtual private network (VPN) connection. Such a secure communication channel may guarantee the confidentiality and integrity of the data communicated between the CMS 110 and the plurality of electronic devices 104, such as the first electronic device 104a and the second electronic device 104b.

In accordance with an embodiment, the secure communication channel may be established when the plurality of electronic devices 104, such as the first electronic device 104a and the second electronic device 104b, may download and install the application program 112, referred to as an "app", that facilitates a variety of functionalities for the associated plurality of users 106. Examples of such functionalities may include, but are not limited to, enabling the first user 106a to search the user profile of the second user 106b, recommending the user profile of the second user 106b to the first user 106a, various modes of electronic communication between the first user 106a and the second user 106b (such as managing consent requests, exchanging text messages, facilitating personal email, phone calls, video calls, and the like), various tasks (such as recording, processing, analyzing, and publishing the conversation between the first user 106a and the second user 106b during a personal interaction), generating alerts in response to detection of an immediate dissent of the first user 106a or the second user 106b, and the like.

Once the secure communication channel is established, the application program 112 may synchronize the CMS 110 with the plurality of electronic devices 104, such as the first electronic device 104a and the second electronic device 104b. Accordingly, the second processor 312 of the CMS 110 may automatically configure the settings of the plurality of electronic devices 104, such as the first electronic device 104a and the second electronic device 104b. The second processor 312 of the CMS 110 may also enable an administrator to control the functionality of the plurality of electronic devices 104. Also, during synchronization, data collected, generated, and stored by the plurality of electronic devices 104 may be received by the second processor 312 in conjunction with the second network interface 302 of the CMS 110, via the secure communication channel, and may be later on accessed by the administrator.

At 404, detailed information, pertaining to the plurality of users 106, may be received from the plurality of electronic devices 104, via the secure communication channel. In accordance with an embodiment, the second processor 312 in conjunction with the second network interface 302 of the CMS 110, may be configured to receive the detailed information, pertaining to the plurality of users 106, from the plurality of electronic devices 104, via the secure communication channel. The detailed information, pertaining to the plurality of users 106, may be captured at the plurality of electronic devices 104 through the user interface of the application program 112 presented at each of the plurality of electronic devices 104 during registration. In accordance with an embodiment, the detailed information may be received cryptographically by the second network interface 302, via the wide area network 118b, for security purposes.

Prior to the receipt of the detailed information, each of the plurality of users 106 may be required to be registered with the CMS 110 using the application program 112, via the secure communication channel of the wide area network 118b. The plurality of users 106 may be required to be registered with the CMS 110 once the application program 112 is downloaded and installed at each of the plurality of electronic devices 104. During the registration, also referred to as the sign-up process or user/device enrolment, a plurality of editable and selectable options and/or questionnaire may be presented at the display unit 220a of each of the plurality of electronic devices 104, via the user interface of the application program 112. For registration, each of the plurality of users 106 may operate one or more associated devices, each corresponding to the input unit 218, for example, a keyboard, a touch key, mouse, and the like, in the exemplary electronic device 202, such as the first electronic device 104a and the second electronic device 104b. The input unit 218 may be operated by an associated user to manipulate the plurality of editable and selectable options and/or answer the questionnaire to provide the detailed information. For example, the user interface of the application program 112 presented at the first electronic device 104a may receive the detailed information pertaining to the first user 106a. Similarly, the user interface of the application program 112 presented at the second electronic device 104b may receive the detailed information pertaining to the second user 106b. The detailed information may include name, age, a location, a family size, an income, a work indicator, a preference of living environment, a browsing history, and the like, pertaining to the corresponding user.

In accordance with an embodiment, the detailed information may further include biometric data pertaining to each of the plurality of users 106 during the registration. In such an embodiment, the sensing unit 216 in the exemplary electronic device 202, such as the first electronic device 104a and the second electronic device 104b, may be configured to detect information about an associated user, such as the first user 106a and the second user 106b, respectively. The first processor 214 may be configured to digitize the information according to a software-defined template and use the same template for comparison and unique identification/recognition of the user for biometric authentication. New-age security systems do not hesitate to rely solely on such biometric authentication, eliminating the need for the user to remember passwords or carry security tokens. When a user requests access, a new sample of biometric data may be collected by the sensing unit 216 in the exemplary electronic device 202. In an embodiment, the first processor 214 may be configured to compare the new sample of biometric data with the stored templates to determine if the user is authorized or not. In accordance with another embodiment, the first processor 214, in conjunction with the first network interface 204, may be configured to transmit the new sample of biometric data to the CMS 110. In such case, the second network interface 302 may be configured to receive the new sample of the biometric data of the user and the second processor 312 may be configured to compare the new sample of biometric data with the stored templates from the user profile database 332. Matching with the stored templates determines whether the user identity is authorized or not.

As described above, the biometric data may include one or more of the morphological biometric data, bio-signals, behavioral biometric data, and biological biometric data corresponding to the associated user. Examples of the biometric data may include, but not limited to, voice identification, retinal identification, facial identification, fingerprint identification, electroencephalogram-based identification, hand expressions, facial expressions, vocal expressions, body gestures, eye tracking, and the like. Primarily, a set of such biometric data, such as the morphological biometric data, may be used for device security and user authentication. Other biometric data, such as the bio-signals, the behavioral biometric data, and the biological biometric data, may be detected in real time during the later operational steps of the CMS 110.

At 406, a plurality of user profiles may be generated based on the detailed information, pertaining to the plurality of users 106, received from the plurality of electronic devices 104. In accordance with an embodiment, the second processor 312 in conjunction with the ML engine 314, the AI engine 316, and the NLP engine 320 of the CMS 110, may be configured to generate the plurality of user profiles based on the detailed information, pertaining to the plurality of users 106, received from the plurality of electronic devices 104. The user profile may include the name, age, location, a family size, an income, a work indicator, a preference of living environment, educational background, a browsing history, biometric data, and the like.

In accordance with an embodiment, the ML engine 314 and the AI engine 316 may be configured to derive one or more deep learning factors from pictures or visual descriptions, or any combination thereof for the user profile. In accordance with an embodiment, the NLP engine 320 may be configured to search for unstructured data and perform NLP analysis of data obtained from, for example, social network sites where the user is identified as a subject of a conversation for the user profile.

Accordingly, the generated user profile may include a variety of information, such as a first type of information provided directly by the user, a second type of information derived or inferred from the data associated with the user, and a third type of information determined based on NLP analysis of the unstructured data associated with the user. The aggregation of the first type of information, the second type of information, and the third type of information may be used to generate the user profile of each of the plurality of users 106.

At 408, the plurality of user profiles may be stored in the user profile database 332. In accordance with an embodiment, the second processor 312 of the CMS 110 may be configured to store the plurality of user profiles in the user profile database 332. The user profile database 332 may be implemented with any desirable database architecture known in the art, such as a relational database, an object-oriented database, and/or one or more tables. In accordance with various embodiments, the user profile database 332 may be hosted by the CMS 110 and/or on one or more remote computing systems accessible via the wide area network 118b.

Once the plurality of user profiles is stored in the user profile database 332, the first user 106a may be enabled to select the second user profile of the second user 106b, via the user interface of the application program 112 presented at the first electronic device 104a. In accordance with an embodiment, the second processor 312 in conjunction with the ML engine 314 and the AI engine 316 of the CMS 110, may be configured to perform the selection of the second user profile of the second user 106b for the first user 106a. Accordingly, the second user profile of the second user 106b may be recommended by the recommendation engine 316b of the AI engine 316 to the first user 106a, via the user interface presented at the first electronic device 104a. Based on the recommendation, the second user profile of the second user 106b may selected for the first user 106a.

In various embodiments, a plurality of options and/or a guided questionnaire may be presented by the user interface of the application program 112 at the first electronic device 104a of the first user 106a in order to obtain the user preferences of the first user 106a. The first user 106a may provide the user preferences by selecting one or more of the plurality of options and suitably responding to the guided questionnaire based on the user preferences of the first user 106a. Such user preferences of the first user 106a may be matched with the user profiles of other users from the plurality of users 106 in the user profile database 332.

Accordingly, the user profile database 332 may be searched for the user profiles that match the user preferences of the first user 106a, and the second user profile of the second user 106b may be outputted from the user profile database 332 that matches the user preferences of the first user 106a within a given threshold. In various embodiments, multiple user profiles may be ranked by how closely they match the user preferences of the first user 106a. In this manner, the second processor 312 in conjunction with the ML engine 314 and the AI engine 316 of the CMS 110, may enable the first user 106a to find another user (i.e., the second user 106b) with whom the first user 106a may be most compatible with and with whom the first user 106a is most likely to otherwise have satisfying personal (or professional) relationship.

In accordance with another embodiment, the second processor 312 of the CMS 110 may be configured to search the user profile of the second user 106b based on one or more terms provided by the first user 106a at the user interface of the application program 112 presented at the first electronic device 104a. The first user 106a may provide one or more search terms, such as name, age, location, one or more user preferences in the search tab provided at the user interface of the application program 112. Such search terms may be matched by the second processor 312 with the user profiles of other users from the plurality of users 106. Accordingly, the second processor 312 may search the user profile database 332 for the user profiles that match the user preferences of the first user 106a and output the second user profile of the second user 106b from the user profile database 332 that closely matches the user preferences of the first user 106a.

In accordance with another embodiment, the second processor 312 in conjunction with the ML engine 314 and the AI engine of the CMS 110, may be configured to identify the user profiles and time sequence of user interactions of the first user 106a and other users from the plurality of users 106. The user profiles of the first user 106a and the other users from the plurality of users 106 may include the historical data retrieved from the user profile database 332. The time sequence of user interactions may include clicking on a display element on social networking sites and other websites, commenting on a post, tagging a post, sharing a post, liking a post, or any combination thereof, by each of the first user 106a and other users from the plurality of users 106.

In accordance with an embodiment, the second processor 312 in conjunction with the ML engine 314 and the AI engine 316, may be configured to generate rating factors for other users from the plurality of users 106 based on one or more machine learning models retrieved from the additional database 338. The rating factor may comprise a probability of a user interaction of the first user 106a with each of the other users from the plurality of users 106. The one or more machine learning models may include, for example, multi-Layer perceptron, Adaboost, Logistic Regression, Gradient Boosting Tree, Reverse Boltzman Machine, Random Forest, K Nearest Neighbor models, and/or the like. Based on ranking of the generated rating factor for the other users from the plurality of users 106, the second processor 312 in conjunction with the ML engine 314 and the AI engine 316, may be configured to recommend the second user profile of the second user 106b to the first user 106a. In accordance with an embodiment, the ML engine 314 and the AI engine 316 may be configured to monitor the user activity of the first user 106a and use the data to improve the machine learning model over time. For example, the ML engine 314 and the AI engine 316 may determine whether the second user 106*b* is preferable to the first user 106*a*. If the first user 106*a* chooses to select the second user profile of the second user 106*b*, the interest of the first user 106*a* may be collected as a data point and added to a set of training data. The previous machine learning model may be loaded from a saved state and updated according to the augmented training data. In certain examples, a threshold amount of data points may be collected prior to generating the machine learning model.

At 410, an exchange of a plurality of messages between the first electronic device 104*a* and the second electronic device 104*b* may be enabled prior to the personal interaction between the first user 106*a* and the second user 106*b*. In accordance with an embodiment, the second processor 312 of the CMS 110 may be configured to enable the exchange of the plurality of messages between the first electronic device 104*a* and the second electronic device 104*b* prior to the personal interaction between the first user 106*a* and the second user 106*b*. Each of the plurality of messages may comprise identification information associated with the first user 106*a* and the second user 106*b*, and a payload comprising a plurality of text-based messages, voice-based messages, and video messages.

Via the secure communication channel established between the CMS 110 and the plurality of electronic devices 104, such as the first electronic device 104*a* and the second electronic device 104*b*, the first user 106*a* and the second user 106*b* may securely communicate with each other through chats, text messages, video calls, or voice calls. The plurality of messages may be exchanged between the first electronic device 104*a* and the second electronic device 104*b*, via the secured communication channel, prior to the personal interaction between the first user 106*a* and the second user 106*b*. Each of the plurality of messages may comprise identification information associated with the first user 106*a* and the second user 106*b*, and a payload comprising a plurality of text-based messages, voice-based messages, and video messages. Once the virtual relationship between the first user 106*a* and the second user 106*b* progresses, one of the first user 106*a* or the second user 106*b* may initiate to schedule an in-person meeting or a personal interaction.

At 412, a consent request may be received from the first electronic device 104*a* addressed for the second user 106*b* via the secure communication channel based on a selection of the second user profile of the second user 106*b*. In accordance with an embodiment, the second processor 312 in conjunction with the second network interface 302 of the CMS 110, may be configured to receive the consent request from the first electronic device 104*a* addressed for the second user 106*b* based on a selection of the second user profile of the second user 106*b*. The consent request may be received from the first electronic device 104*a* via the secure communication channel.

Based on a selection of the second user profile of the second user 106*b*, the first processor 214 may be configured to generate the consent request addressed for the second user 106*b*. The consent request may be generated at the first electronic device 104*a* based on a manipulation of a selectable option, such as a software button presented on the user interface of the application program 112 at the first electronic device 104*a*, by the first user 106*a*. The manipulation of the selectable option may present a page for accessing and editing a set of sub-options for creating a mutual agreement. The mutual agreement may pertain to performing one or more activities during a personal interaction between the first user 106*a* and the second user 106*b*. In an exemplary scenario, the mutual agreement may correspond to performing activities with set boundaries, such as kissing and touching only, during a sexual interaction. In another example, the mutual agreement may correspond to intimately engaging in a specific sexual activity in addition to kissing and touching, during the sexual interaction. In yet another example, the mutual agreement may correspond to intimately engaging in several types of sexual activities, during the sexual interaction.

The consent request, thus generated at the first electronic device 104*a* by the first user 106*a*, may be received by the second processor 312 in conjunction with the second network interface 302, via the wide area network 118*b*. The date and time of receipt of the consent request along with other details, such as a unique sender and receiver device identifiers and a location of the first electronic device 104*a*, may be stored in the consent database 336 for future references. In accordance with an embodiment, the first user 106*a* may withdraw the consent request anytime once the consent request (addressed for the second user 106*b*) is generated at the first electronic device 104*a*.

At 414, the consent request may be transmitted to the second electronic device 104*b*, via the secure communication channel. In accordance with an embodiment, the second processor 312 in conjunction with the second network interface 302 may be configured to transmit the consent request to the second electronic device 104*b*, via the secure communication channel of the wide area network 118*b*. In accordance with an embodiment, a notification regarding the transmittance of the consent request to the second electronic device 104*b* may be sent back to the first electronic device 104*a*. The date and time of the receipt from the first electronic device 104*a* and the transmittance of the consent request to the second electronic device 104*b* along with other details, such as the unique sender and receiver device identifiers and the location of the first electronic device 104*a*, may be stored in the consent database 336 for future references.

At 416, a consent response may be received, via the secure communication channel, from the second electronic device 104*b* based on options selected or data provided by the second user 106*b* in response to the consent request generated by first user 106*a*. In accordance with an embodiment, the second processor 312 in conjunction with the second network interface 302 of the CMS 110 may be configured to receive the consent response from the second electronic device 104*b*, via the secure communication channel, based on options selected or data provided by the second user 106*b* in response to the consent request generated by first user 106*a*. In accordance with an embodiment, the second user 106*b* may simply accept or reject the consent request by manipulating selectable options, such as a yes/accept or no/reject/deny software buttons, presented at the user interface of the application program 112 presented at the second electronic device 104*b*. In accordance with an embodiment, the second user 106*b* may negotiate and revise the consent request by editing the terms, conditions, and/or clauses of the mutual agreement in the received consent request. In such an embodiment, the revised consent request may be transmitted back to the CMS 110, via the wide area network 118*b*.

At 418, the consent response may be evaluated. In accordance with an embodiment, the second processor 312 in the CMS 110 may be configured to evaluate the consent response. In an embodiment, the consent response may one of an acceptance, a rejection, or a negotiation by the second user 106b on the consent request generated by the first user 106a.

In accordance with an embodiment, the consent response is a rejection by the second user 106b on the consent request generated by the first user 106a. In such an embodiment, the flowchart 400A terminates. Accordingly, the second processor 312 of the CMS 110 may be configured to send a rejection notification to the first electronic device 104a and the second electronic device 104b, via the wide area network 118b.

In accordance with another embodiment, the consent response is an acceptance by the second user 106b on the consent request generated by the first user 106a. In such an embodiment, the control passes to step 422 in flowchart 400B.

In accordance with yet another embodiment, the consent response is a negotiation (by the second user 106b) on the consent request generated by the first user 106a. In such an embodiment, the control passes to step 420.

At 420, negotiation between the first user 106a and the second user 106b may be facilitated, via the secure communication channel. In accordance with an embodiment, the second processor 312 in the CMS 110 may be configured to facilitate the negotiate between the first user 106a and the second user 106b, via the secure communication channel. In such an embodiment, the consent request may be iteratively revised by one of the first user 106a and the second user 106b until accepted by both of the first user 106a and the second user 106b on a set of terms, conditions, and clauses acceptable to both. For example, upon receiving the consent request from the CMS 110 via the secure communication channel of the wide area network 118b, the second user 106b may revise the consent request by editing the terms, conditions, and/or clauses of the mutual agreement in the received consent request. The revised consent request may be transmitted back to the first electronic device 104a, via the secure communication channel of the wide area network 118b. In response, the first user 106a may accept, reject, or counter-revise the revised consent request received from the second electronic device 104b. Such a negotiation may continue until the first user 106a and the second user 106b reach a common set of terms, conditions, and clauses acceptable to both. The date and time of receipt of the complete chain of negotiations, along with other details, such as unique sender and receiver device identifiers and the locations of the first electronic device 104a and the second electronic device 104b, may be duly stored in the consent database 336 for future references. Control passes to step 422 in flowchart 400B.

At 422 of the flowchart 400B in FIG. 4B, an event may be determined based on an analysis of the plurality of messages using natural language processing techniques. In accordance with an embodiment, the second processor 312 in conjunction with the NLP engine 320 of the CMS 110, may be configured to determine the event based on the analysis of the plurality of messages using natural language processing techniques. For example, the first user 106a may post a text message, "day after tomorrow sounds good for dinner near my office," for the second user 106b. In response to the above message, the second user 106b may post a voice message, "catch you then," for the first user 106a. The second processor 312 in conjunction with the NLP engine 320 may identify an event for a possible meeting based on the analysis of the above two messages using natural language processing techniques.

At 424, a first set of tasks corresponding to the event may be generated for the personal interaction between the first user 106a and the second user 106b. In accordance with an embodiment, the second processor 312 in conjunction with the AI engine 316 of the CMS 110, may be configured to generate a first set of tasks corresponding to the event for the personal interaction between the first user 106a and the second user 106b. For example, based on current date (for example, based on the above exemplary messages exchanged on Jun. 7, 2022, one task from the first set of tasks may be creating a calendar entry dated Jun. 9, 2022, for the electronic calendars of both of the first user 106a and the second user 106b. Further, another task from the first set of tasks may be booking a table for dinner at 8 PM in a restaurant at a location in the vicinity of a current location of the first user 106a. Furthermore, yet another task from the first set of tasks may be booking a cab for the first user 106a from the office location to the restaurant at 7:30 PM. The second processor 312 in conjunction with the AI engine 316 and alert engine 330 of the CMS 110, may be configured to present notifications at the user interfaces of the application program 112 presented at the first electronic device 104a and/or the second electronic device 104b.

At 426, the first user 106a and the second user 106b may be enabled for a direct exchange of one or more identity confirmation messages via corresponding user interfaces of the application program 112 presented at the first electronic device 104a and the second electronic device 104b, during or prior to a personal interaction between the first user 106a and the second user 106b. In accordance with an embodiment, the second processor 312 in conjunction with the second network interface 302 of the CMS 110, may be configured to enable the first user 106a and the second user 106b for a direct exchange of one or more identity confirmation messages during or prior to a personal interaction between the first user 106a and the second user 106b. The one or more identity confirmation messages may be directly exchanged via corresponding user interfaces of the application program 112 presented at the first electronic device 104a and the second electronic device 104b. The one or more identity confirmation messages may facilitate the first user 106a and the second user 106b confirm each other's identity for the personal interaction.

In accordance with an embodiment, the second processor 312 may be configured to the determine that the first user 106a and the second user 106b are meeting for a personal interaction based on the tracking information captured by the application program 112 of both of the first electronic device 104a and the second electronic device 104b. The tracking information may include, for example, date, time, device identifier, and current location of each of the plurality of electronic devices 104. Accordingly, in an event of a common location, date, and time of the first electronic device 104a and the second electronic device 104b from the tracking information captured by the application program 112, the second processor 312 may determine that the first user 106a and the second user 106b are meeting for the personal interaction.

Consequently, the second processor 312 in conjunction with the second network interface 302 may enable the first electronic device 104a and the second electronic device 104b to directly exchange one or more identity confirmation messages to confirm each other's identity for the personal interaction, via the application program 112.

In one example, the application program 112, based on an instruction received from the second processor 312, may activate a biometric sensor, such as a facial scanner, an iris scanner, or a fingerprint scanner, in the sensing unit 216 of one or both of the first electronic device 104a and the second electronic device 104b. For example, the optical sensor of the first electronic device 104a may scan, for example, the face, iris, or the fingerprint, of the second user 106b and the first processor 214 of the first electronic device 104a may transmit the sensor data to the second processor 312 of the CMS 110. The second processor 312 may compare the sensor data with the user profile of the second user 106b stored in the user profile database 332. The second processor 312 may further confirm that the first user 106a and the second user 106b are consenting based on data retrieved from the consent database 336 corresponding to the device identifiers of the first electronic device 104a and the second electronic device 104b. Accordingly, the second processor 312 in conjunction with the alert engine 330, may transmit an identity verification notification to the first electronic device 104a and the second electronic device 104b, via the secure communication channel of the wide area network 118b.

In another example, the application program 112, based on an instruction received from the second processor 312, may activate an optical sensor, such as a camera, in the sensing unit 216 of one or both of the first electronic device 104a and the second electronic device 104b. For example, the optical sensor of the first electronic device 104a may capture an image of an identification document, for example, a driving license or a social security card, of the second user 106b and the first processor 214 of the first electronic device 104a may transmit the image data to the second processor 312 of the CMS 110. The second processor 312 may compare the image data with the user profile of the second user 106b stored in the user profile database 332. The second processor 312 may further confirm that the first user 106a and the second user 106b are consenting based on data retrieved from the consent database 336 corresponding to the device identifiers of the first electronic device 104a and the second electronic device 104b. Accordingly, the second processor 312 in conjunction with the alert engine 330 may transmit an identity verification notification to the first electronic device 104a and the second electronic device 104b, via the secure communication channel of the wide area network 118b.

In another example, the application program 112, based on an instruction received from the second processor 312, may activate an optical sensor, such as a QR code scanner, in the sensing unit 216 of the first electronic device 104a. The QR code may be already sent by the second processor 312 to both of the first electronic device 104a and the second electronic device 104b when the consent response is evaluated by the second processor 312 to be accepted. For example, the QR code scanner of the first electronic device 104a may scan the QR code displayed on the display screen of the second electronic device 104b. The QR scan image data may be transmitted to the second processor 312 of the CMS 110. The second processor 312 may confirm the matching of the QR scan image data and further confirm that the first user 106a and the second user 106b are consenting by retrieving data from the consent database 336 based on the device identifiers of the first electronic device 104a and the second electronic device 104b. Accordingly, the second processor 312 in conjunction with the alert engine 330, may transmit an identity verification notification to the first electronic device 104a and the second electronic device 104b, via the secure communication channel of the wide area network 118b.

In yet another example, the first user 106a and the second user 106b may tap their respective electronic devices with each other or place their respective electronic devices in proximity. Accordingly, the respective accelerometers or the proximity sensors may trigger the application program 112 to transmit the required information, i.e., date, time, location, and the like, to the CMS 110. The second processor 312 may confirm the identities of the consenting first user 106a and the second user 106b based on data retrieved from the user profile database 332 and the consent database 336 corresponding to the device identifiers of the first electronic device 104a and the second electronic device 104b. Accordingly, the second processor 312 in conjunction with the alert engine 330, may transmit an identity verification notification to the first electronic device 104a and the second electronic device 104b, via the secure communication channel of the wide area network 118b.

At 428, during the personal interaction between the first user 106a and the second user 106b, the uttered speech signals and the sensor data of at least the first user 106a may be received from at least the first electronic device 104a, via the secure communication channel. In accordance with an embodiment, the second processor 312 in conjunction with the second network interface 302 of the CMS 110, may be configured to receive, during the personal interaction between the first user 106a and the second user 106b, the uttered speech signals and the sensor data of at least the first user 106a from at least the first electronic device 104a, via the secure communication channel.

In accordance with an embodiment, as the personal interaction between the first user 106a and the second user 106b initiates, the application program 112 installed at one or both of the first electronic device 104a and the second electronic device 104b may activate various devices corresponding to the sensing unit 216 and/or the input unit 218 to capture different types of data associated with the first user 106a and the second user 106b. For example, an optical sensor, such as a camera, may get activated to capture the facial expressions of the first user 106a and the second user 106b. Further, a transducer, such as a microphone, may also get activated to capture the uttered speech signals of both the first user 106a and the second user 106b during the personal interaction. Further, various biometric sensors in the sensing unit 216 may get triggered to measure various bio-signals, psychophysical characteristics or parameters, and behavioral biometric data of both the first user 106a and the second user 106b. All such uttered speech signals and sensor data may be transmitted by the first processor 214 of at least the first electronic device 104a to the second processor 312 of the CMS 110, via the secure communication channel.

At 430, current set of user characteristics may be identified in real-time based on time sequence of user interactions and uttered speech signals of each user during the personal interaction. In accordance with an embodiment, the second processor 312 in conjunction with the AI engine 316, the ASR system 318, the NLP engine 320, and the user recognizer 322 of the CMS 110, may be configured to identify the current set of user characteristics based on time sequence of user interactions and uttered speech signals of each user during the personal interaction.

More specifically, the AI engine 316, the ASR system 318 and the NLP engine 320 may analyze the uttered speech signals and associated emotions during the personal interaction and identify the user characteristics in real-time based on time sequence of user interactions. The user recognizer 322 may analyze the tone, amplitude, and pitch of voice in the uttered speech signals. Accordingly, the second processor 312 in conjunction with the AI engine 316, may correlate each of the uttered speech signals with corresponding user in a time sequence-based manner and store in the user profile database 332.

In accordance with an embodiment, the user characteristics of each user may be identified in real-time based on time sequence of user interactions and uttered speech signals of each user. Examples of such user characteristics of each user may include current state of, for example, geographical origin, behaviour, state of mind, mental health, physical health, level of intoxication, moods and emotions, sleepiness and fatigue, and personality traits (for example, sociability, activity, aggression-hostility, impulsive sensation seeking, and neuroticism-anxiety). For example, current psychological state of the first user 106a may be hesitant due to speech errors and irregularities (such as, number of false and unintelligible words, and interrupts), current level of intoxication is high due to abrupt rhythmic features of speech, current level of physical state may be drugged due to voice hoarseness and additional sounds, like coughs and sniffles, current state of emotion may be disgust based on voice pitch variations, type of words used on the speech and speech energy levels, and the like, may be identified. Various features, for example, speaking rate, loudness, spectral features, and characteristics of linguistic expression, may be applied for the inference of the personality traits.

At 432, new set of user characteristics for the first user 106a and the second user 106b may be predicted during the personal interaction based on time sequence-based personal interaction data, training data set, and artificial neural network. In accordance with an embodiment, the second processor 312 in conjunction with the ML engine 314, the AI engine 316, the ASR system 318, the NLP engine 320, and the user recognizer 322 of the CMS 110, may be configured to predict the user characteristics for the first user 106a and the second user 106b during the personal interaction based on time sequence-based personal interaction data, training data set, and artificial neural network. The current set of user characteristics may be utilized as a training data set for the prediction of the new set of user characteristics. In accordance with an embodiment, the prediction of the new set of user characteristics may be further based on social media data of the first user 106a and the second user 106b collected from one or more public information databases. The social media data may include a plurality of media shared, content posts, social media contacts having a predefined social media distance between user accounts and information relating to the social media contacts.

In accordance with an embodiment, the second processor 312 in conjunction with the ML engine 314, the AI engine 316, the ASR system 318, the NLP engine 320, and the user recognizer 322, may build a prediction model and a model evaluation system, and combine with an artificial neural network algorithm to predict new set of user characteristics for the first user 106a and the second user 106b. For training the prediction model, current set of user characteristics of the first user 106a and the second user 106b identified during the personal interaction may be used for accurate results. The prediction of the new set of user characteristics for the first user 106a and the second user 106b may provide a likelihood that the first user 106a and the second user 106b will successively perform one or more activities during the personal interaction.

At 434 of the flowchart 400C in FIG. 4C, a confidence score may be determined based on intent of each of the first user 106a and the second user 106b, current sensor data, and the new set of user characteristics for the first user 106a and the second user 106b during the personal interaction. In accordance with an embodiment, the second processor 312 in conjunction with the ML engine 314, the AI engine 316, the ASR system 318, the NLP engine 320, and the user recognizer 322 of the CMS 110, may be configured to determine the confidence score based on the intent of each of the first user 106a and the second user 106b, the current sensor data, and the new set of user characteristics for the first user 106a and the second user 106b during the personal interaction.

The intent of the first user 106a and the second user 106b may be derived by the NLP engine 320 based on a domain, one or more tasks, and one or more parameters required to accomplish the one or more tasks. The domain may correspond to performing one or more activities during the personal interaction based on the acceptance of the consent request. Examples of the one or more tasks may include reserving a table or a room, purchasing a present for gifting, playing romantic songs, and the like. Examples of the one or more parameters required to accomplish the one or more tasks my include (date, time, number of persons) for reserving a table or a room, (date, time, type of present) for gifting. The intent of the first user 106a and the second user 106b may be further determined based on the positive conversation between the first user 106a and the second user 106b during the personal interaction. For example, the first user 106a and the second user 106b are willing for a next activity when one activity is performed.

The current sensor data may correspond to the immediate values measured by the sensing unit 216 of both of the first electronic device 104a and the second electronic device 104b. The current sensor data may include, for example, psychophysical characteristics or parameters, movement-related metrics of both the first user 106a and the second user 106b and behavioral identifiers unique to both the first user 106a and the second user 106b.

Based on the intent of each of the first user 106a and the second user 106b, the current sensor data, and the new set of user characteristics for the first user 106a and the second user 106b during the personal interaction, the confidence score may be determined. The confidence score may represent a likelihood that the personal interaction is proceeding in accordance with or against the acceptance of the initial consent request.

In accordance with an embodiment, the second processor 312 in conjunction with the ML engine 314, may determine the confidence score based on a statistical classification technique. Examples of the statistical classification technique may include, but are not limited to, a maximum-entropy classifier, a logistic regression classifier, a Naive Bayes classifier, and a support vector machine.

At 436, an immediate consent or dissent of the first user 106a or the second user 106b may be detected at defined timestamp during personal interaction based on the comparison of confidence score with threshold value, one or more explicit or implied keywords from uttered speech signals, and an extent of deviated values of the sensor data. In accordance with an embodiment, the consent detection engine 324 of the CMS 110 may be configured to detect an immediate consent or dissent of the first user 106a or the second user 106b at the defined timestamp during the personal interaction based on the comparison of the confidence score with the threshold value, one or more explicit or implied keywords from uttered speech signals, and an extent of deviated values of the sensor data.

In accordance with an embodiment, the consent detection engine 324 may be configured to detect the immediate consent of the first user 106a or the second user 106b at the defined timestamp during the personal interaction based on the value of the confidence score exceeding the threshold value, one or more explicit or implied positive keywords from uttered speech signals, and an extent of deviated values of the sensor data being less than a threshold sensor value. In an example, the confidence score representing the likelihood that the personal interaction between the first user 106a and the second user 106b is proceeding in accordance with the acceptance of the initial consent request exceeds the threshold value. Further, one or more explicit or implied positive keywords, for example, "yes," "I'm sure," "I do," "I want to," "Don't stop." "Definitely," and the like, may be detected by the ASR system 318 and the NLP engine 320 from the uttered speech signals. Furthermore, the extent of deviated values of the sensor data is determined to be less than the threshold sensor value, which implies that there may be a minor anomaly but overall, the deviated values of the sensor data are acceptable. Based on the above, the consent detection engine 324 may be configured to detect an immediate consent of the first user 106a or the second user 106b at the defined timestamp during the personal interaction.

In accordance with another embodiment, the consent detection engine 324 may be configured to detect an immediate dissent of the first user 106a or the second user 106b at the defined timestamp during the personal interaction based on the value of the confidence score being less than the threshold value, one or more explicit or implied negative keywords from uttered speech signals, and the extent of deviated values of the sensor data exceeding the threshold sensor value. In an example, the confidence score representing the likelihood that the personal interaction between the first user 106a and the second user 106b is proceeding against the acceptance of the initial consent request exceeds the threshold value. Further, one or more explicit or implied negative keywords, for example, "no", "stop", "I don't want to", "this is making me uncomfortable", "wait", "it's wrong", "back off", "leave me", "go away", or any type of abusive/threatening/distressing words and the like, may be detected by the ASR system 318 and the NLP engine 320 from the uttered speech signals. Furthermore, the extent of deviated values of the sensor data is determined to be exceeding the threshold sensor value, which implies that there is a major anomaly and overall, the deviated values of the sensor data are not acceptable. Based on the above, the consent detection engine 324 may be configured to detect an immediate dissent of the first user 106a or the second user 106b at the defined timestamp during the personal interaction.

At 438, the immediate consent or dissent of the first user 106a or the second user 106b may be validated based on a plurality of criteria. In accordance with an embodiment, the consent validation engine 326 of the CMS 110 may be configured to validate the immediate consent or dissent of the first user 106a or the second user 106b based on the plurality of criteria. In accordance with an embodiment, the plurality of criteria for the validation of the detected immediate consent or dissent of the second user 106b may comprise at least informed, freely given, reversible, enthusiastic, and specific agreement between the first user 106a and the second user 106b to perform one or more activities during the personal interaction. A valid consent is freely given, i.e., to engage in a physical relation (such as sexual activities) is a decision that should be made without pressure, force, manipulation, or while the user is mentally or physically capacitated (for example, not in sleep, unconscious, and intoxicated due to drugs, alcohol, or other reasons). The valid consent is reversible, i.e., anyone can change their mind about what they want to do, at any time, even in the middle of performing an activity. The valid consent is informed, i.e., enough information is to be provided to enable the user to gain a genuine understanding of the nature and effects of the activities to be performed during the personal interaction. The valid consent is enthusiastic, i.e., only "yes" means "yes," therefore consent cannot be inferred from silence, passivity or lack of resistance, or lack of active response. The valid consent is specific, i.e., to be firm in setting boundaries and making it clear about what a user will or will not engage in. It must be clearly demonstrated through words and/or actions as mutually understood by both users.

In accordance with an embodiment, the validation of the immediate consent or dissent may be evaluated based on a weighted scoring method applied on various features of the plurality of criteria. The method may include computing a plurality of weights using training data and machine learning techniques by the ML engine 314. The plurality of criteria may be weighted where the weight signifies the absolute/relative significance of the criterion. In accordance with an embodiment, the weights may be adjusted automatically, using known methods of supervised training. Accordingly, a weighted combination (for example a weighted average) may be computed that may indicate a validation score.

In accordance with an embodiment, the validation score may be less than a threshold value. In such an embodiment, the consent validation engine 326 may indicate that the one of the first user 106a and the second user 106b has provided immediate dissent for one or more activities during the personal interaction. Accordingly, the control passes to step 440.

In accordance with another embodiment, the validation score may exceed the threshold value. In such an embodiment, the consent validation engine 326 may indicate that the one of the first user 106a and the second user 106b has provided immediate consent for one or more activities during the personal interaction. Accordingly, the control passes to step 444.

At 440, the acceptance on the consent request may be overridden by the immediate dissent of one of the first user 106a or the second user 106b for performing an activity during the personal interaction. In accordance with an embodiment, the second processor 312 of the CMS 110 may be configured to override the acceptance on the consent request by the immediate dissent of one of the first user 106a or the second user 106b for performing an activity during the personal interaction. The second processor 312 of the CMS 110 may be further configured to store the overridden acceptance on the consent request by the immediate dissent of the one of the first user 106a or the second user 106b in the consent database 336.

At 442, a second set of tasks may be performed based on the validation of the detected dissent of one of the first user 106a or the second user 106b. In accordance with an embodiment, the second processor 312 in conjunction with the task manager 328 of the CMS 110, may be configured to perform the second set of tasks based on the validation of the detected dissent of one of the first user 106a or the second user 106b for performing an activity during the personal interaction. The second set of tasks may be performed by the task manager 328 based on a user request by the first user 106a or the second user 106b. For example, the second set of tasks may be publishing of time sequence recording of conversation incurred during the personal interaction. Further, other tasks from the second set of tasks performed based on the validation of the immediate dissent of one of the first user 106a or the second user 106b may comprise dialing an emergency number of current location, dialing a number of an emergency contact person, or activating an emergency alarm sound.

At 444, based on the user request, time sequence recording of the conversation incurred during the personal interaction may be published. In accordance with an embodiment, the second processor 312 in conjunction with the task manager 328 of the CMS 110, may be configured to publish, based on the user request, time sequence recording of the conversation incurred during the personal interaction.

In an exemplary scenario, the user request may be generated by the second user 106b for publishing the time sequence recording of the conversation incurred during the personal interaction between the first user 106a and the second user 106b. Such published time sequence recording of the conversation may act as a legally sound evidence in favour of the second user 106b to level a genuine accusation on the first user 106a in case the first user 106a has committed, for example, a misconduct, delinquency, harassment, assault, or other criminal activity, despite of the dissent of the second user 106b during the personal interaction.

In an exemplary scenario, the user request may be generated by the first user 106a in case the second user 106b comes out with a false accusation against the first user 106a about, for example, a misconduct, delinquency, harassment, assault, or other criminal activity, during the personal interaction. In such case, the published time sequence recording of the conversation incurred during the personal interaction between the first user 106a and the second user 106b may function as legally sound evidence in favour of the first user 106a and against the second user 106b.

Figure 5A:
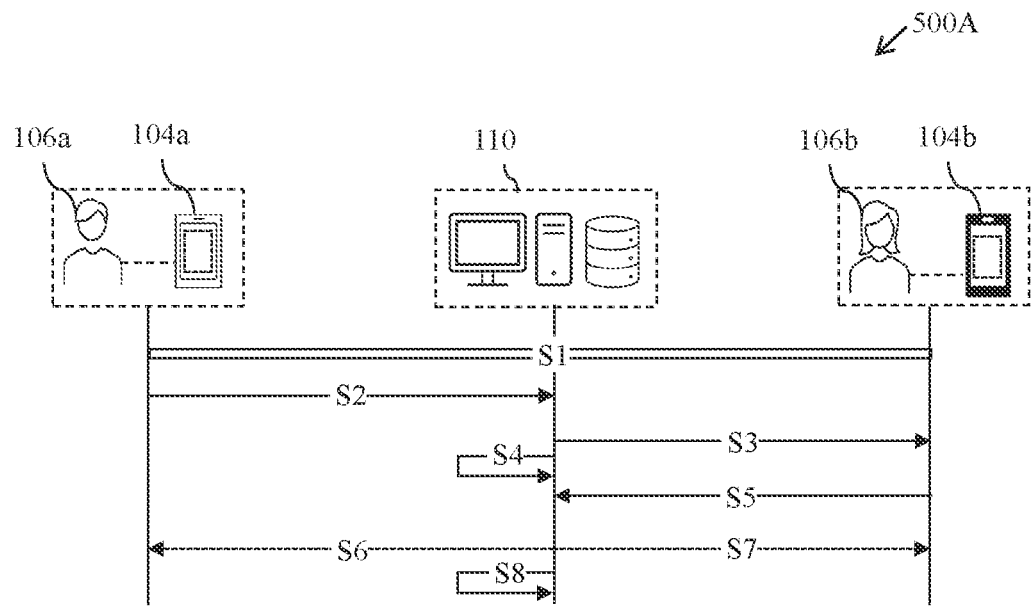
FIG. 5A illustrates a first sequence diagram for operational steps performed between a plurality of electronic devices and the consent management system for consent response (acceptance or rejection), in accordance with an exemplary embodiment of the disclosure.

FIG. 5A illustrates a first sequence diagram 500A for operational steps performed between the first electronic device 104a, the second electronic device 104b, and the CMS 110 for consent request generated by the first electronic device 104a, and consent response (acceptance or rejection) generated by the second electronic device 104b, in accordance with an exemplary embodiment of the disclosure.

Once the secure communication channel is established (S1), the first user 106a may select the second user profile of the second user 106b in accordance with various embodiments, as described in FIG. 4A. Based on a selection of the user profile of the second user 106b, the first user 106a may generate a consent request, addressed for the second user 106b, at the first electronic device 104a. The consent request may be transmitted by the first electronic device 104a to the CMS 110 (S2). The consent request may be generated by the first user 106a at the first electronic device 104a based on a manipulation of a selectable option, such as a software button presented on the user interface of the application program 112 at the first electronic device 104a.

The CMS 110 may further transmit the consent request to the second electronic device 104b (S3). The CMS 110 may store date and time of the receipt and transmittal of the consent request along with other details, such as the unique sender and receiver device identifiers and the location of the first electronic device 104a and the second electronic device 104b, in the consent database 336 for future references (S4).

The second electronic device 104b may receive the consent request from the CMS 110 and generate a consent response corresponding to the consent request based on options selected or data provided by the second user 106b. In accordance with an embodiment, the consent response may correspond to acceptance of the consent request when the second user 106b manipulates selectable options, such as a yes/accept software buttons, in the consent request presented at the user interface of the application program 112 at the second electronic device 104b. In accordance with another embodiment, the consent response may correspond to rejection of the consent request when the second user 106b manipulates selectable options, such as no/reject software buttons, in the consent request presented at the user interface of the application program 112 at the second electronic device 104b.

The second electronic device 104b may transmit the consent response (acceptance or rejection) to the CMS 110 (S5). The CMS 110 may generate notification corresponding to the consent response (acceptance or rejection) and transmit the generated notifications to both of the first electronic device 104a and the second electronic device 104b (S6) and (S7).

The CMS 110 may store date and time of the consent response (acceptance or rejection) along with other details, such as the unique sender and receiver device identifiers and the location of the first electronic device 104a and the second electronic device 104b, in the consent database 336 for future references (S8).

Figure 5B:
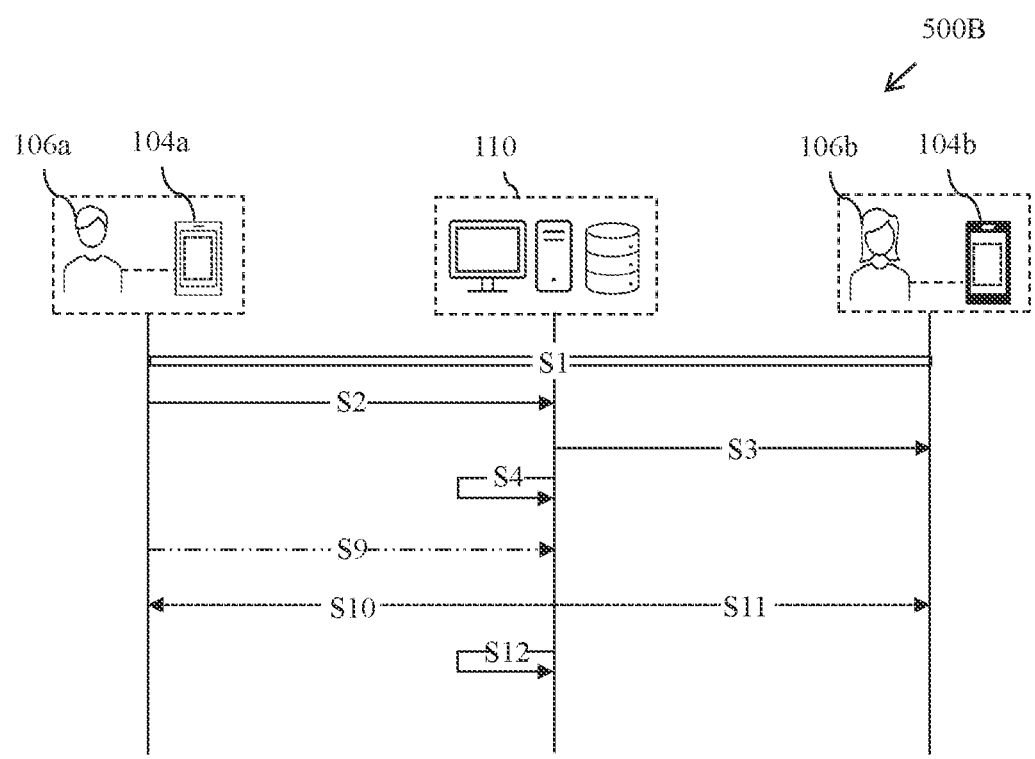
FIG. 5B illustrates a second sequence diagram for operational steps performed between the plurality of electronic devices and the consent management system for consent cancellation, in accordance with an exemplary embodiment of the disclosure.

FIG. 5B illustrates a second sequence diagram 500B for operational steps performed between the first electronic device 104a, the second electronic device 104b, and the CMS 110 for consent request generated and cancelled by the first electronic device 104a, in accordance with an exemplary embodiment of the disclosure.

The operational steps (S1) to (S4) performed in the second sequence diagram 500B are similar to the operational steps (S1) to (S4) performed in the first sequence diagram 500A. In accordance with an embodiment, the first user 106a may cancel or withdraw the consent request (addressed for the second user 106b) based on a manipulation of a selectable option presented on the user interface of the application program 112 at the first electronic device 104a. The consent cancellation or withdrawal request may be transmitted by the first electronic device 104a to the CMS 110 (S9).

On priority basis, the CMS 110 may override the initial consent request with the consent cancellation or withdrawal request, and further transmit the notifications regarding the consent cancellation or withdrawal to the first electronic device 104a and second electronic device 104b (S10) and (S11). The CMS 110 may store date and time of the receipt and transmittal of the consent cancellation or withdrawal request along with other details, such as the unique sender and receiver device identifiers and the location of the first electronic device 104a and the second electronic device 104b, in the consent database 336 for future references (S12).

Figure 5C:
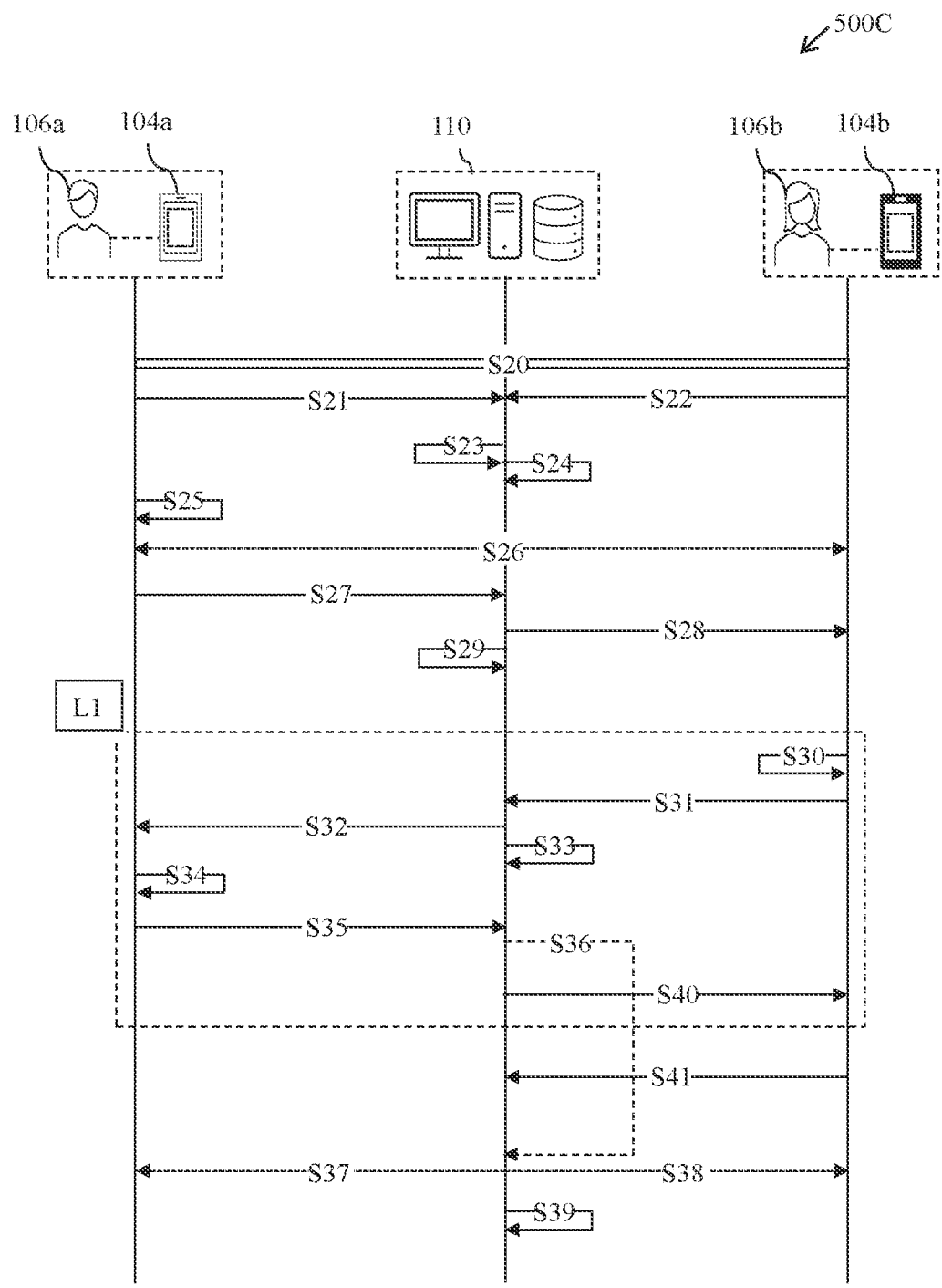
FIG. 5C illustrates a third sequence diagram for operational steps performed between the plurality of electronic devices and the consent management system for consent negotiation, in accordance with an exemplary embodiment of the disclosure.

FIG. 5C illustrates a third sequence diagram 500C for operational steps performed between the first electronic device 104a, the second electronic device 104b, and the CMS 110 for consent negotiation, in accordance with an exemplary embodiment of the disclosure.

Once the secure communication channel is established (S20), the CMS 110 may receive detailed information pertaining to the plurality of users 106 (such as the first user 106a and the second user 106b) from the plurality of electronic devices 104 (such as the first electronic device 104a and the second electronic device 104b) (S21) and (S22), via the secure communication channel. The CMS 110 may be configured to generate a plurality of user profiles based on the detailed information pertaining to the plurality of users 106 received from the plurality of electronic devices 104 (S23). The CMS 110 may further store the plurality of user profiles in the user profile database 332 (S24). In accordance with an embodiment, the first user 106a may select the second user profile of the second user 106b in accordance with various embodiments, as described in FIG. 4A (S25). The CMS 110 may further enable the first electronic device 104a and the second electronic device 104b to exchange plurality of messages prior to personal interaction between the first user 106a and the second user 106b (S26). For the second user profile of the second user 106b, the first user 106a may generate a consent request, addressed for the second user 106b, at the first electronic device 104a. The consent request may be generated by the first user 106a at the first electronic device 104a based on a manipulation of a selectable option, such as a software button, presented on the user interface of the application program 112 at the first electronic device 104a. The consent request may be transmitted by the first electronic device 104a to the CMS 110 (S27).

The CMS 110 may further transmit the consent request to the second electronic device 104b (S28). The CMS 110 may store date and time of the receipt and transmittal of the consent request along with other details, such as the unique sender and receiver device identifiers and the location of the first electronic device 104a and the second electronic device 104b, in the consent database 336 for future references (S29).

In accordance with an embodiment, the second electronic device 104b may receive the consent request from the CMS 110 and generate a consent response corresponding to the received consent request based on options selected or data provided by the second user 106b (S30). The consent response may initiate a loop (L1) for a negotiation between the first user 106a and the second user 106b, via the CMS 110. The negotiation may be performed as the second user 106b revises the consent request by editing the terms, conditions, and/or clauses of the mutual agreement in the received consent request. The second electronic device 104b may transmit the consent response as a revised consent request to the CMS 110 (S31).

The CMS 110 may further transmit the revised consent request to the first electronic device 104a (S32). The CMS 110 may also store date and time of the receipt and transmittal of the revised consent request along with other details, such as the unique sender and receiver device identifiers and the location of the first electronic device 104a and the second electronic device 104b, in the consent database 336 for future references (S33).

In accordance with an embodiment, the first user 106a at the first electronic device 104a may accept or reject the revised consent request based on options selected or data provided by the first user 106a (S34). The first electronic device 104a may transmit the revised consent response that may correspond to acceptance or rejection of the revised consent request. The revised consent response (acceptance or rejection) may be transmitted to the CMS 110 (S35). Accordingly, the loop (L1) is terminated, and control exits the loop (L1) (S36). The CMS 110 may generate notification corresponding to the revised consent response (acceptance or rejection) and transmit the generated notifications to both of the first electronic device 104a and the second electronic device 104b (S37) and (S38). In accordance with an embodiment, the CMS 110 stores date and time of the receipt of the revised consent response (acceptance or rejection) along with other details, such as the unique sender and receiver device identifiers and the location of the first electronic device 104a and the second electronic device 104b, in the consent database 336 for future references (S39).

In accordance with another embodiment, the first user 106a at the first electronic device 104a may review the revised consent request and edit the revised consent request based on options selected or data provided by the first user 106a (S34). The counter revised consent request may be transmitted to the CMS 110 (S35). The CMS 110 may further transmit the counter revised consent request to the second electronic device 104b (S40). The loop (L1) is executed again as the consent request is iteratively revised by one electronic device and responded to by other electronic device until accepted by both of the first user 106a and the second user 106b on a set of terms, conditions, and clauses acceptable to both. For example, after a defined number of iterations, the second electronic device 104b may transmit a final consent response (acceptance or rejection) to the CMS 110 (S41). As described above, the CMS 110 may generate notification corresponding to the consent response (acceptance or rejection) and transmit the generated notifications to both of the first electronic device 104a and the second electronic device 104b (S37) and (S38). In accordance with another embodiment, the CMS 110 may store date and time of the receipt and transmittal of the final consent response and the complete chain of negotiations along with other details, such as the unique sender and receiver device identifiers and the location of the first electronic device 104a and the second electronic device 104b, in the consent database 336 for future references (S39).

Figure 5D:
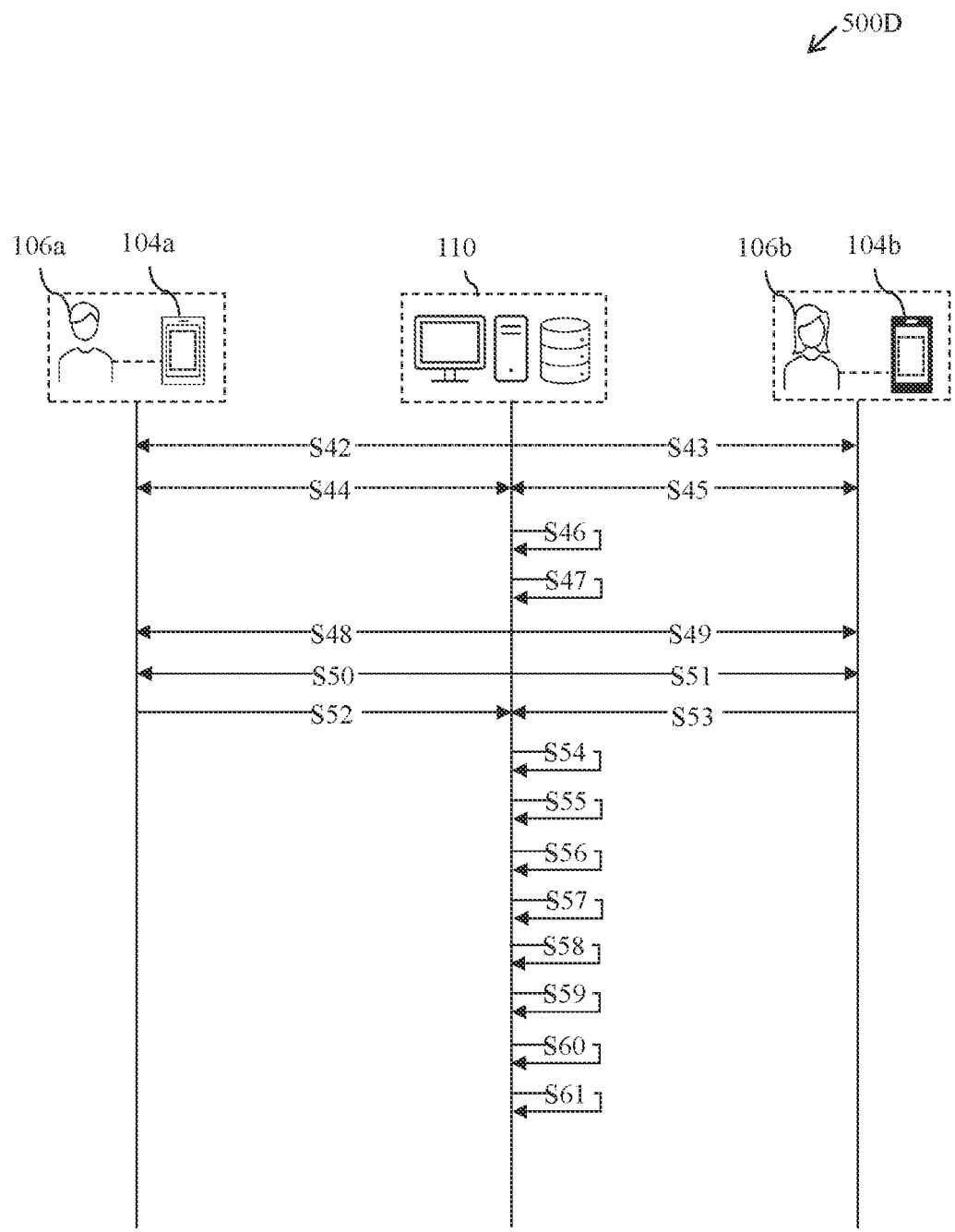
FIG. 5D illustrates a fourth sequence diagram for operational steps performed between the plurality of electronic devices and the consent management system for consent detection and validation, in accordance with an exemplary embodiment of the disclosure.

FIG. 5D illustrates a fourth sequence diagram 500D for operational steps performed between the first electronic device 104a, the second electronic device 104b, and the CMS 110 for consent detection and validation, in accordance with an exemplary embodiment of the disclosure.

Once both of the first electronic device 104a and the second electronic device 104b receive notification from the CMS 110 (S42) and (S43), the first user 106a and the second user 106b may start a new relationship by exchanging a plurality of messages, for example, text messages, personal emails, phone calls, video calls, and the like, via the secure communication channel. The exchange of the plurality of messages may be facilitated by the CMS 110 (S44) and (S45). The exchange of the plurality of messages may be further stored by the CMS 110 in the additional database 338 (S46).

In accordance with an embodiment, the CMS 110 may determine an event based on an analysis of the plurality of messages using natural language processing techniques (S47). Corresponding to the event, the CMS 110 may generate a first set of tasks, for example, generating calendar entry, booking a cab, a table, and/or a lodging place, for the personal interaction between the first user 106a and the second user 106b and send notification about the generated first set of tasks to both of the first electronic device 104a and the second electronic device 104b (S48) and (S49).

The CMS 110 may further enable the first user 106a and the second user 106b for a direct exchange of one or more identity confirmation messages presented on corresponding user interfaces of the application program 112 presented on the first electronic device 104a and the second electronic device 104b respectively, during or prior to the personal interaction between the first user 106a and the second user 106b (S50) and (S51).

During the personal interaction between the first user 106a and the second user 106b, the CMS 110 may receive the uttered speech signals and the sensor data of one or both of the first user 106a and the second user 106b from one or both of the first electronic device 104a and the second electronic device 104b, via the secure communication channel with one or both of the first electronic device 104a and the second electronic device 104b (S52) and (S53).

The CMS 110 may identify current set of the user characteristics based on time sequence of user interactions and uttered speech signals of each user during the personal interaction (S54). The CMS 110 may further predict the new set of user characteristics for the first user 106a and the second user 106b during the personal interaction based on time sequence-based personal interaction data, the training data set, and artificial neural network (S55).

The CMS 110 may further determine the confidence score based on the intent of each of the first user 106a and the second user 106b, the current sensor data, and the new set of user characteristics for the first user 106a and the second user 106b during the personal interaction (S56).

Based on the comparison of the confidence score with the threshold value, one or more explicit or implied keywords from uttered speech signals, and an extent of deviated values of the sensor data, the CMS 110 may detect an immediate consent or dissent of the first user 106a or the second user 106b at the defined timestamp during the personal interaction (S57). The CMS 110 may further validate the immediate consent or dissent of the first user 106a or the second user 106b based on the plurality of criteria (S58).

In accordance with an embodiment, the CMS 110 may override the acceptance on the consent request by the immediate dissent of the first user 106a or the second user 106b for performing an activity during the personal interaction (S59).

Based on the validation of the detected dissent of the first user 106a or the second user 106b for performing an activity during the personal interaction, the CMS 110 may perform a second set of tasks (S60). The CMS 110 may publish, based on the user request of the first user 106a or the second user 106b, time sequence recording of the conversation incurred during the personal interaction (S61).

Figure 6:
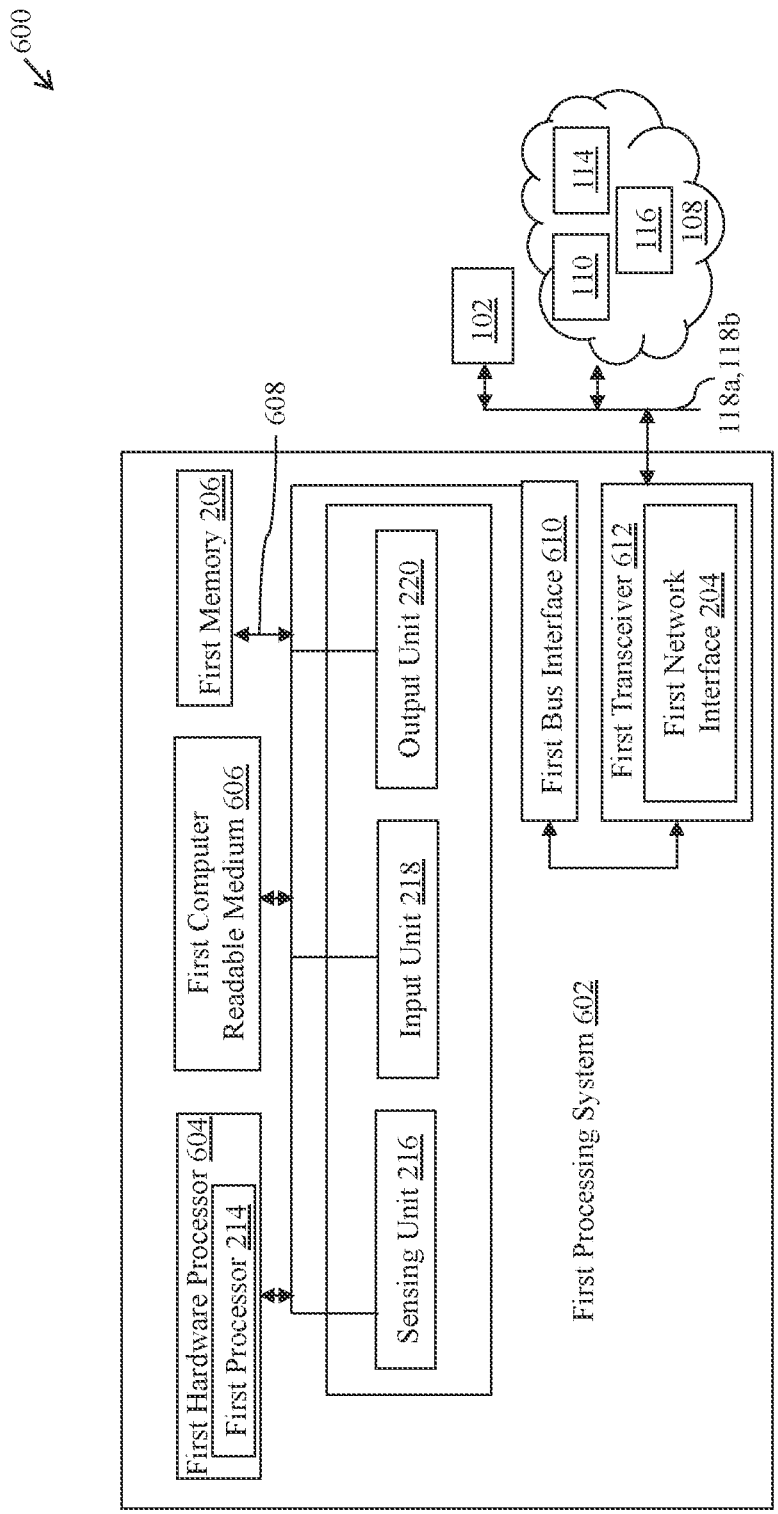
FIG. 6 is a conceptual diagram illustrating an example of a hardware implementation for the exemplary electronic device of FIG. 2A employing a processing system, in accordance with an exemplary embodiment of the disclosure.

FIG. 6 is a conceptual diagram illustrating an example of a hardware implementation for the exemplary electronic device of FIG. 2A employing a processing system, in accordance with an exemplary embodiment of the disclosure. Referring to FIG. 6, the hardware implementation shown by a representation 600 for the exemplary electronic device 202, such as the first electronic device 104a and the second electronic device 104b, employs a first processing system 602 for consent detection and validation, in accordance with an exemplary embodiment of the disclosure, as described herein.

In some examples, the first processing system 602 may comprise one or more hardware processors, such as a first hardware processor 604, a non-transitory first computer readable medium 606, a first bus 608, a first bus interface 610, a first transceiver 612, and the first memory 206. FIG. 6 further illustrates the first network interface 204, the first processor 214, the first memory 206, the sensing unit 216, the input unit 218, and the output unit 220, as described in detail in FIG. 2A.

The first hardware processor 604 may be configured to execute or implement software, hardware, and/or firmware modules and manage the first bus 608 and general processing, including the execution of a set of instructions stored on the non-transitory first computer readable medium 606. The set of instructions, when executed by the first hardware processor 604, causes the CMS 110 to execute the various operations described herein for any particular apparatus. The first hardware processor 604 may be implemented, based on a number of processor technologies known in the art. Examples of the hardware processor realized as the first hardware processor 604 may be a RISC processor, an ASIC processor, a CISC processor, and/or other processors or control circuits. In accordance with various embodiment, the first hardware processor 604 may include a single or multiple set of processors or multi-core processors. Moreover, the first hardware processor 604 may be implemented as an integrated processing system and/or a distributed processing system.

The non-transitory first computer readable medium 606 may be used for storing data that is manipulated by the first hardware processor 604 when executing the set of instructions. The data is stored for short periods or in the presence of power. The non-transitory first computer readable medium 606 may also be configured to store data for the first network interface 204, the first processor 214, the first memory 206, the sensing unit 216, the input unit 218, and the output unit 220, as described in detail in FIG. 2A.

As described above, the first memory 206 may store local versions of applications being executed by the first hardware processor 604, related instructions and corresponding parameters. The first memory 206 may include a type of memory usable by a computer, such as RAM, ROM, tapes, magnetic discs, optical discs, volatile memory, non-volatile memory, and any combination thereof. Additionally, the first hardware processor 604 and the first memory 206 may include and execute an operating system executing on the first hardware processor 604, one or more applications and display drivers and/or other components.

The first bus 608 is configured to link together various circuits. In this example, the CMS 110 employing the first processing system 602, the first hardware processor 604, the non-transitory first computer readable medium 606, and the first memory 206 may be implemented with bus architecture, represented by first bus 608. The first bus 608 may include any number of interconnecting buses and bridges depending on the specific implementation of the CMS 110 and the overall design constraints. The first bus interface 610 may be configured to provide an interface between the first bus 608 and other circuits, such as, the first transceiver 612.

The first transceiver 612 may be configured to provide a communication of the CMS 110 with various other external systems. The first transceiver 612 may communicate via wireless communication with networks, such as the Internet, the Intranet and/or a wireless network, such as a cellular telephone network, WLAN and/or a MAN. The wireless communication may use any of a plurality of communication standards, protocols and technologies, such as GSM, Enhanced Data GSM Environment (EDGE), LTE, wideband code division multiple access (W-CDMA), CDMA, time division multiple access (TDMA), Bluetooth©, Wi-Fi (such as IEEE 802.11a, IEEE 802.11b, IEEE 802.11g and/or IEEE 802.11n), voice over Internet Protocol (VoIP), and/or Wi-MAX. In accordance with an embodiment, the first transceiver 612 may provide for establishing and maintaining communications, such as UWB communications, with one or more other devices, parties, entities, and the like, utilizing hardware, software, and services. For example, the first transceiver 612 may provide for establishing and maintaining the short- or long-range communication protocols.

It should be recognized that, in some embodiments of the disclosure, one or more components of FIG. 6 may include software whose corresponding code may be executed by at least one processor, across multiple processing environments. For example, the first network interface 204, the first processor 214, the first memory 206, the sensing unit 216, the input unit 218, and the output unit 220 may include software that may be executed across a single or multiple processing environments.

In an aspect of the disclosure, the first hardware processor 604, the non-transitory first computer readable medium 606, or a combination of both may be configured or otherwise specially programmed to execute the operations or functionality of the first network interface 204, the first processor 214, the first memory 206, the sensing unit 216, the input unit 218, and the output unit 220, or various other components described herein, as described with respect to FIG. 2A.

Figure 7:
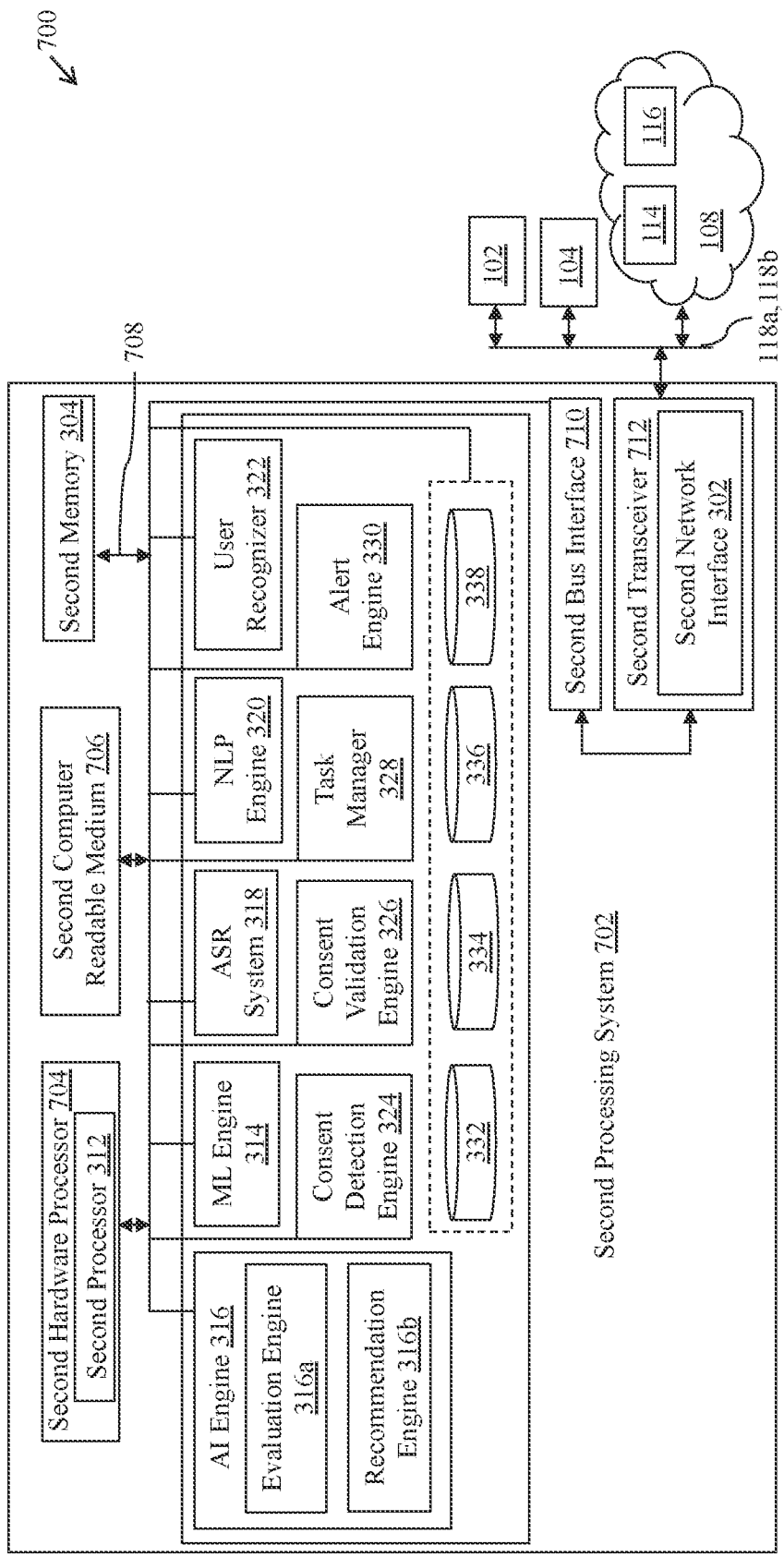
FIG. 7 is a conceptual diagram illustrating an example of a hardware implementation for the exemplary consent management system of FIGS. 3A and 3B employing a processing system for consent detection and validation, in accordance with an exemplary embodiment of the disclosure.

FIG. 7 is a conceptual diagram illustrating an example of a hardware implementation for an exemplary consent management system, such as the CMS 110 of FIGS. 3A and 3B, employing a processing system for consent detection and validation, in accordance with an exemplary embodiment of the disclosure. Referring to FIG. 7, the hardware implementation shown by a representation 700 for the CMS 110 employs a second processing system 702 for consent detection and validation, in accordance with an exemplary embodiment of the disclosure, as described herein.

In some examples, the second processing system 702 may comprise one or more hardware processors, such as a second hardware processor 704, a non-transitory second computer readable medium 706, the second memory 304, a second bus 708, a second bus interface 710, and a second transceiver 712. FIG. 7 further illustrates the second network interface 302 and the second memory 304 (comprising the second RAM 306, the second ROM 308, and the second program data 310), the second processor 312, the ML engine 314, the AI engine 316, the ASR system 318 (comprising the acoustic frontend 340, the speech recognition engine 342, the acoustic model 344, the token manager 346, the pronunciation dictionary 348, and the language model 350), the NLP engine 320 (comprising the morpheme analyzer 352, the grammar module 354, the syntax parser 356, and the intent analyzer 358), the user recognizer 322, the consent detection engine 324, the consent validation engine 326, the task manager 328, the alert engine 330, the user profile database 332, the task list database 334, the consent database 336, and the additional database 338, as described in detail in FIG. 3A.

The second hardware processor 704 may be configured to execute or implement software, hardware, and/or firmware modules and manage the second bus 708 and general processing, including the execution of a set of instructions stored on the non-transitory second computer readable medium 706. The set of instructions, when executed by the second hardware processor 704, causes the CMS 110 to execute the various operations described herein for any particular apparatus. The second hardware processor 704 may be implemented, based on a number of processor technologies known in the art. Examples of the hardware processor realized as the second hardware processor 704 may be a RISC processor, an ASIC processor, a CISC processor, and/or other processors or control circuits. In accordance with various embodiment, the second hardware processor 704 may include a single or multiple set of processors or multi-core processors. Moreover, the second hardware processor 704 may be implemented as an integrated processing system and/or a distributed processing system.

The non-transitory second computer readable medium 706 may be used for storing data that is manipulated by the second hardware processor 704 when executing the set of instructions. The data is stored for short periods or in the presence of power. The non-transitory second computer readable medium 706 may also be configured to store data for the second network interface 302 and the second memory 304 (comprising the second RAM 306, the second ROM 308, and the second program data 310), the second processor 312, the ML engine 314, the AI engine 316, the ASR system 318 (comprising the acoustic frontend 340, the speech recognition engine 342, the acoustic model 344, the token manager 346, the pronunciation dictionary 348, and the language model 350), the NLP engine 320 (comprising the morpheme analyzer 352, the grammar module 354, the syntax parser 356, and the intent analyzer 358), the user recognizer 322, the consent detection engine 324, the consent validation engine 326, the task manager 328, the alert engine 330, the user profile database 332, the task list database 334, the consent database 336, and the additional database 338, as described in detail in FIG. 3A.

As described above, the second memory 304 may store local versions of applications being executed by the first hardware processor 604, related instructions and corresponding parameters. The first memory 206 may include a type of memory usable by a computer, such as RAM, ROM, tapes, magnetic discs, optical discs, volatile memory, non-volatile memory, and any combination thereof. Additionally, the first hardware processor 604 and the first memory 206 may include and execute an operating system executing on the first hardware processor 604, one or more applications and display drivers and/or other components.

The second bus 708 is configured to link together various circuits. In this example, the CMS 110 employing the second processing system 702, the second hardware processor 704, the non-transitory second computer readable medium 706, and the second memory 304 may be implemented with bus architecture, represented by second bus 708. The second bus 708 may include any number of interconnecting buses and bridges depending on the specific implementation of the CMS 110 and the overall design constraints. The second bus interface 710 may be configured to provide an interface between the second bus 708 and other circuits, such as, the second transceiver 712.

The second transceiver 712 may be configured to provide a communication of the CMS 110 with various other external systems. The second transceiver 712 may communicate via wireless communication with networks, such as the Internet and/or a wireless network, such as a cellular telephone network, WLAN and/or a MAN. The wireless communication may use any of a plurality of communication standards, protocols, and technologies, such as GSM, EDGE, LTE, W-CDMA, CDMA, TDMA, Bluetooth©, Wi-Fi (such as IEEE 802.11a, IEEE 802.11b, IEEE 802.11g and/or IEEE 802.11n), VoIP, and/or Wi-MAX. In accordance with an embodiment, the second transceiver 712 may provide for establishing and maintaining communications, such as UWB communications, with one or more other devices, parties, entities, and the like, utilizing hardware, software, and services. For example, the second transceiver 712 may provide for establishing and maintaining the short-range or long-range communication protocols.

It should be recognized that, in some embodiments of the disclosure, one or more components of FIG. 7 may include software whose corresponding code may be executed by at least one processor, across multiple processing environments. For example, the second network interface 302 and the second memory 304 (comprising the second RAM 306, the second ROM 308, and the second program data 310), the second processor 312, the ML engine 314, the AI engine 316, the ASR system 318 (comprising the acoustic frontend 340, the speech recognition engine 342, the acoustic model 344, the token manager 346, the pronunciation dictionary 348, and the language model 350), the NLP engine 320 (comprising the morpheme analyzer 352, the grammar module 354, the syntax parser 356, and the intent analyzer 358), the user recognizer 322, the consent detection engine 324, the consent validation engine 326, the task manager 328, the alert engine 330, the user profile database 332, the task list database 334, the consent database 336, and the additional database 338 may include software that may be executed across a single or multiple processing environments.

In an aspect of the disclosure, the second hardware processor 704, the non-transitory second computer readable medium 706, or a combination of both may be configured or otherwise specially programmed to execute the operations or functionality of the second network interface 302 and the second memory 304 (comprising the second RAM 306, the second ROM 308, and the second program data 310), the second processor 312, the ML engine 314, the AI engine 316, the ASR system 318 (comprising the acoustic frontend 340, the speech recognition engine 342, the acoustic model 344, the token manager 346, the pronunciation dictionary 348, and the language model 350), the NLP engine 320 (comprising the morpheme analyzer 352, the grammar module 354, the syntax parser 356, and the intent analyzer 358), the user recognizer 322, the consent detection engine 324, the consent validation engine 326, the task manager 328, the alert engine 330, the user profile database 332, the task list database 334, the consent database 336, and the additional database 338, or various other components described herein, as described with respect to FIG. 3A.

Various embodiments of the disclosure comprise the CMS 110 that may be configured for consent detection and validation. The CMS 110 may comprise one or more processors, for example, the second network interface 302 and the second memory 304 (comprising the second RAM 306, the second ROM 308, and the second program data 310), the second processor 312, the ML engine 314, the AI engine 316, the ASR system 318 (comprising the acoustic frontend 340, the speech recognition engine 342, the acoustic model 344, the token manager 346, the pronunciation dictionary 348, and the language model 350), the NLP engine 320 (comprising the morpheme analyzer 352, the grammar module 354, the syntax parser 356, and the intent analyzer 358), the user recognizer 322, the consent detection engine 324, the consent validation engine 326, the task manager 328, the alert engine 330, the user profile database 332, the task list database 334, the consent database 336, and the additional database 338.

The CMS 110 includes a memory, such as the second memory 304, for storing instructions and a processor, such as the second processing system 702, for executing the instructions. Based on the executed instructions, one or more processors in the CMS 110 may be configured to receive, during a personal interaction between the first user 106a and the second user 106b, uttered speech signals and sensor data of at least the first user 106a from at least the first electronic device 104a, via a secure communication channel. The personal interaction may be scheduled based on a consent response, received from the second electronic device 104b, corresponding to an acceptance of a consent request received from the first electronic device 104a. The one or more processors in the CMS 110 may be further configured to determine a confidence score based on an intent of both of the first user 106a and the second user 106b, current sensor data and a new set of user characteristics predicted for the first user 106a and the second user 106b during the personal interaction. The one or more processors in the CMS 110 may be further configured to detect an immediate consent or an immediate dissent of one of the first user 106a or the second user 106b at a defined timestamp during the personal interaction based on at least one of a comparison of the confidence score with a threshold value, one or more explicit or implied keywords from the uttered speech signals, and an extent of deviated values of the sensor data. The one or more processors in the CMS 110 may be further configured to validate the immediate consent or the immediate dissent of one of the first user 106a or the second user 106b based on a plurality of criteria. The one or more processors in the CMS 110 may be further configured to perform a second set of tasks based on the validation of the immediate dissent of one of the first user 106a or the second user 106b.

In accordance with an embodiment, the one or more processors in the CMS 110 may be further configured to receive detailed information, pertaining to the plurality of users 106, from the plurality of electronic devices 104, via the secure communication channel. The detailed information may be captured at the plurality of electronic devices 104 through the user interface of the application program 112 presented at each of the plurality of electronic devices 104 during registration. The one or more processors in the CMS 110 may be further configured to generate a plurality of user profiles based on the detailed information, pertaining to the plurality of users 106, received from the plurality of electronic devices 104. The one or more processors in the CMS 110 may be further configured to store the plurality of user profiles in a user profile database.

In accordance with an embodiment, the one or more processors in the CMS 110 may be further configured to receive, via the secure communication channel, the consent request from the first electronic device 104a associated with the first user 106a based on a selection of a second user profile of the second user 106b by the first user 106a. The consent request may correspond to a mutual agreement to perform one or more activities during the personal interaction between the first user 106a and the second user 106b. The one or more processors in the CMS 110 may be further configured to transmit, via the secure communication channel, the consent request to the second electronic device 104b. The one or more processors in the CMS 110 may be further configured to receive, via the secure communication channel, the consent response from the second electronic device 104b based on options selected or data provided by the second user 106b on the consent request generated by the first user 106a.

In accordance with an embodiment, for the selection of the second user profile of the second user 106b by the first user 106a, one or more processors in the CMS 110 may be further configured to recommend the second user profile of the second user 106b to the first user 106a via the user interface of the application program 112 presented at the first electronic device 104a. The second user profile of the second user 106b may be recommended based on a plurality of options presented by the application program 112 at the user interface and selected by the first user 106a based on user preferences of the first user 106a.

In accordance with an embodiment, the one or more processors in the CMS 110 may be further configured to search the second user profile of the second user 106b from a plurality of user profiles based on one or more search terms provided by the first user 106a at the user interface of the application program 112 presented at the first electronic device 104*a*. Each of the plurality of user profiles includes a name, an age, a location, a family size, an income, a work indicator, a preference of living environment, a browsing history, one or more deep learning factors derived from pictures or visual descriptions, or any combination thereof.

In accordance with an embodiment, the one or more processors in the CMS 110 may be further configured to generate rating factors for other users from a plurality of users 106 based on one or more machine learning models. The rating factor may comprise a probability of a user interaction of the first user 106*a* with another user from the plurality of users 106. The one or more processors in the CMS 110 may be further configured to recommend the second user profile of the second user 106*b* based on ranking of the rating factors for the other users from the plurality of users 106.

In accordance with an embodiment, the one or more processors in the CMS 110 may be further configured to enable the first electronic device 104*a* and the second electronic device 104*b* to exchange a plurality of messages prior to the personal interaction between the first user 106*a* and the second user 106*b*. Each of the plurality of messages may comprise identification information associated with the first user 106*a* and the second user 106*b*, and a payload comprising a plurality of text-based messages, voice-based messages, and video messages.

In accordance with an embodiment, the one or more processors in the CMS 110 may be further configured to determine an event based on analysis of the plurality of messages using natural language processing techniques. Corresponding to the event, a first set of tasks may be generated for the personal interaction between the first user 106*a* and the second user 106*b*.

In accordance with an embodiment, the first set of tasks generated corresponding to the event may comprise at least generating a calendar entry for both of the first user 106*a* and the second user 106*b* for scheduling the personal interaction and booking a meeting venue for the personal interaction.

In accordance with an embodiment, the one or more processors in the CMS 110 may be further configured to identify a current set of user characteristics based on time sequence-based user interactions and the uttered speech signals of each user during the personal interaction. The current set of user characteristics may be utilized as a training data set for the prediction of the new set of user characteristics. The one or more processors in the CMS 110 may be further configured to predict a new set of user characteristics for the first user 106*a* and the second user 106*b* during the personal interaction based on time sequence-based personal interaction, the training data set, and an artificial neural network model.

In accordance with an embodiment, the uttered speech signals may be extracted from a conversation between the first user 106*a* and the second user 106*b* during the personal interaction.

In accordance with an embodiment, the one or more processors in the CMS 110 may be further configured to enable the first user 106*a* and the second user 106*b* for a direct exchange of one or more identity confirmation messages via corresponding user interfaces of the application program 112 presented at the first electronic device 104*a* and the second electronic device 104*b* respectively, during or prior to the personal interaction between the first user 106*a* and the second user 106*b*.

In accordance with an embodiment, the one or more processors in the CMS 110 may be further configured to override the acceptance on the consent request by the immediate dissent one of the first user 106*a* or the second user 106*b* for performing an activity during the personal interaction.

In accordance with an embodiment, the plurality of criteria for the validation of the immediate consent or dissent of the first user 106*a* or the second user 106*b* may comprise at least informed, freely given, reversible, enthusiastic, and specific agreement between the first user 106*a* and the second user 106*b* to perform one or more activities during the personal interaction.

In accordance with an embodiment, the one or more processors in the CMS 110 may be further configured to publish, based on a user request, a time sequence-based recording of conversation incurred during the personal interaction. The published time sequence-based recording of the conversation incurred during the personal interaction may correspond to one of the second set of tasks.

In accordance with an embodiment, other tasks from the second set of tasks performed based on the validation of the immediate dissent of one of the first user 106*a* or the second user 106*b* may comprise dialing an emergency number of current location, dialing a number of an emergency contact person, or activating an emergency alarm sound.

In accordance with an embodiment, the prediction of the new set of user characteristics may be further based on social media data of the first user 106*a* and the second user 106*b* collected from one or more public information databases. The social media data may include a plurality of media shared, content posts, social media contacts having a pre-defined social media distance between user accounts and information relating to the social media contacts.

Various embodiments of the disclosure may provide a computer readable medium, such as the non-transitory second computer readable medium 706, having stored thereon, computer implemented instruction that when executed by the second hardware processor 704 causes the CMS 110 to execute operations for consent detection and consent validation. In accordance with an embodiment, the second hardware processor 704 causes the CMS 110 to execute operations to receive, during a personal interaction between the first user 106*a* and the second user 106*b*, uttered speech signals and sensor data of at least the first user 106*a* from at least the first electronic device 104*a*, via a secure communication channel. The personal interaction may be scheduled based on a consent response, received from the second electronic device 104*b*, corresponding to an acceptance of a consent request received from the first electronic device 104*a*. The second hardware processor 704 further causes the CMS 110 to execute operations to determine a confidence score based on an intent of both of the first user 106*a* and the second user 106*b*, current sensor data and a new set of user characteristics predicted for the first user 106*a* and the second user 106*b* during the personal interaction. The second hardware processor 704 further causes the CMS 110 to execute operations to detect an immediate consent or an immediate dissent of one of the first user 106*a* or the second user 106*b* at a defined timestamp during the personal interaction based on at least one of a comparison of the confidence score with a threshold value, one or more explicit or implied keywords from the uttered speech signals, and an extent of deviated values of the sensor data. The second hardware processor 704 further causes the CMS 110 to execute operations to validate the immediate consent or the immediate dissent of one of the first user 106*a* or the second user 106*b* based on a plurality of criteria. The second hardware processor 704 further causes the CMS 110 to execute operations to perform a second set of tasks based on the validation of the immediate dissent of one of the first user 106a or the second user 106b.

The proposed system and method for consent detection and validation may be highly advantageous. In existing systems, audio or audio-visual recorders may be used to record the consent of both the parties, before or during such in-person meetings, about the permissible extent or set boundaries of physical interactions. However, one or both the parties may not agree to the usage of such security systems due to privacy issues, as such security systems may be easily tempered with catering to the intent, need or convenience of one of the parties. In contrast, the proposed system and method for consent detection and validation, as described herein, may provide a secure communication channel that facilitates a secure exchange of messages between participating users. Upon confirmation of the acceptance of the consent request, various tasks, such as, scheduling a meeting or booking a venue, may be automatically performed to provide a user-friendly experience.

The proposed system and method may intelligently detect an immediate dissent while performing one or more activities during the personal interaction and may take immediate action by performing various tasks if the situation warrants an attention. The proposed system and method may further smartly validate the immediate consent or dissent based on the basic criteria for consent evaluation. Further, the complete conversation between the participating users incurred during the personal interaction may be recorded in a time sequence-based manner. The proposed system and method may also mark key timestamps within the recording to facilitate quick evaluation of the recording by the reader. At any point in time, the participating users may access the secure read-only record of the conversation occurred during the personal interaction at a later time, whenever a proof of consent or dissent is needed to support or refute claims to contrary. Thus, the proposed system and method provides a smart, secure, robust, legitimate, and user-friendly tool for consent detection and validation.

Furthermore, the proposed system and method may enable a victim to report against an accused about an untoward incident (for example, a sexual misconduct occurred during a personal interaction) with confidence and with legally sound evidence. On the other hand, the proposed system and method may enable an alleged perpetrator to produce a sound evidence as a solid defense in the court of law and prove his/her innocence in case a false allegation is levelled by an alleged victim. Thus, the proposed system and method may provide a valuable evidence to assert the truth of the matter during, for example, civil proceedings, criminal prosecution, or in dispute resolution forums.

As utilized herein the terms "circuits" and "circuitry" refer to physical electronic components (for example, hardware) and any software and/or firmware ("code") which may configure the hardware, be executed by the hardware, and/or otherwise be associated with the hardware. As used herein, for example, a particular processor and memory may comprise a first "circuit" when executing first one or more lines of code and may comprise a second "circuit" when executing second one or more lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and/or code (if any is necessary) to perform the function, regardless of whether performance of the function is disabled, or not enabled, by some user-configurable setting.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., ASICs, by program instructions being executed by one or more processors, or by a combination of both. Additionally, these sequences of actions described herein can be considered to be embodied entirely within any non-transitory form of computer readable storage medium having stored therein a corresponding set of computer instructions that upon execution would cause an associated processor to perform the functionality described herein. Thus, the various aspects of the disclosure may be embodied in a number of different forms, which have been contemplated to be within the scope of the claimed subject matter. In addition, for each of the embodiments described herein, the corresponding form of any such embodiments may be described herein as, for example, "logic configured to" perform the described action.

Another embodiment of the disclosure may provide a non-transitory machine and/or computer readable storage and/or media, having stored thereon, a machine code and/or a computer program having at least one code section executable by a machine and/or a computer, thereby causing the machine and/or computer to perform the steps as described herein for consent detection and validation.

The present disclosure may also be embedded in a computer program product, which comprises all the features enabling the implementation of the methods described herein, and which when loaded in a computer system is able to conduct these methods. Computer program in the present context means any expression, in any language, code or notation, either statically or dynamically defined, of a set of instructions intended to cause a system having an information processing capability to perform a particular function either directly or after either or both of the following: a) conversion to another language, code or notation; b) reproduction in a different material form.

Further, those of skill in the art will appreciate that the various illustrative logical blocks, modules, circuits, algorithms, and/or steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the embodiments disclosed herein may be embodied directly in firmware, hardware, in a software module executed by a processor, or in a combination thereof. A software module may reside in RAM memory, flash memory, ROM memory, EPROM memory, EEPROM memory, registers, hard disk, physical and/or virtual disk, a removable disk, a CD-ROM, virtualized system, or device such as a virtual servers or container, or any other form of storage medium known in the art. An exemplary storage medium is communicatively coupled to the processor (including logic/code executing in the processor) such that the processor can read information from, and write information to, the storage medium. In the alternative, the storage medium may be integral to the processor.

While the present disclosure has been described with reference to certain embodiments, it will be noted understood by, for example, those skilled in the art that various changes and modifications could be made and equivalents may be substituted without departing from the scope of the present disclosure as defined, for example, in the appended claims. In addition, many modifications may be made to adapt a particular situation or material to the teachings of the present disclosure without departing from its scope. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated. Therefore, it is intended that the present disclosure is not limited to the particular embodiment disclosed, but that the present disclosure will include all embodiments falling within the scope of the appended claims.

What is claimed is:

1. A system, comprising:
    a memory for storing instructions; and
    a processor configured to execute the instructions, and based on the executed instructions, the processor is further configured to:
    receive, during a personal interaction between a first user and a second user, uttered speech signals and first sensor data of at least the first user from at least a first electronic device, via a secure communication channel,
        wherein the personal interaction is scheduled based on a consent response, received from a second electronic device, corresponding to an acceptance of a consent request received from the first electronic device;
    apply a Fourier transform on the uttered speech signals to extract spectral features that characterize the uttered speech signals as a series of representative multidimensional vectors;
    process the first sensor data to extract biometric data including psychophysical characteristics or movement-related metrics of both the first user and the second user;
    determine a confidence score based on an intent of both of the first user and the second user, second sensor data, a new set of user characteristics predicted for the first user and the second user during the personal interaction, the extracted spectral features, and the extracted biometric data;
    detect an immediate consent or an immediate dissent of one of the first user or the second user at a defined timestamp during the personal interaction based on at least one of a comparison of the confidence score with a threshold value, one or more explicit or implied keywords from the uttered speech signals, an extent of deviated values of the first sensor data;
    validate the immediate consent or the immediate dissent of one of the first user or the second user based on a plurality of criteria; and
    execute a second set of tasks based on the validation of the immediate dissent of one of the first user or the second user.

2. The system according to claim 1, wherein the processor is further configured to:
    receive detailed information related to a plurality of users, from a plurality of electronic devices, via the secure communication channel,
        wherein the detailed information is captured at the plurality of electronic devices through a user interface of an application program presented at each of plurality of electronic devices during registration,
    generate a plurality of user profiles based on the detailed information received from the plurality of electronic devices; and
    store the plurality of user profiles in a user profile database.

3. The system according to claim 1, wherein the processor is further configured to:
    receive, via the secure communication channel, the consent request from the first electronic device associated with the first user based on a selection of a second user profile of the second user by the first user,
        wherein the consent request corresponds to a mutual agreement to perform execute one or more activities during the personal interaction between the first and the second user;
    transmit, via the secure communication channel, the consent request to the second electronic device; and
    receive, via the secure communication channel, the consent response from the second electronic device based on options selected or data provided by the second user on the consent request generated by the first user.

4. The system according to claim 3, wherein
    for the selection of the second user profile of the second user by the first user, the processor is further configured to recommend the second user profile of the second user to the first user via a user interface of an application program presented at the first electronic device, and
    the second user profile of the second user is recommended based on a plurality of options presented by the application program at the user interface and selected by the first user based on user preferences of the first user.

5. The system according to claim 3, wherein the processor is further configured to search the second user profile of the second user from a plurality of user profiles based on one or more search terms provided by the first user at a user interface of an application program presented at the first electronic device.

6. The system according to claim 5, wherein each of the plurality of user profiles includes at least one of a name, an age, a location, a family size, an income, a work indicator, a preference of living environment, a browsing history, one or more deep learning factors derived from pictures or visual descriptions, or any combination thereof.

7. The system according to claim 3, wherein the processor is further configured to:
generate rating factors for other users from a plurality of users based on one or more machine learning models, wherein a rating factor comprises a probability of a user interaction of the first user with another user from the plurality of users;
rank the generated rating factors for the other users from the plurality of users; and
recommend the second user profile of the second user based on the ranked rating factors for the other users from the plurality of users.

8. The system according to claim 1, wherein the processor is further configured to enable the first electronic device and the second electronic device to exchange a plurality of messages prior to the personal interaction between the first user and the second user,
wherein each of the plurality of messages comprise identification information associated with the first user and the second user, and a payload comprising a plurality of text-based messages, voice-based messages, and video messages.

9. The system according to claim 8, wherein the processor is further configured to:
determine an event based on analysis of the plurality of messages, wherein the analysis of the plurality of messages based on natural language processing techniques; and
generate a first set of tasks for the personal interaction between the first user and the second user corresponding to the event.

10. The system according to claim 9, wherein the first set of tasks generated corresponding to the event comprises at least generation of a calendar entry for both of the first user and the second user to schedule the personal interaction and book a meeting venue for the personal interaction.

11. The system according to claim 1, wherein the processor is further configured to:
identify a current set of user characteristics based on time sequence-based user interactions and the uttered speech signals of each of the first user and the second user during the personal interaction,
wherein the current set of user characteristics is utilized as a training data set; and
predict the new set of user characteristics for the first user and the second user during the personal interaction based on time sequence-based personal interaction, the training data set, and an artificial neural network model.

12. The system according to claim 11, wherein
the prediction of the new set of user characteristics is further based on social media data of the first user and the second user collected from one or more public information databases, and
the social media data includes a plurality of media shared, content posts, social media contacts having a defined social media distance between user accounts and information relating to the social media contacts.

13. The system according to claim 1, wherein the uttered speech signals are extracted from a conversation between the first user and the second user during the personal interaction.

14. The system according to claim 1, wherein the processor is further configured to:
enable the first user and the second user for a direct exchange of one or more identity confirmation messages presented on corresponding user interfaces of an application program presented at the first electronic device and the second electronic device respectively, during or prior to the personal interaction between the first user and the second user.

15. The system according to claim 1, wherein the processor is further configured to:
override the acceptance on the consent request by the immediate dissent of one of the first user or the second user for execution of an activity during the personal interaction.

16. The system according to claim 1, wherein the plurality of criteria for the validation of the immediate consent or dissent of the first user or the second user comprises at least informed, freely given, reversible, enthusiastic and specific agreement between the first user and the second user to execute one or more activities during the personal interaction.

17. The system according to claim 1, wherein the processor is further configured to:
publish, based on a user request, a time sequence-based recording of conversation incurred during the personal interaction,
wherein the published time sequence-based recording of the conversation incurred during the personal interaction corresponds to a first task of the second set of tasks.

18. The system according to claim 17, wherein
a subset of tasks from the second set of tasks are executed based on the validation of the immediate dissent of one of the first user or the second user,
the subset of tasks from the second set of tasks comprises at least one of to dial an emergency number of current location, to dial a number of an emergency contact person, or to activate an emergency alarm sound, and
the first task is different from the subset of tasks from the second set of tasks.

19. A method, comprising:
receiving, by a processor, uttered speech signals and first sensor data of at least a first user from at least a first electronic device during a personal interaction between the first user and a second user, via a secure communication channel,
wherein the personal interaction is scheduled based on a consent response, received from a second electronic device, corresponding to an acceptance of a consent request received from the first electronic device;
applying, by the processor, a Fourier transform on the uttered speech signals to extract spectral features that characterize the uttered speech signals as a series of representative multidimensional vectors;
processing, by the processor, the first sensor data to extract biometric data including psychophysical characteristics or movement-related metrics of both the first user and the second user;
determining, by the processor, a confidence score based on an intent of both of the first user and the second user, second sensor data, a new set of user characteristics for the first user and the second user during the personal interaction, the extracted spectral features, and the extracted biometric data;
detecting, by the processor, an immediate consent, or an immediate dissent of one of the first user or the second user at a defined timestamp during the personal interaction based on at least one of a comparison of the confidence score with a threshold value, one or more explicit or implied keywords from the uttered speech signals, and an extent of deviated values of the first sensor data;

validating, by the processor, the immediate consent, or the immediate dissent of one of the first user or the second user based on a plurality of criteria; and executing, by the processor, a second set of tasks based on the validation of the immediate dissent of one of the first user or the second user.

20. The method according to claim 19, further comprising:

receiving, by the processor, detailed information pertaining to a plurality of users from the plurality of electronic devices via a user interface of an application program presented at each of plurality of electronic devices during registration, via the secure communication channel;

generating, by the processor, a plurality of user profiles based on the detailed information, received from the plurality of electronic devices; and storing, by the processor, the plurality of user profiles in a user profile database.

21. The method according to claim 19, further comprising:

receiving, by the processor, the consent request from the first electronic device associated with the first user based on a selection of a second user profile of the second user by the first user, via the secure communication channel, wherein the consent request corresponds to a mutual agreement to execute one or more activities during the personal interaction between the first and the second user;

transmitting, by the processor, the consent request to the second electronic device, via the secure communication channel; and receiving, by the processor, the consent response from the second electronic device, via the secure communication channel, based on options selected or data provided by the second user on the consent request generated by the first user.

22. The method according to claim 21, further comprising recommending, by the processor, the second user profile of the second user to the first user via a user interface of an application program presented at the first electronic device, wherein the second user profile of the second user is recommended based on a plurality of options presented by the application program at the user interface and selected by the first user based on user preferences of the first user.

23. The method according to claim 21, further comprising searching, by the processor, the second user profile of the second user from a plurality of user profiles based on one or more search terms provided by the first user at a user interface of an application program presented at the first electronic device.

24. The method according to claim 21, further comprising:

generating, by the processor, rating factors for other users from a plurality of users based on one or more machine learning models, wherein a rating factor comprises a probability of a user interaction of the first user with a third user from the plurality of users; and recommending, by the processor, the second user profile of the second user based on ranking of the rating factors for the other users from the plurality of users.

25. The method according to claim 19, further comprising:

determining, by the processor, an event based on analysis of a plurality of messages using natural language processing techniques, wherein the plurality of messages is exchanged between the first electronic device and the second electronic device, via the secured communication channel, prior to the personal interaction between the first user and the second user; and generating, by the processor, a first set of tasks for the personal interaction between the first user and the second user corresponding to the event.

26. The method according to claim 19, further comprising:

identifying, by the processor, a current set of user characteristics based on time sequence-based user interactions and the uttered speech signals of each user during the personal interaction, wherein the current set of user characteristics is utilized as a training data set; and predicting, by the processor, the new set of user characteristics for the first user and the second user during the personal interaction based on the time sequence-based personal interaction, the training data set, and an artificial neural network model.

27. The method according to claim 19, further comprising enabling, by the processor, the first user and the second user for a direct exchange of one or more identity confirmation messages presented on corresponding user interfaces of an application program presented at the first electronic device and the second electronic device respectively, during or prior to the personal interaction between the first user and the second user.

28. The method according to claim 19, further comprising overriding, by the processor, the acceptance on the consent request by the immediate dissent one of the first user or the second user for executing an activity during the personal interaction.

29. The method according to claim 19, further comprising publishing, by the processor, a time sequence-based recording of conversation incurred during the personal interaction based on a user request, wherein the publishing of the time sequence-based recording of the conversation incurred during the personal interaction corresponds to one of the second set of tasks.

30. A non-transitory computer readable medium, having stored thereon, computer executable code, which when executed by a processor, cause the processor to execute operations, the operations comprising:

receiving uttered speech signals and first sensor data of at least a first user from at least a first electronic device during a personal interaction between the first user and a second user, via a secure communication channel, wherein the personal interaction is scheduled based on a consent response, received from a second electronic device, corresponding to an acceptance of a consent request received from the first electronic device;

applying a Fourier transform on the uttered speech signals to extract spectral features that characterize the uttered speech signals as a series of representative multidimensional vectors;

processing the first sensor data to extract biometric data including psychophysical characteristics or movement-related metrics of both the first user and the second user;

determining a confidence score based on an intent of both of the first user and the second user, second sensor data, a new set of user characteristics for the first user and the second user during the personal interaction, the extracted spectral features, and the extracted biometric data;

detecting an immediate consent or an immediate dissent of one of the first user or the second user at a defined timestamp during the personal interaction based on at least one of a comparison of the confidence score with a threshold value, one or more explicit or implied keywords from the uttered speech signals, and an extent of deviated values of the first sensor data;

validating the immediate consent or the immediate dissent of one of the first user or the second user based on a plurality of criteria; and executing a second set of tasks based on the validation of the immediate dissent of one of the first user or the second user.

* * * * *